United States Patent
Alsusa et al.

(10) Patent No.: US 10,015,799 B2
(45) Date of Patent: Jul. 3, 2018

(54) RADIO RESOURCE MANAGEMENT

(71) Applicant: University of Manchester, Manchester (GB)

(72) Inventors: Emad Adnan Alsusa, Manchester (GB); Wahyu Agung Pramudito, Manchester (GB)

(73) Assignee: The University of Manchester, Manchester (GB)

( * ) Notice: Subject to any disclaimer, the term of this patent is extended or adjusted under 35 U.S.C. 154(b) by 71 days.

(21) Appl. No.: 14/421,801

(22) PCT Filed: Aug. 15, 2013

(86) PCT No.: PCT/GB2013/000344
§ 371 (c)(1),
(2) Date: Feb. 13, 2015

(87) PCT Pub. No.: WO2014/027171
PCT Pub. Date: Feb. 20, 2014

(65) Prior Publication Data
US 2015/0215948 A1   Jul. 30, 2015

(30) Foreign Application Priority Data
Aug. 16, 2012 (GB) .................. 1214642.9

(51) Int. Cl.
*H04W 72/08* (2009.01)
*H04W 16/04* (2009.01)
*H04W 84/04* (2009.01)
*H04W 16/32* (2009.01)

(52) U.S. Cl.
CPC .......... *H04W 72/082* (2013.01); *H04W 16/04* (2013.01); *H04W 16/32* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2006/0135169 A1* | 6/2006 | Sampath | H04L 25/0222 455/447 |
| 2009/0221295 A1 | 9/2009 | Sahin et al. | |
| 2011/0287775 A1* | 11/2011 | Fan | H04W 72/082 455/452.1 |

FOREIGN PATENT DOCUMENTS

| | | |
|---|---|---|
| EP | 1732338 A1 | 12/2006 |
| EP | 2312880 A1 | 4/2011 |
| WO | WO-02/49305 A3 | 6/2002 |
| WO | WO-2005/018186 A1 | 2/2005 |

OTHER PUBLICATIONS

United Kingdom Search Report dated May 31, 2013, in application No. GB1214642.9, 3 pages.
International Preliminary Report on Patentability issued in corresponding International Application No. PCT/GB2013/000344 dated Feb. 17, 2015 (12 pgs).

(Continued)

*Primary Examiner* — Christine Duong
(74) *Attorney, Agent, or Firm* — Wilmer Cutler Pickering Hale and Dorr LLP

(57) ABSTRACT

Embodiments of the present invention relate to a communication system and method adapted to manage interference between users of base stations.

11 Claims, 42 Drawing Sheets

(56) References Cited

OTHER PUBLICATIONS

Pramudito et al., "A Hybrid Resource Management Technique for Energy and QoS Optimization in Fractional Frequency Reuse Based Cellular Networks," IEEE Transactions on Communications. vol. 61, issue 12, Dec. 2, 2013 (pp. 44-56).

* cited by examiner

Example $F_1$'s users : A, B, C, D $F_2$'s users : E, F, G, H $F_3$'s users : I, J, K, L $F_4$'s users : M, N, O, P

500

600

$F_1$'s users : A, B, C, D $F_2$'s users : E, F, G $F_3$'s users : H, I, J

800

$F_1$'s users : A, B, C, D $F_2$'s users : E, F, G, $F_3$'s users : H, I, J

RADIO RESOURCE MANAGEMENT

CROSS-REFERENCE TO RELATED APPLICATIONS

This application is a national stage application of International Application No. PCT/GB2013/000344, filed on Aug. 15, 2013, which claims the benefit of the priority of United Kingdom Patent Application No. 1214642.9, filed on Aug. 16, 2012, the disclosures of each of which are hereby incorporated by reference in their entirety.

Embodiments of the present invention relate to a communication system and method.

The structure of cellular networks for supporting mobile broadband services is well known. Briefly, a Mobile-services Switching Centre controls a number of Base Station controllers, which, in turn, control a number of Base Transceiver Stations; the BSCs and BTSs constitute a Base Station System (BSS) as is well known.

However, beneath the basic system architecture, macro-, micro-, pico- and femto-cells have been developed due to pressure on the spectrum. A picocell is an indoor base station that is installed and managed by a cellular provider and usually provides a better data rate as compared to a femtocell. A femtocell is also an indoor base station, but it is installed by an end-user and partially managed by the cellular provider. Femtocells are defined in a standard established by the trio of 3GPP, the Femto Forum and the Broadband forum. The standard forms part of 3GPP's release 8, and is interdependent with the Broadband forum's extensions to its Technical Report-069 (TR-069).

In particular, picocells and femtocells are deployed by cellular providers and end users because 50% of voice calls and 70% of data traffic originate indoors, which means that 80% of wireless transmissions originate indoors. By reducing cell size, picocells and femtocells provide greater spectrum utilisation, but at the cost of an overhead associated with managing interference. It is well known that increases in interference result in decreases in achievable data rates. Furthermore, providing picocells and femtocells increases the costs associated with network infrastructure.

Since femtocells are installed by end-users, it can lead to uncoordinated transmissions, which, in turn, lead to increased interference on both the downlinks and uplinks. The problem is exacerbated in areas that have a high density of femtocells. WiMax (IEEE 802.16) and Long Term Evolution Advanced (3GPP release 10) are two technical standards directed to improving data rates within a mobile or wireless context, that is, standards governing mobile broadband services. LTE and WiMax use parallel transmissions using multicarrier modulation such as, for example, OFDM, MIMO, SC-FDMA and MIMO-SOFDMA. Therefore, it can be appreciated that interference will arise when neighbouring femtocells allocate and use the same subcarriers.

It is an object of embodiments of the invention to at least mitigate one or more problems of the prior art.

Embodiments of the present invention provide a communication system and method that dynamically assigns and utilises spectrum to provide subcarriers to base station users in a manner that manages interference.

Advantageously, embodiments of the present invention can realise an improvement in average data rate of more than 20% in service areas having a relatively high femtocell density and an improvement of over 50% in service areas having a relatively low femtocell density.

Further, embodiments of the invention can realise at least a 50% improvement in quality of service (QoS) in relatively high femtocell density areas and up to a 300% improvement in QoS in relatively lower femtocell density areas.

Still further, a significant reduction in power consumption of at least 37% can be realised in low femtocell density areas and up to 70% in high femtocell density areas.

Embodiments of the present invention will be described, by way of example only, with reference to the accompanying drawings in which:

FIG. 33 illustrates initial resource allocation;

Figure 41:
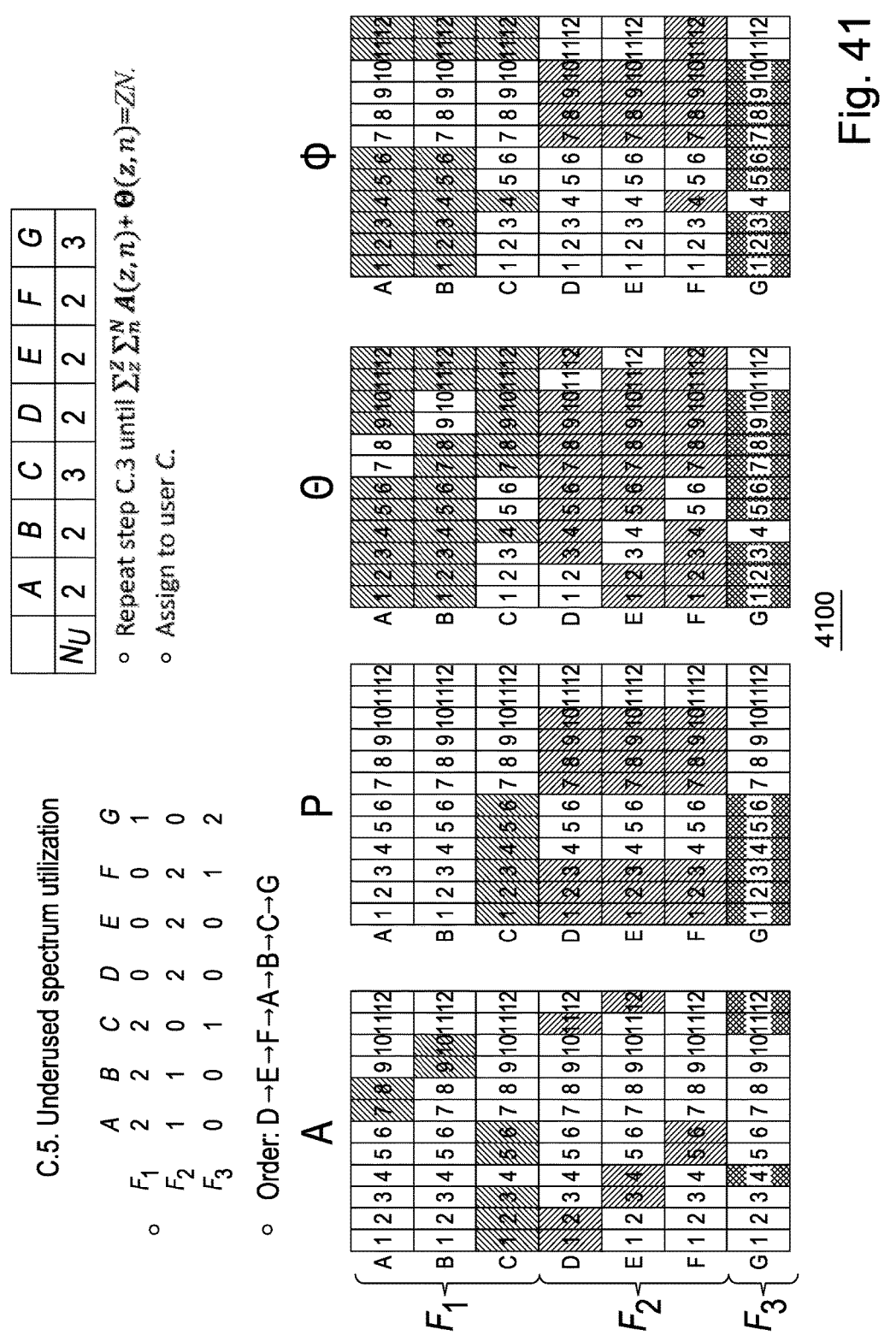

FIGS. 34 to 42 show allocation of radio resources; and

Figure 1:
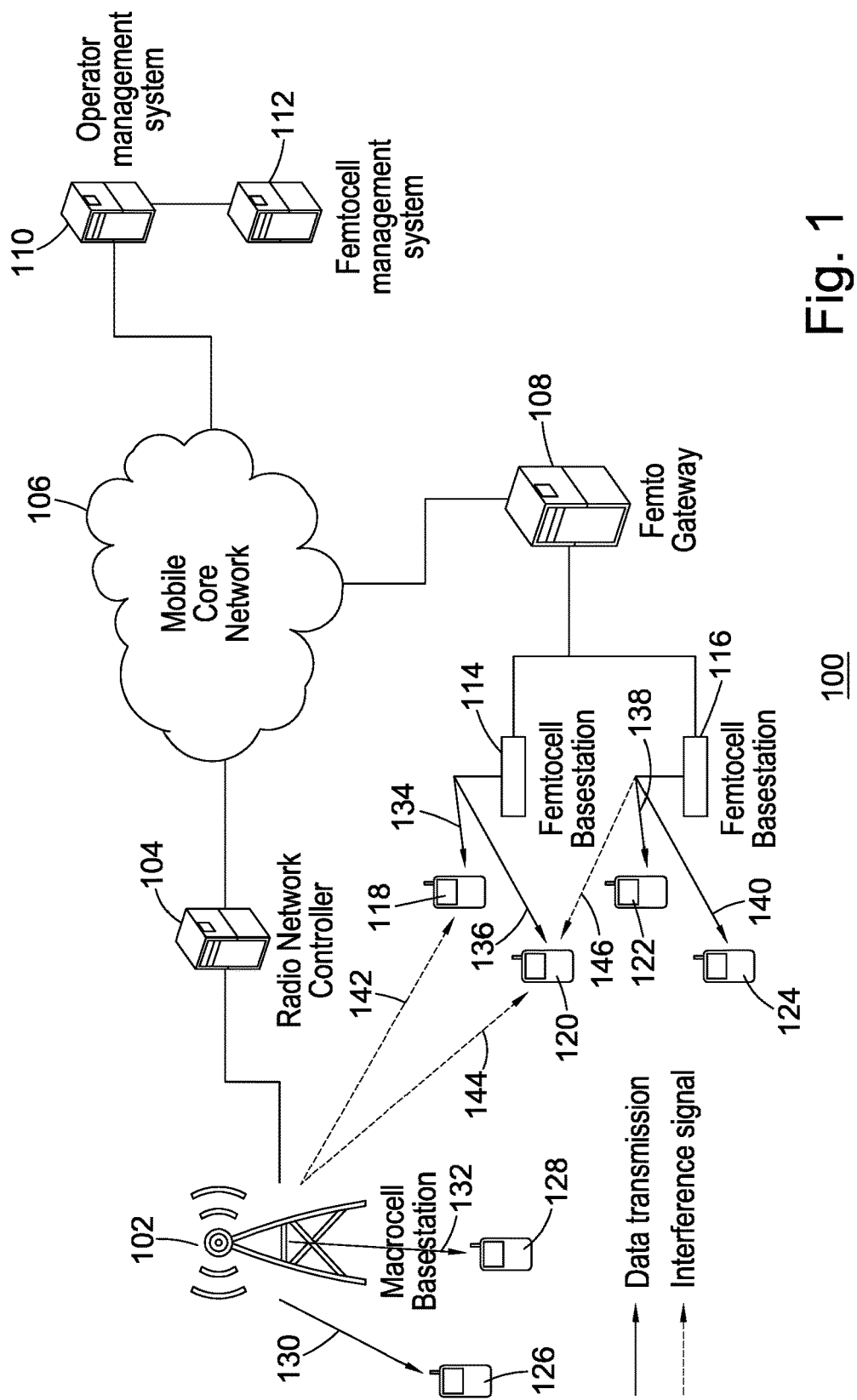
FIG. 1 shows a mobile broadband network architecture according to an embodiment.

FIG. 1 shows a mobile broadband network 100 according to an embodiment. The network would be a heterogeneous or homogeneous network. The network 100 comprises a macrocell base station 102. The macrocell base station 102 is coupled to a radio network controller 104 that, in turn, is coupled to a mobile core network 106. A femto gateway 108 is also coupled to the mobile core network 106. An operator management system 110 is coupled to a femtocell management system 112. The operator management system 110 is connected to the mobile core network 106. The femto gateway 108 supports one or more femtocell base stations. Two femtocell base stations 114 and 116 are illustrated. It will be appreciated that embodiments can be realised using more than two femtocell base stations. The femtocell base stations 114 and 116 serve one or more than one user equipment or mobile stations. It can be appreciated that the femtocell base stations 114 and 116 are illustrated as serving four mobile stations 118 to 124. Additionally, it can be appreciated that the macrocell base station 102 is illustrated as serving a number, that is, one or more than one, of user equipment such as, for example, mobile stations 126 and 128.

Also depicted is a number of intentional communication links between one or more base stations such as, for example, the base stations 102, 114 and 116 and respective mobile stations. Two intentional communication links 130 and 132 are illustrated as having been established between the macrocell base station 102 and its respective mobile stations 126 and 128. Four intentional communication links 134 to 140 are illustrated as having been established between the femtocell base stations 114 and 116 and corresponding mobile stations 118, 120 and 122, 124 respectively.

A number of unintentional interference signals are also illustrated. A 1st pair of interference signals 142 and 144 are illustrated as emanating from the macrocell base station 102. The effect of those interference signals 142 and 144 is shown as being experienced by the mobile stations 118 and 120 served by femtocell base station 114. A further interference signal 146 is illustrated as emanating from femtocell base station 116. The effect of that further interference signal 146 is illustrated as being experienced by one of the mobile stations 120 served by femtocell base station 114.

Embodiments use LTE based modulation, that is, OFDMA subcarriers and/or SC-FDMA. Embodiments are not limited thereto however. Embodiments can be realised in which other modulation techniques are used to modulate the radio resource. A preferred embodiment of the radio resources is the resource block, as is well-known within LTE.

The femtocell management system 112 acts as an overall central controller responsible for managing the frequency plan and frequency reuse within a geographical region (not shown) that is served by the macrocell base station 102 and one or more of the femtocell base stations 114 and 116.

Upon powering on, femtocell base stations are arranged, by default, to use the whole of a radio resource such as, for example, the frequency spectrum or the whole of resource block, or some other resource unit. It can be appreciated that this has the potential to cause interference to intentional communication links established between other base stations such as, for example, other femtocells, and their respective mobile stations that are also within an area of radio coverage established by the newly powered up femtocell base station.

When a mobile station wants to be served by a femtocell base station, a measurement report compiled by the mobile station is submitted to the femtocell base station. Furthermore, the measurement report of a mobile station is also required when the uplink signal energy of the mobile station to its serving femtocell base station falls below a predetermined threshold or if it exceeds a predetermined velocity threshold.

The measurement report comprises data associated with interference attributed to neighbouring base stations experienced by a respective mobile station, in particular, the measurement report contains an indication of the present signal to interference ratio experienced by a user.

The measurement report is used to construct a matrix of conflicts within at least one of one or more of the base stations, such as, for example, one or more of the femtocell base stations, and a base station management system, for example, the femtocell management system 112. Embodiments can be realised in which a matrix of conflicts is constructed within such a management system 112 and one or more than one of the base stations such as, for example, the femtocell base stations. The matrix of conflicts is used to establish a virtual connection between different femtocell base stations 114 and 116 in order to produce efficient radio resource utilisation. A resource allocation algorithm is used to achieve or manage radio resource utilisation. The resource allocation algorithm can be executed either centrally, via the femtocell management system 112, or in a distributed manner by individual femtocell base stations 114 and 116, subject to the femtocell base stations 114 and 116 having sufficient, or sufficiently available, computational power. Such computational power can be made available during, for example, an idle state of the femtocell base stations.

Figure 2:
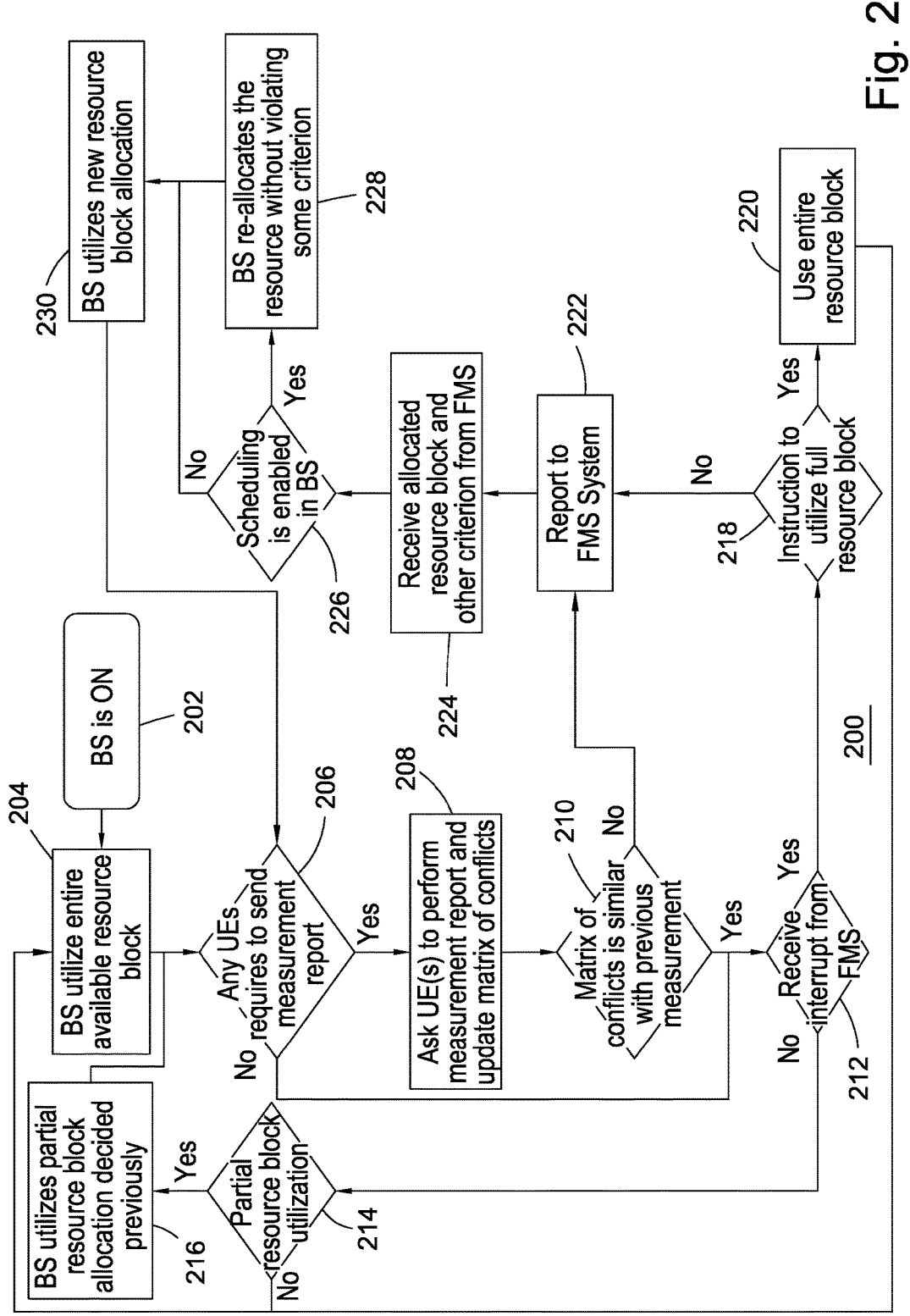
FIG. 2 depicts a flowchart for radio resource management according to an embodiment.

Referring to FIG. 2, there is shown a flowchart 200 of the resource allocation algorithm. The femtocell base station is powered on at step 202. The femtocell base station is arranged to utilise the whole of an available resource block at step 204. A determination is made, at step 206, regarding whether or not any of the user equipment or mobile stations are required to send a measurement report. If that determination at step 206 is positive, the femtocell base station is arranged, at step 208, to request a respective mobile station, or multiple mobile stations, to prepare and submit a measurement report and/or update a matrix of conflicts. Following submission of the measurement report and/or updating of the matrix of conflicts, a determination is made, at step 210, regarding whether or not there is a predetermined correlation between the most recently constructed matrix of conflicts, or measurement report, and one or more previously constructed matrices of conflicts, or measurement reports. If that determination is positive, processing moves to step 212. Returning to step 206, if none of the mobile stations are required to send a measurement report, control transfers to step 212.

Referring to step 212, a determination is made regarding whether or not an interrupt has been received from the femtocell management system 112. If the determination and step 212 is negative, it is determined, at step 214, whether or not partial resource block utilisation can be realised. If partial resource block utilisation can be realised, the powered on femtocell base station utilises that partial resource block in supporting wireless communications at step 216. The partial resource block will have been determined in advance. The partial resource block corresponds to a subset of the available, or whole of, the radio resource such as, for example, a subset of the available spectrum. If the determination at step 214 is negative, control passes to step 204 whereby the femtocell base station attempts to utilise the whole of the available radio resource such as, for example, the whole of the resource block.

If the determination at step 212 is positive, it is determined, at step 218, whether or not instructions have been received to utilise the full resource block to support wireless communications. If that determination is positive, control passes to step 220, where the base station is adapted to use the whole of the resource block. It can be appreciated that step 220 is functionally equivalent to step 204 such that control could be passed from step 218 directly to step 204.

If it was determined, at step 210, that there is an insufficient degree of correlation between a currently constructed matrix of conflicts and a previously constructed matrix of conflicts, or if it was determined, at step 218, that the femtocell base station had not received instructions to utilise the full resource block, a report to that effect is sent, at step 222, to the femtocell management system 112.

The femtocell management system 112, responds by allocating a resource block and/or providing other decision-making criteria or criterion or information for step 210, which is received by the femtocell base station at step 224. For example, after receiving the allocated subcarriers from the femtocell gateway, the femtocell might wish to perform rescheduling, which involves re-allocating the subcarriers based on user equipment need. The decision making criterion or information is an indication of all of the forbidden subcarriers for a particular user equipment due to use by neighbouring or other user equipment. It will be appreciated that the term subcarrier is an embodiment of a carrier. It is determined, at step 226, whether or not scheduling is enabled within the femtocell base station. If scheduling is enabled within the femtocell base station, the femtocell base station is arranged, at step 228, to reallocate the resource without violating one or more than one criterion. Thereafter, the femtocell base station utilises the newly allocated resource block to support wireless communications at step 230. If scheduling is not enabled at the femtocell base station, the femtocell base station utilises the newly allocated resource block at step 230.

Thereafter, control returns to step 206.

The construction of a matrix of conflicts will now be described.

If a current base station (BS), $T_m$, has a number, $Z_m$, of users, list of all its neighbouring BSs including macro-, pico-, and femtocells to give $T_m^C = [T_1^m\ T_2^m\ \ldots\ T_{c_m}^m]$, where $C_m$ is the number of $T_m$'s neighbouring BSs with index $c_m$, the matrix of conflicts, $\zeta_m \in \Re^{Z_m \times C_m}$, of the current base station, $T_m$, is given by $$\zeta_m(z, c_m) = \begin{cases} w_c, & T_{c_m}^m \text{ interferes } u_z \\ 0, & \text{Otherwise} \end{cases} \quad (1)$$

where $w_c$ is any positive integer number bigger than 0 representing the presence of interference from another base station, $T_m^C$, experienced by a user, $u_z$. The matrix of conflicts is a $Z_m$ by $C_m$ matrix of real values. In an expanded form, it will be appreciated that the matrix of conflicts for base station $T_m$ takes the following general form:

$$\begin{pmatrix} & & \text{Interference} & & \\ \text{user} & T_1^m & T_2^m & \ldots & T_{c_m}^m \\ u_1 & w_1^1 & w_2^1 & \ldots & w_c^1 \\ u_2 & w_1^2 & w_2^2 & \ldots & w_c^2 \\ \ldots & \ldots & \ldots & \ldots & \ldots \\ u_{z_m} & w_1^{z_m} & w_2^{z_m} & \ldots & w_c^{z_m} \end{pmatrix}$$

It can be appreciated that, for example, user $u_2$ of base station $T_m$ is experiencing interference $w_1^2$ from base station $T_1^m$. If there is no interference, the values $w_i^j$, representing the measure of interference experienced by user $j$ from base station $i$, will be zero.

Every time $T_m$ updates $\zeta_m$, a check of the resulting matrix of conflicts is performed with the previous measurement. Assuming the previous measurement of $\zeta_m$ is given by $\zeta_m'$, the current base station, $T_m$, will report to the FMS 112 if a predetermined condition is met such as, for example, $$\Sigma_{z=1}^{Z_m} \Sigma_{c_m=1}^{C_m} |\zeta_m(z,c_m) - \zeta_m'(z,c_m)| > 0 \quad (2)$$

that is, in this embodiment, if there is any change in the matrix of conflicts, then an update will be required or at least a measurement report is sent to the femtocell management system 112. It will be appreciated that other conditions could be established such as, for example, $\Sigma_{z=1}^{Z_m} \Sigma_{c_m=1}^{C_m} |\zeta_m(z,c_m) - \zeta_m'(z,c_m)| > x$, where x is a predetermined value used to introduce a controllable measure of hysteresis.

Upon receiving $\zeta_m$ updates from the current base station, $T_m$, the FMS 112 waits for the other BSs within the $T_m^C$ set to send their own matrix of conflicts for a certain period, which could be in term of milliseconds, before updating the entire network matrix of conflicts, $\zeta \in \Re^{Z \times M}$, given by $$\zeta(z, m) = \begin{cases} w_m, & T_m \text{ is the BS of } u_z \\ w_c, & T_c \text{ interferes } u_z \\ 0, & \text{otherwise} \end{cases} \quad (3)$$

which gives a $$\begin{pmatrix} & & \text{Interference} & & \\ \text{user} & T_1^m & T_2^m & \ldots & T_{c_m}^m \\ u_1 & w_m^1 & w_2^1 & \ldots & w_c^1 \\ u_2 & w_1^2 & w_m^2 & \ldots & w_c^2 \\ \ldots & \ldots & \ldots & \ldots & \ldots \\ u_{z_m} & w_1^{z_m} & w_2^{z_m} & \ldots & w_m^{z_m} \end{pmatrix}$$

Interrupt from FMS

Under certain circumstances, one or more base stations can be required to submit an interference report by the FMS 112. If a BS $T_m$ is not required to send the matrix of conflicts or it is determined that the prevailing interference scenario has changed, a relevant BS may be interrupted by the FMS 112 and required to submit a report if any of the following conditions are fulfilled:

$$\Sigma_{c=1}^{M} |\zeta(z,c) - \zeta'(z,c)| > 0, \forall z \subseteq Z | \zeta(z,m) = w_m \quad 1.$$

where $\zeta'$ is the matrix of conflicts from a previous measurement, which means that a femtocell is required to provide an update, that is, measurement report, because it is causing interference to a given user, served by a different femtocell, due to movement of that user into the region that is also served by the newly interfering femtocell being asked to submit a report.

$$\Sigma_{z=1}^{Z} |\{\zeta(z,m) - \zeta'(z,m)\} \wedge \{\zeta(z,m) \sim !w_m\}| > 0, \forall z \subseteq Z | \zeta(z,m) = w_m \quad 2.$$

where $\wedge$ denotes an AND logic operation and $x = \{a \sim !b\}$ means $x=1$ if a is not equal to b, otherwise $x=0$, which means that an updated measurement report should be submitted following handover of a user from one femtocell to another femtocell.

$$\Sigma_{c=1}^{M} |\{\zeta(z,c) \sim w_c\} \wedge \{S_c > S'_c\}| > 0, \forall Z | \zeta(z,m) = w_m$$
$$\text{for } c \neq m \quad 3.$$

where $S_m$ is total affected user by $T_m$ and is given by $$S_m = \Sigma_{z=1}^{Z}\{\zeta(z,m) \sim w_m\} + \Sigma_{z=1}^{Z}\{\zeta(z,m) \sim w_c\} \qquad (4)$$

$S_m'$ is the affected user based on $\zeta'$ matrix, which means that a change in the number of detected users within a service area of a femtocell has been identified.

Set of Rules for Resource Allocation

The radio resource allocation such as, for example, the spectrum allocation or frequency re-use plan, is determined according to the following:

1. Grouping the small cells

Figure 3A:
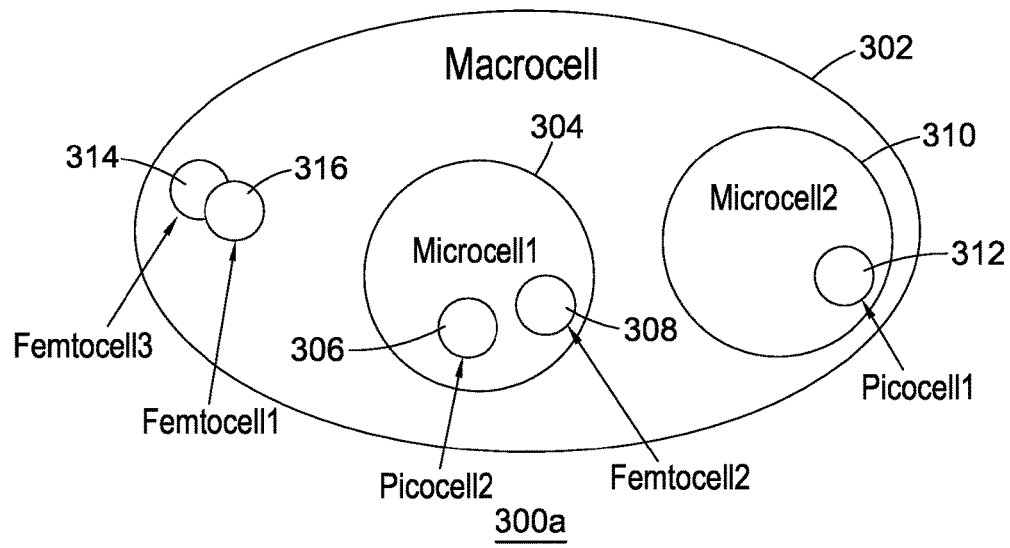
FIGS. 3a and 3b illustrate cell grouping.

The cells are grouped based on the matrix of conflicts such that parallel computing can be performed by the FMS 112, that is, the cells are grouped on the basis of interference with one another's users. Referring to FIG. 3a, there is shown an example of a network hierarchy 300a comprising a macrocell 302 having within its area of service, that is, radio coverage, a first microcell 304, which, in turn, comprises a respective picocell 306 and a respective femtocell 308 within its area of coverage, a second microcell 310, which, in turn, comprises a respective picocell 312, and a further pair 314 and 316 femtocells.

It can be appreciated that there is scope for interference, or actual interference, between the microcell 1 304, picocell 306 and femtocell 308. There is potential for interference between microcell 2 310 and picocell 2 312 and scope for interference between femtocells 1 316 and 3 314.

Figure 3B:
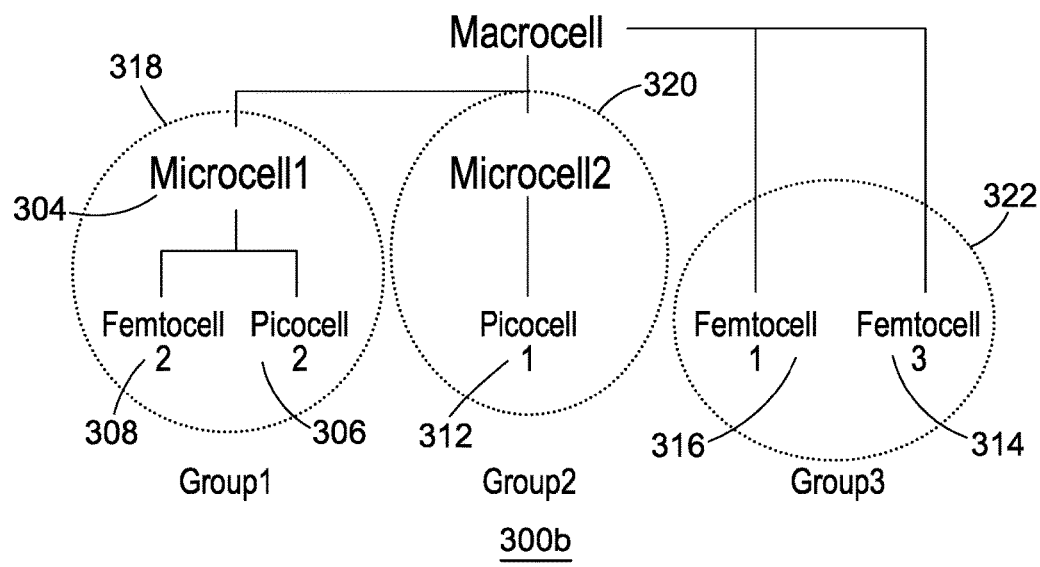

Referring to FIG. 3b, there is shown a hierarchical grouping 300b for the above network hierarchy 300a. It can be appreciated that the hierarchical grouping 300b comprises 3 groups; namely, group 1 318, group 2 320 and group 3 322. Group 1 318 comprises the first microcell 304 and its respective picocell 306 and femtocell 308. Group 2 320 is illustrated as comprising the second microcell 310 and its respective picocell 312. Group 3 322 is indicated as comprising the pair of femtocells 314 and 316. As indicated above, the cells have been grouped according to their potential for interference or on the basis of actual interference.

2. Ranking: sort the conflicting BSs in a first to last allocation order, based on at least one predetermined criterion within each group. Embodiments sort the base stations according to user density, that is, according to the number of detected users within a femtocell's service area, even if those users are not actually being served by that femtocell.

3. Establish the Matrices of Allocations, which contain an allocated carriers matrix, A, a forbidden carriers matrix, Θ, and a priority carrier matrix, P.

Each row indicates subcarriers and belongs to one user in a femtocell. Initialise all to zeros.

A indicates the allocated matrix for each of the individual users, Θ is used to indicate which subcarriers are forbidden for individual users and P is used to indicate priority subcarrier allocation so efficient allocation can be achieved.

4. According to the BSs rank, starting with BS 1, allocate its users a predetermined number of subcarriers.

Ensure that subcarriers allocated to each user are spaced in frequency to achieve some frequency diversity.

(Optionally), a BS may send the priority order of each UE's subcarriers.

If the BSs rank involves macro- and/or microcells, macro- and microcells BSs' users will always have the highest priority compared to pico- and femtocells users.

5. Update the Matrix of allocations.

Subcarriers allocated to one user become forbidden for all users within a certain proximity of that user. The proximity is taken from the Matrix of conflicts which is established at the beginning.

6. Once all users in BS one are allocated, users in next BS in the rank, taking into consideration the updated Matrix of Allocations, are allocated subcarriers.

The Matrix of Allocations is updated every time a new user is allocated subcarriers.

7. After all users have been allocated with a predefined number of subcarriers, allocate the rest of the subcarriers to inner users.

Inner users are defined as any a user that is served by $T_m$ and gives $\Sigma_{c=1}^{M}\zeta(a,c)=0$ for $c \neq m$, that is, a user that is not subject to interference.

8. Repeat step 6 until all users in all BSs are allocated.

Figure 4:
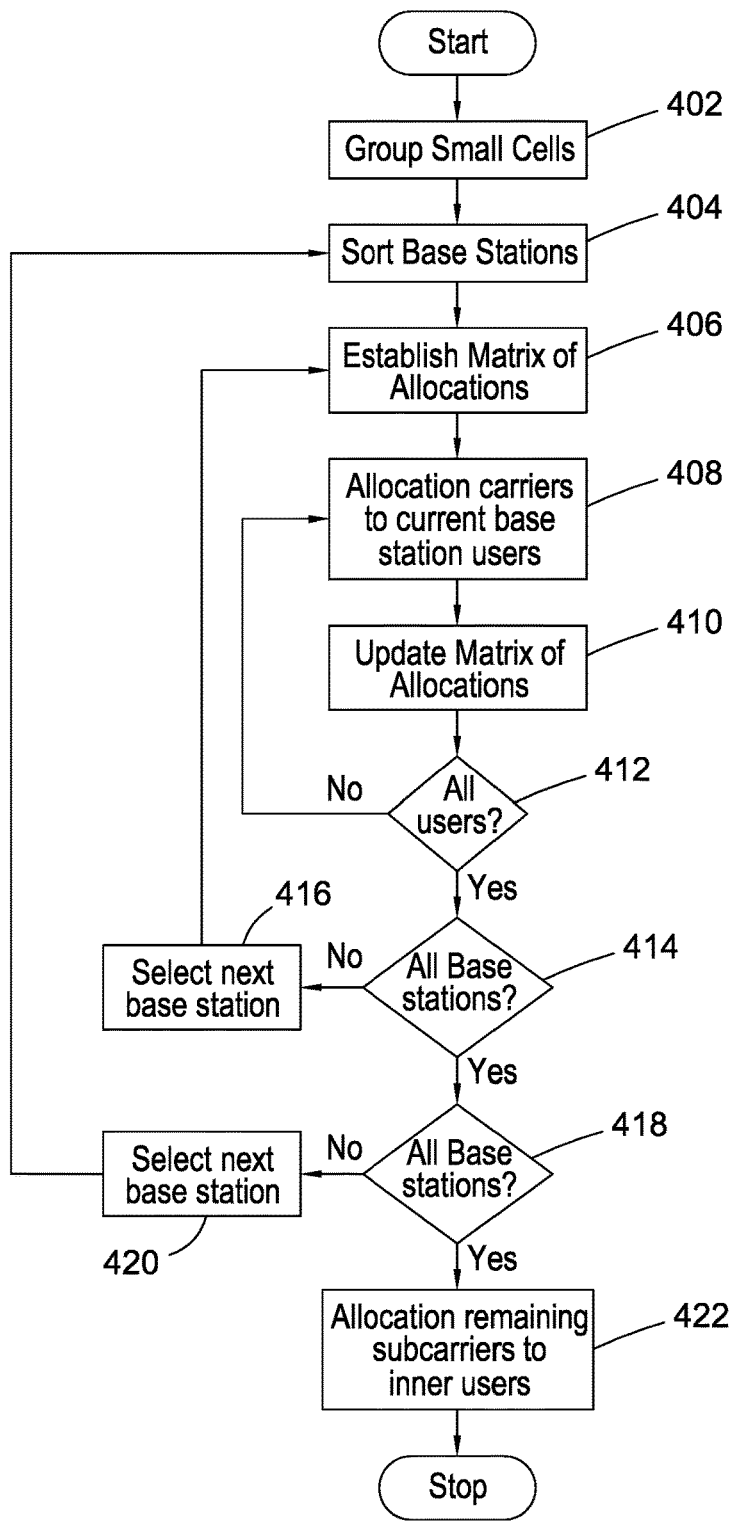
FIG. 4 shows a flowchart for resource allocation according to cell grouping.

Referring to FIG. 4, there is shown a flowchart 400 for resource allocation as indicated above. At step 402, a given network hierarchy of cells is analysed and grouped according to determined interference levels, or at the potential for interference. Within each group, the base stations are sorted into an allocation order according to at least one criterion at step 404. Embodiments sort the base stations according to decreasing user density. A matrix of allocations, comprising an allocated carriers matrix, a forbidden carriers matrix and a priority carrier matrix is established at step 406. For a current base station within a current group, allocate carriers to any users of that current base station at step 408. The matrix of allocations is updated, at step 410, in response to the allocations made at step 406. A determination is made at step 412 regarding whether or not all users have been allocated resources. If the determination is negative, processing resumes at step 408 to allocate resources to the remaining users of the current base station. If the determination at step 412 is positive, a determination is made, at step 414, regarding whether or not all base stations within a current group of base stations have been processed. If the determination at step 414 is negative, another base station, selected from a current group of base stations, is chosen at step 416 and control passes to step 406 to begin allocating its users corresponding resources. If all base stations within a current group of base stations have been processed, a determination is made at step 418 regarding whether or not all groups of base stations, as determined at step 402, have been processed. If the determination at step 418 is negative, the next group of base stations is selected at step 420 and processing resumes at step 404 for the currently selected group of base stations. If the determination at step 418 is positive, the remaining resources are allocated to the inner users at step 422. Concurrently with allocating subcarriers to a given user, corresponding entries are made in the forbidden matrix to ensure that the newly allocated subcarriers cannot be allocated to any other user providing there is no scope for interference between a user of the newly allocated subcarriers and one or more other users. If there is no scope for any such interference, then frequency re-use is permissible such that the newly allocate subcarriers can also be allocated to a noninterfering user. Once all users have been allocated subcarriers, any remaining subcarriers are distributed, preferably even, amongst those users that are not subject to any interference.

Figure 5:
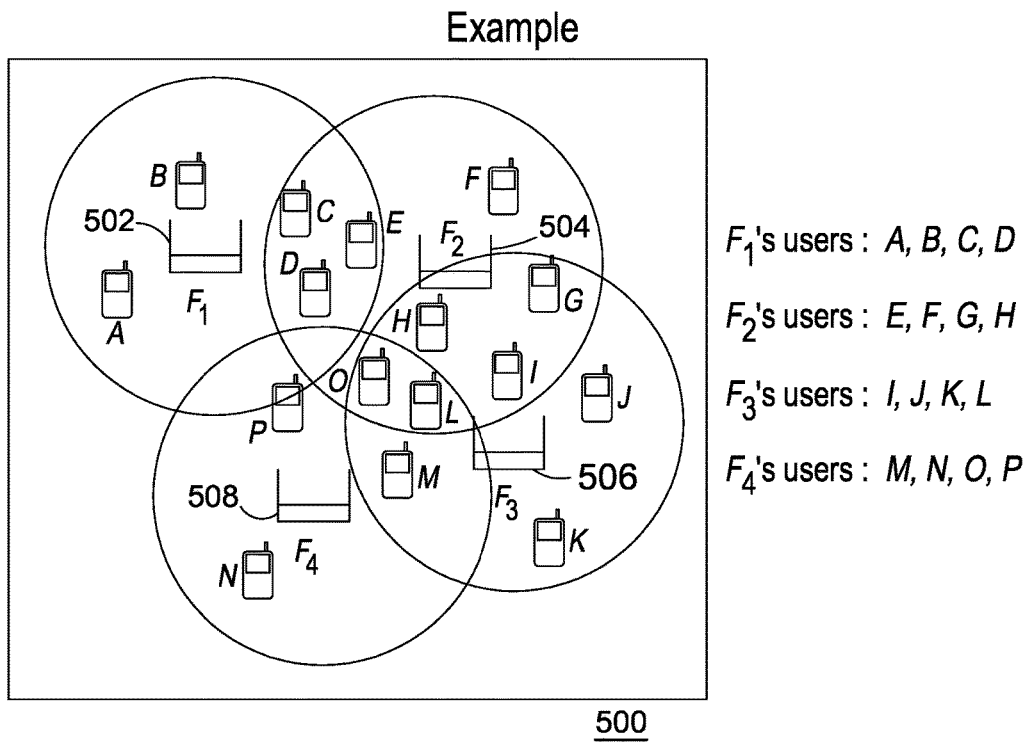
FIG. 5 depicts a radio environment of a number of femtocells.

The operation of prior art techniques and embodiments of the present invention will now be described with reference to FIG. 5, which shows a network 500 comprising 4 base stations, otherwise known as femtocell access points, 502, 504, 506 and 508. A first femtocell access point 502 has a plurality of users. In the illustrated embodiment, the first access point 502 has 4 users; namely A, B, C and D. The second femtocell access point 504 has a respective plurality of users; namely, E, F, G and H. The third femtocell access point 506 has a respective plurality of users; namely, I, J, K and L. The fourth femtocell access point 508 also has a plurality of users; namely, M, N, O and P.

Figure 6:
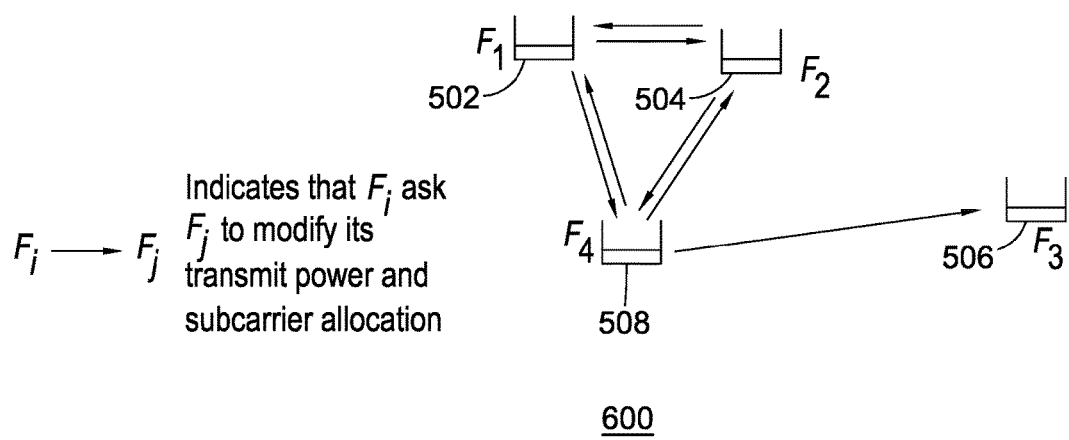
FIG. 6 illustrates an interference scenario.

Referring to FIG. 6, there is shown a model 600 of interference caused by the femtocell access points 502 to 508. It can be appreciated that $F_i \rightarrow F_j$ indicates that femtocell $F_i$ requests its neighbouring femtocell $F_j$ to modify at least one of its transmit power and subcarrier allocation due to interference being experienced at at least one of femtocell and at least one of its mobile stations (not shown) being serviced by that femtocell $F_i$. However, since all femtocells have a similar interest, which is serving their users at a maximum achievable data rate, the various requests to modify transmit power and subcarrier allocation cannot be accommodated readily. Still further, if a femtocell $F_i$ is more loaded, that is, has a greater number of users or greater amount of traffic, that femtocell may have the right to ask a neighbouring femtocell to modify spectrum allocation for a particular mobile station of that neighbouring femtocell. However, this can, again, lead to an unresolvable conflict if the number of users on each femtocell or if the amount of traffic carried by each femtocell is substantially equal.

Figure 7:
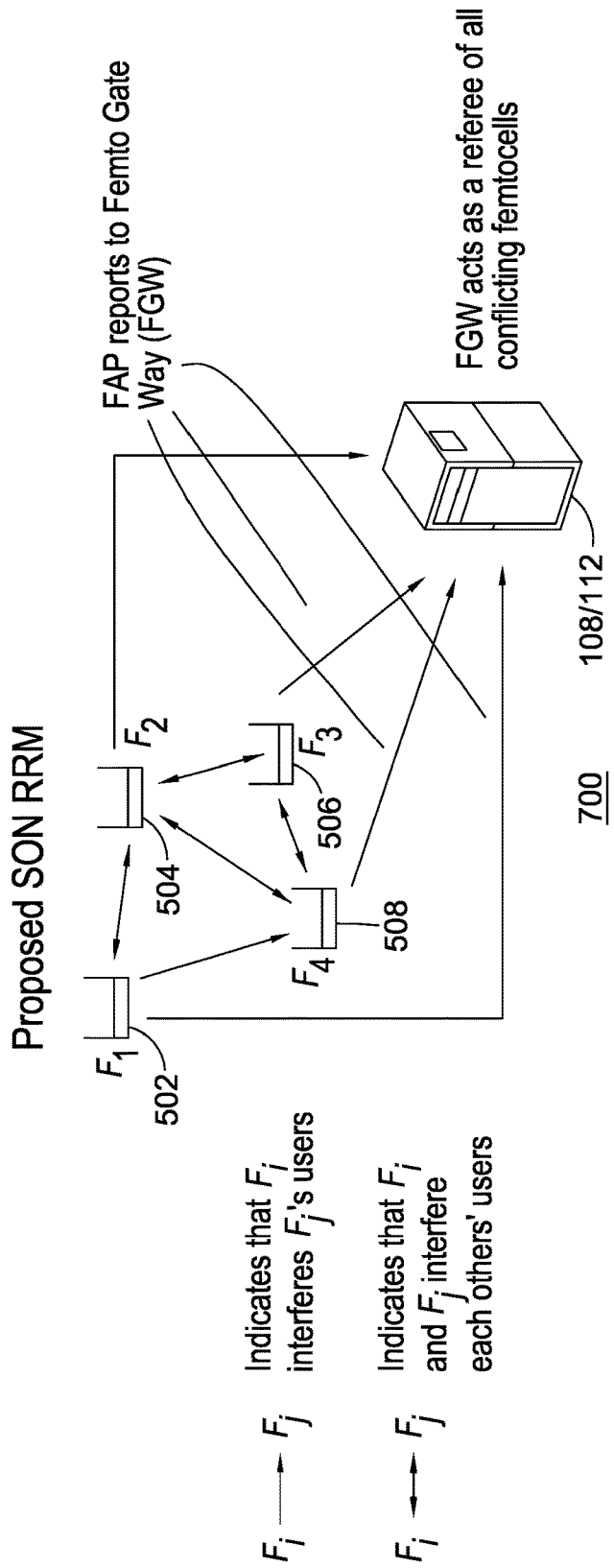
FIG. 7 shows interference reporting.

Referring to FIG. 7, there is shown an interference model 700 that is resolvable according to embodiments of the present invention. It will be appreciated that $F_i \rightarrow F_j$ indicates that femtocell $F_i$ interferes with at least one of a neighbouring femtocell $F_j$ and its users and $F_i \leftrightarrow F_j$ indicates that there is mutual interference between neighbouring femtocells and $F_j$. Each femtocell access point that experiences interference provides a femtocell access point report to either the femtocell gateway 108 or the femtocell management system 112 or other network management entity. The recipient of the femtocell access point reports undertakes the allocation processing described above with a view to resolving any conflicts. The allocation processing is preferably updated periodically. In preferred embodiments, the allocation processing is updated every one or two seconds.

Figure 8:
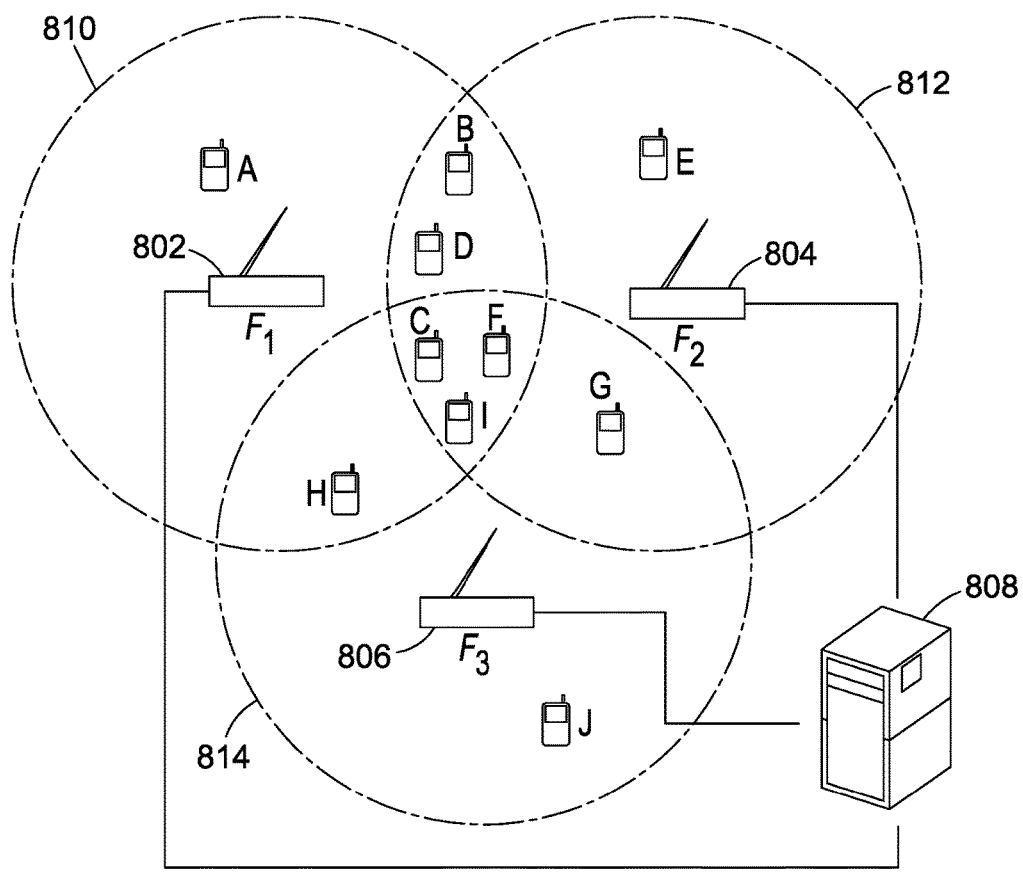
FIG. 8 depicts an interference scenario.

Referring to FIG. 8, there is shown a network 800 comprising 3 femtocell access points 802 to 806 and an associated femto gateway 808. The first femtocell 802 has a plurality of users; in the illustrated embodiment it has users A, B, C and D. The second femtocell 804 also has a respective plurality of users; in the illustrated embodiment it has users E, F and G. The third femtocell 806 has a plurality of users; namely users H, I and J. One skilled in the art will appreciate that the allocated users in the present example is merely illustrative. The dotted lines 810 to 814 surrounding each of the femtocells 802 to 806 are intended to illustrate service areas of respective femtocells. A user of one femtocell $F_i$ is classified as being subject to interference from a neighbouring femtocell $F_j$ if the ratio $\gamma_{ic}$ of the signal from its femtocell $F_i$ to the signal from the neighbouring femtocell $F_j$ is below a chosen signal to interference ratio $\gamma_{th}$. In the illustrative embodiment, suppose that users B, C, F, G and I are subject to interference, they will produce and transmit to their respective femtocells measurement or interference reports 902 to 912 as can be appreciated from FIG. 9. In turn, the femtocells 802 to 806 forward corresponding reports 914 to 918 regarding the interference situation 900 to the femto gateway 808. It will be appreciated that all users submit a measurement report, regardless of whether or not they are adversely affected by interference so that the FMS can construct an accurate picture of the interference scenario and to understand which femtocells are serving which respective users.

The femto gateway 808 determines the number, $S_m$, of users within each femtocell. It can be appreciated that a number of users are indicated as being adversely affected by the interference from neighbouring femtocells. In the present situation mobile stations B, C, D, F, G and I are indicated as being subject to interference.

The femtocell gateway 808 determines an initial number of subcarriers per user, $N_{fm}$, as being the greatest integer less than or equal to the following quotient $N_{fm} = \lfloor N/S_m \rfloor$, where N is the number of available subcarriers. The determination is made from the matrix of conflicts submitted by each femtocell, which will contain an indication of the number of users per femtocell and the total number of subcarriers allocated to those users. In the present example, $N_{f1}=2$, $N_{f2}=2$ and $N_{f3}=3$.

The femtocell gateway 808 then sets the initial number of subcarriers for each user, $N_{uc}$, to equal their serving femtocell access point's initial number of subcarriers, $N_{fm}$ but for users that are experiencing interference. For users that are experiencing interference, the initial number of subcarriers for each user, $N_{uc}$, is set to equal the smallest initial number of subcarriers per user, $N_{fm}$, selected from the set of initial number of subcarriers per user determined for those femtocells having users that are experiencing interference. Therefore, for example, it will be appreciated that $N_{uA} = N_{f1} = 2$, $N_{uE} = N_{f2} = 2$ and $N_{uJ} = N_{f3} = 3$ for those users that are not experiencing interference whereas $N_{uC} = N_{uF} = N_{uI} = N_{f1} = 2$ for those users that are experiencing interference.

The femtocell gateway 808 supports the femtocells according to respective femtocell allocations, that is, according to the number of subcarriers per user, $N_{fm}$, into a descending order, which gives $F_1 \rightarrow F_2 \rightarrow F_3$. Preferred embodiments allocate the subcarriers starting with the base station with the highest user density. Alternatively, or additionally, embodiments allocate subcarriers starting with base stations with the greatest percentage of users experiencing interference.

Figure 10:
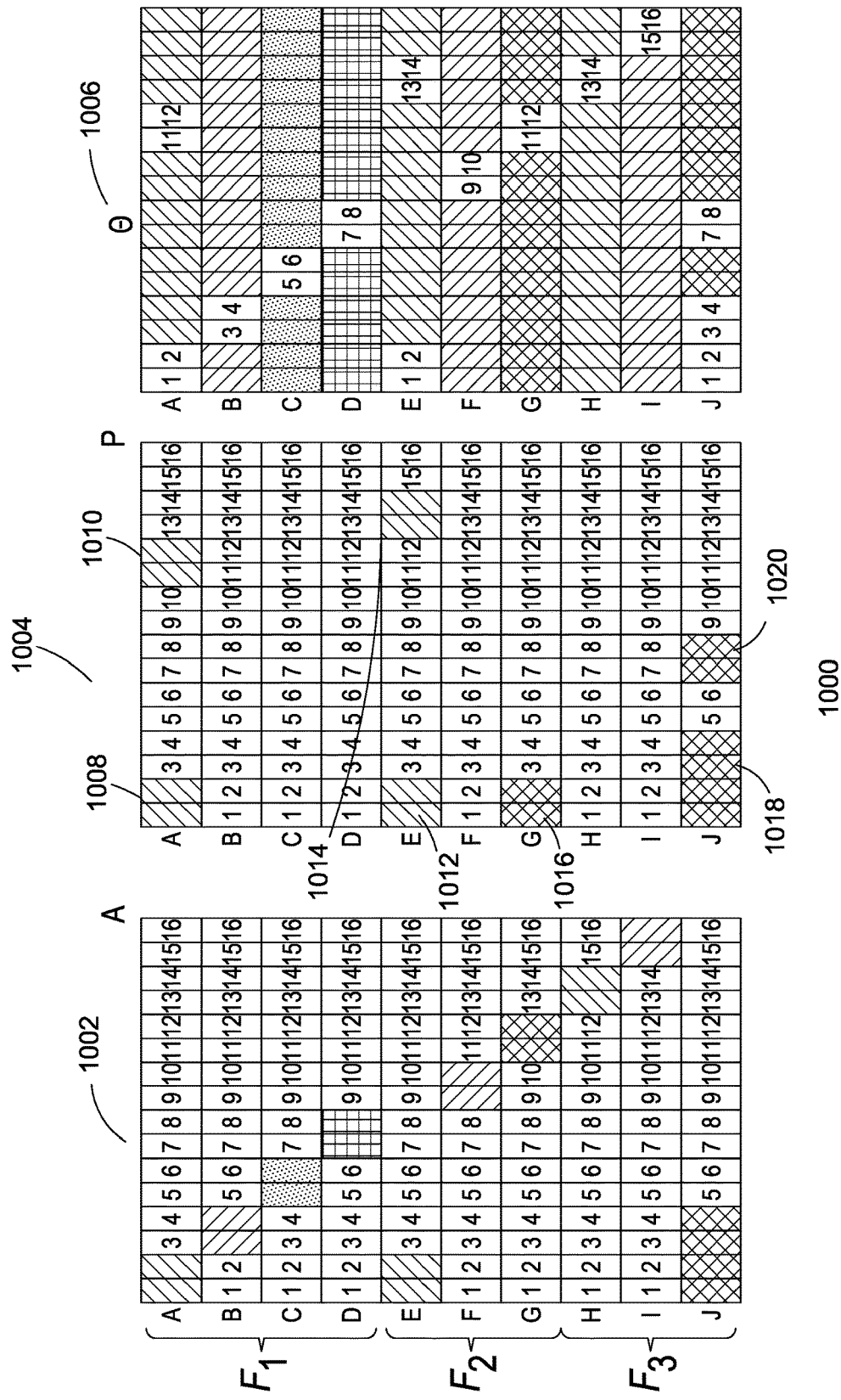
FIG. 10 shows subcarrier allocation in allocated, priority and forbidden subcarrier matrices.

The femtocell gateway 808 establishes three empty matrices for the forbidden subcarriers, Θ, priority subcarriers, P, and allocated subcarriers, A. The forbidden subcarrier, priority subcarrier and allocated subcarrier matrices are populated with the users of respective femtocells according to the ascending order determined above, which results in a frequency allocation 1000 shown in FIG. 10. In the present case, referring to the allocated subcarriers matrix 1002, it can be appreciated that frequency allocations of the users associated with a first femtocell 802 are reflected in the three matrices. It can be appreciated, therefore, that user A has been allocated a 1st pair of subcarriers. Similarly, user B has been allocated a 2nd, different, pair of subcarriers. Likewise, user C has been allocated a 3rd pair of subcarriers, user D has been allocated a 4th pair of subcarriers. Similarly, user E has been allocated a pair of subcarriers in respective timeslots. Since the measurement reports show that there is no present interference between users A and E. User F has been assigned a 5th pair of subcarriers and user G has been allocated a 6th pair of subcarriers. Regarding the 3rd femtocell 806, user H has been allocated a 7th pair of subcarriers, user I has been allocated an 8th pair of subcarriers and user J has been allocated 3 subcarriers.

Referring to the priority subcarriers matrix 1004, it can be appreciated that user A of the 1st femtocell 802 has been allocated a 1st pair of subcarriers 1008 and a 2nd pair of subcarriers 1010. User E has also been allocated a 1st pair of subcarriers 1012, which are identical to the 1st pair of subcarriers allocated to user A, and a 2nd pair of subcarriers 1014. The 2nd pair of subcarriers 1014 allocated to user E is different to the 2nd pair of subcarriers 1010 allocated to user A. User G has been allocated a 1st pair of subcarriers 1016 and user J has been allocated a 1st set of 4 subcarriers 1018 and a 2nd set of 2 subcarriers 1020 for use as priority subcarriers. Users A, E and G are inner users that have indicated that they are not experiencing any interference.

Referring to the forbidden subcarrier matrix 1006, the numbered subcarriers, representing an "or" operation between the subcarriers assigned in the allocated subcarriers matrix and the priority subcarriers matrix, provide an indication of subcarriers that can be used by respective users and the unnumbered subcarriers provide an indication of subcarriers that respective users are forbidden from using.

Next the femtocell gateway 808 maximises subcarrier allocation by using the remaining, unallocated, spectrum for inner users; an inner user is a user that does not experience interference. In the present situation, users A, E and J are inner users. Having assigned remaining subcarriers to those inner users, the priority subcarrier and allocated subcarrier matrices are updated accordingly.

Figure 9:
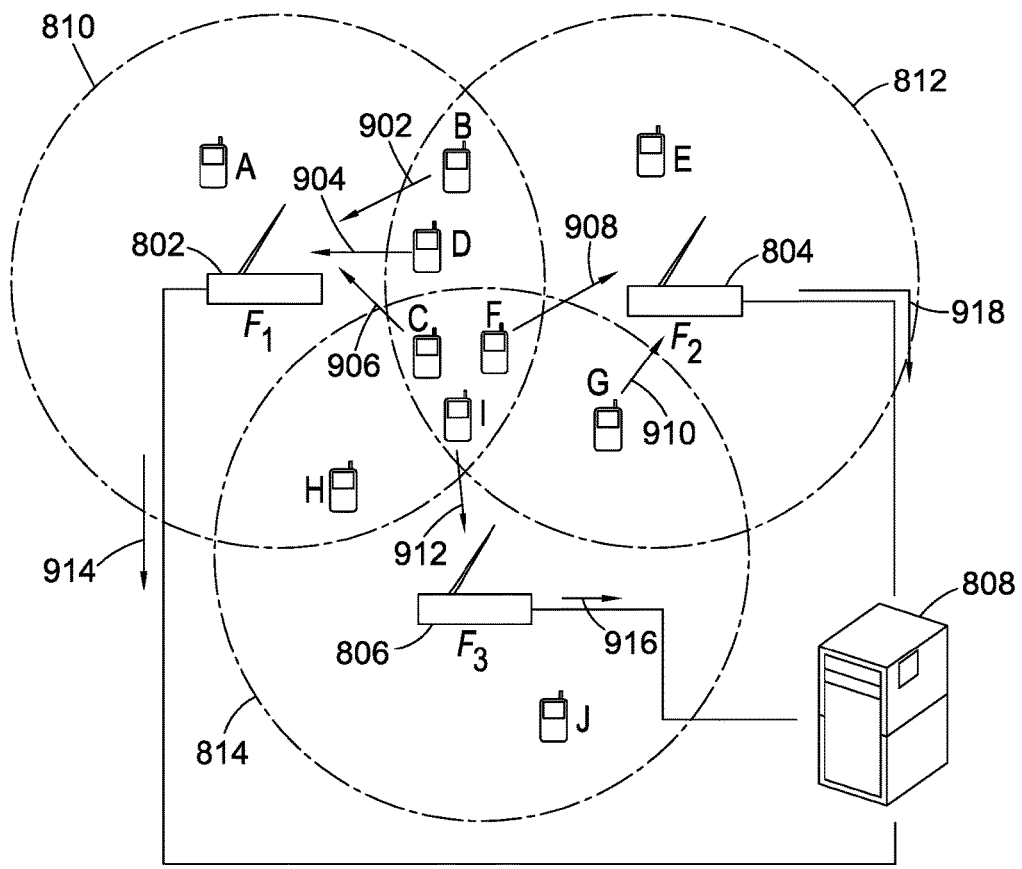
FIG. 9 illustrates measurement reporting and interference reporting.

Optionally, the femtocell gateway 808 undertakes a hidden frequency spectrum assignment to ensure that all available subcarriers have been allocated. The central allocation resource, that is, the FGW or FMS, identifies all inner users that could be any "a" user that is served by $T_m$ and gives $\Sigma_{c=1}^{M}\zeta(a, c)=0$ for $c \neq m$, where $\zeta$ is the matrix of conflicts. Referring to FIG. 9, it can be appreciated that users A, E and J are inner users. For each femtocell, the central point measures the total number of unallocated subcarriers and each inner user is allocated with the same number of unallocated subcarriers. It will be appreciated that hidden frequency spectrum assignment is under taken lastly, which is, in essence, a repeat of the step of the initial frequency allocation but for the matrix of allocations having been populated with binary numbers. Therefore, if there are Z users within a set of frequency update, N subcarriers, matrix of allocated subcarriers and forbidden subcarriers are given by A and $\Theta$, respectively, repeat the initial frequency allocation until the subcarrier allocation indicator, $S_{aloc}$, equals NZ, where is given by $$S_{aloc} = \sum_{z=1}^{Z} \sum_{n}^{N} A(z, n) \vee \Theta(z, n)$$

where is $\vee$ an OR-logic operation sign.

In the example, this means repeat the initial frequency allocation until the $S_{aloc}$ equals 160. Embodiments of the present invention realise self-organising network radio resource management exhibiting significant performance gains over the prior art.

Figure 11:
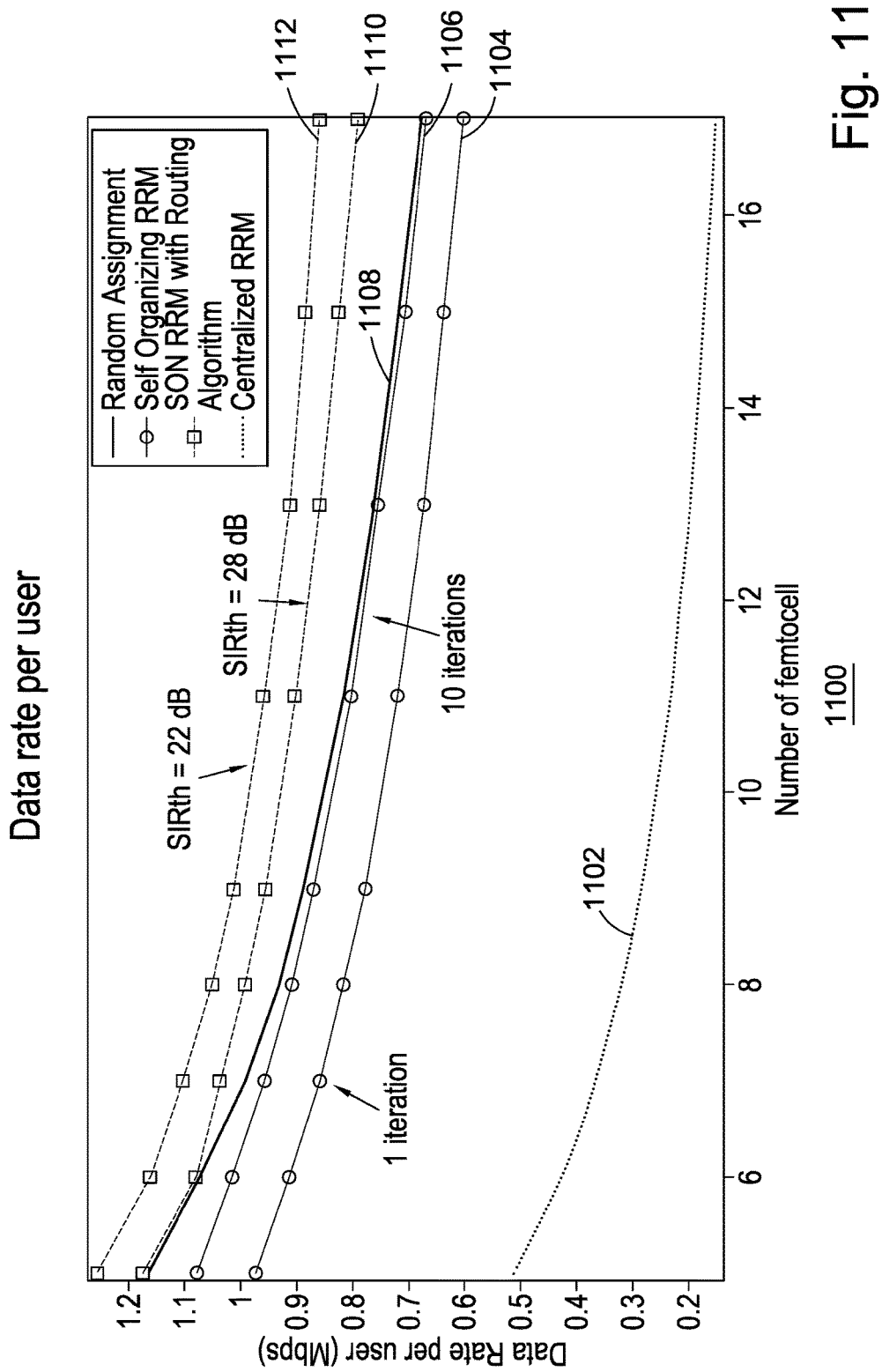
FIG. 11 depicts a graph of variation of data rate per user with number of femtocells.

For example, referring to FIG. 11, there is shown a graph 1100 showing the variation in data rate per user with number of femtocells for a number of subcarrier allocation techniques in which the femtocells were contained within a 60 m by 60 m area and a 100 m by 100 m area. The graph 1100 shows a 1st performance curve 1102 of a prior art central radio resource management technique. It can be appreciated that the data rate per user is relatively low. The graph 1100 shows a pair of performance curves 1104 and 1106 associated with a known self-organising radio resource management technique for 1 and 10 self-organising iterations respectively. It can be appreciated that the performance curves 1104 and 1106 exhibit significantly improved data rates per user as compared to curve 1102. However, it can also be appreciated that the self-organising radio resource management techniques corresponding to curves 1104 and 1106 exhibit poorer performance as compared to a random subcarrier assignment. Performance curve 1108 is associated with such a random subcarrier assignment. Finally, there is shown a pair of performance curves 1110 and 1112 associated with embodiments of the present invention for signal to interference thresholds of 28 dB and 22 dB respectively. It can be appreciated that embodiments of the present invention exhibit a greater than 20% improvement in data rate, especially for higher femtocell densities as compared to the prior art.

Figure 12:
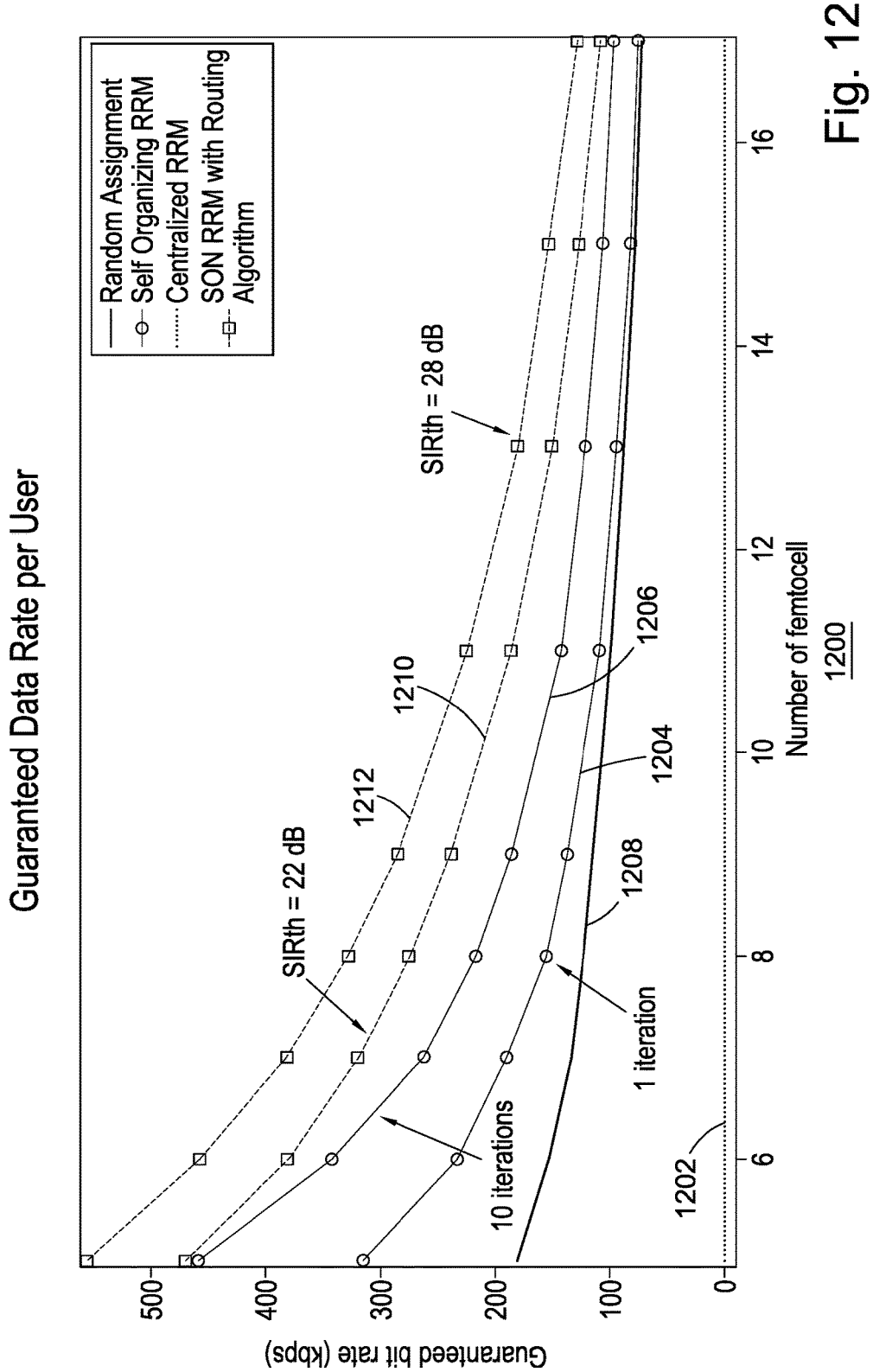
FIG. 12 illustrates variation of guaranteed data rate per user with number of femtocells.
Figure 13:
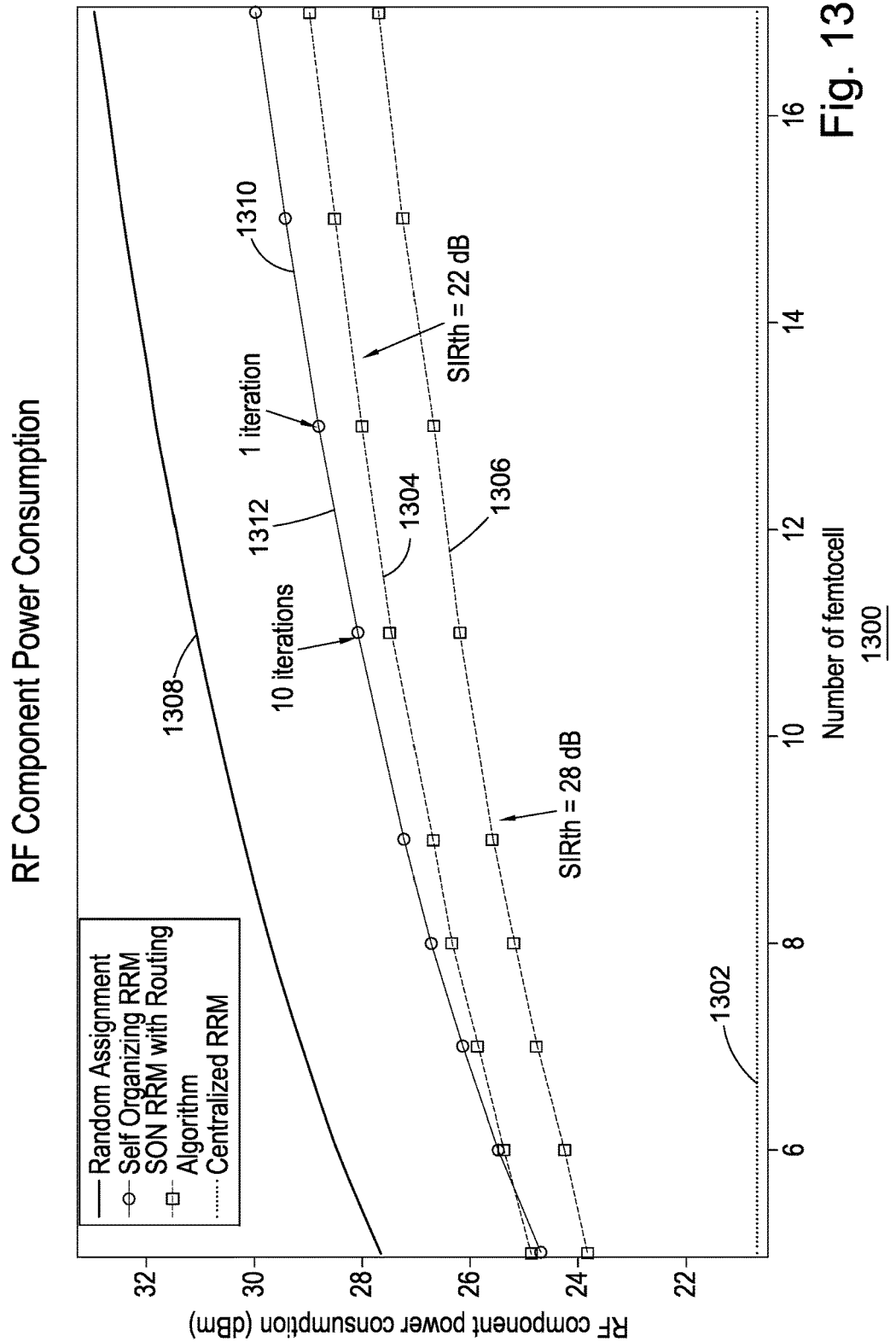
FIG. 13 shows a graph of variation in RF power consumption with number of femtocells.
Figure 14:
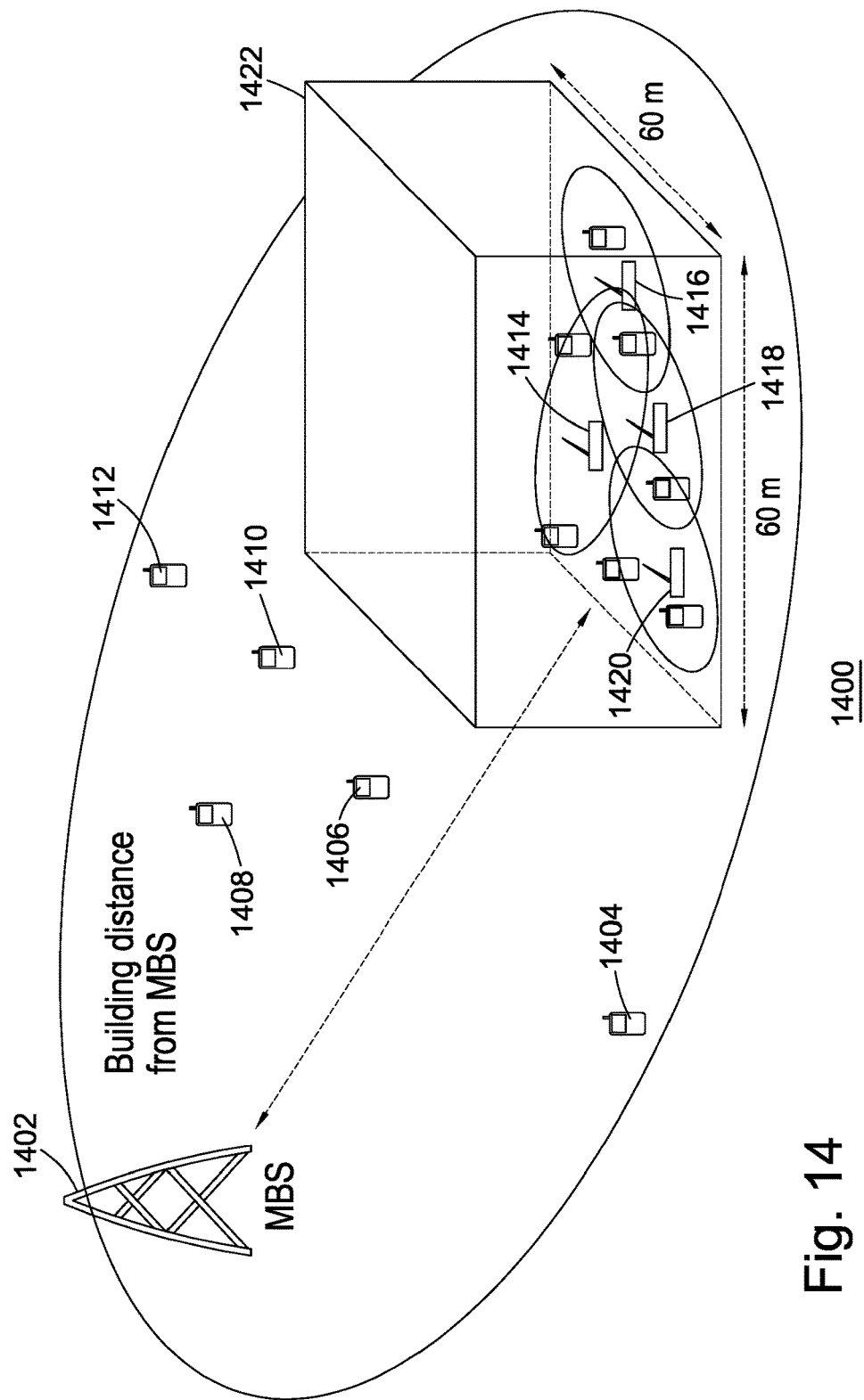
FIG. 14 shows a heterogeneous network comprising a macrocell and a femtocell cluster operating according to an embodiment of the present invention.

Referring to FIG. 12, there is shown a graph 1200 showing the variation in guaranteed data rate per user with number of femtocells for a number of subcarrier allocation techniques in which the femtocells were contained within a 60 m by 60 m area and a 100 m by 100 m area. The graph 1200 shows a 1st performance curve 1202 of a prior art central radio resource management technique. It can be appreciated that the guaranteed data rate per user is zero. The graph 1200 shows a pair of performance curves 1204 and 1206 associated with a known self-organising radio resource management technique for 1 and 10 self-organising iterations respectively. It can be appreciated that the performance curves 1204 and 1206 exhibit significantly improved data rates per user as compared to curve 1202. In contrast to the performance curves shown in FIG. 11, it can be appreciated that the self-organising radio resource management techniques corresponding to curves 1104 and 1106 exhibit better performance as compared to a random subcarrier assignment. Performance curve 1208 is associated with such a random subcarrier assignment. Finally, there is shown a pair of performance curves 1210 and 1212 associated with embodiments of the present invention for signal to interference thresholds of 28 dB and 22 dB respectively. It can be appreciated that embodiments of the present invention exhibit a greater than 50% improvement in guaranteed data rate for higher femtocell densities as compared to the prior art and a more than 300% improvement in guaranteed data rate improvement for lower femtocell densities. Referring to FIG. 13, there is shown a graph 1300 showing the variation in RF power consumption with number of femtocells for a number of subcarrier allocation techniques in which the femtocells were contained within a 60 m by 60 m area and a 100 m by 100 m area. The graph 1300 shows a 1st performance curve 1302 of a prior art central radio resource management technique. It can be appreciated that there is no change in power consumption. The graph 1300 shows a pair of performance curves 1304 and 1306 associated with a known self-organising radio resource management technique for 1 and 10 self-organising iterations respectively. It can be appreciated that the performance curves 1204 and 1206 correspond to significantly higher power consumptions. It can be appreciated that the self-organising radio resource management techniques corresponding to curves 1304 and 1306 exhibit better performance as compared to a random subcarrier assignment. Performance curve 1308 is associated with such a random subcarrier assignment. Finally, there is shown a pair of performance curves 1310 and 1312 associated with embodiments of the present invention for signal to interference thresholds of 28 dB and 22 dB respectively. It can be appreciated that embodiments of the present invention exhibit a 2 dB or 37% improvement in power saving in a 100 m by 100 m area and a 5 dB or 69% power saving at higher femtocell densities as compared to the random subcarrier assignment technique and a 1 dB to 2 dB improvement as compared to the prior art self-organising radio resource management technique over lower to higher femtocell densities. FIG. 14 illustrates a simulation scenario 1400 of embodiments of the invention within the context of a heterogeneous network comprising a macrocell base station 1402, having a number of users 1404 to 1412, and a number of femtocells 1414 to 1420 serving respective users within a given area 1422. In the illustrated embodiment, the given area is a 60 m by 60 m area. The figure depicts seven indoor users for purposes of clarity only. The simulation assumed 20 femtocell users. The simulation parameters were as follows 20 femtocell users, and cases in which 5 and 10 femtocells were used the macrocell base station transmit power for outer users was 20 W the macrocell base station transmit power for inner users was 2 W the femtocell transmit powers were 100 mW and MIMO was used to improve performance—a space-time block code MIMO was used with two transmitters and one receiver.

Figure 15:
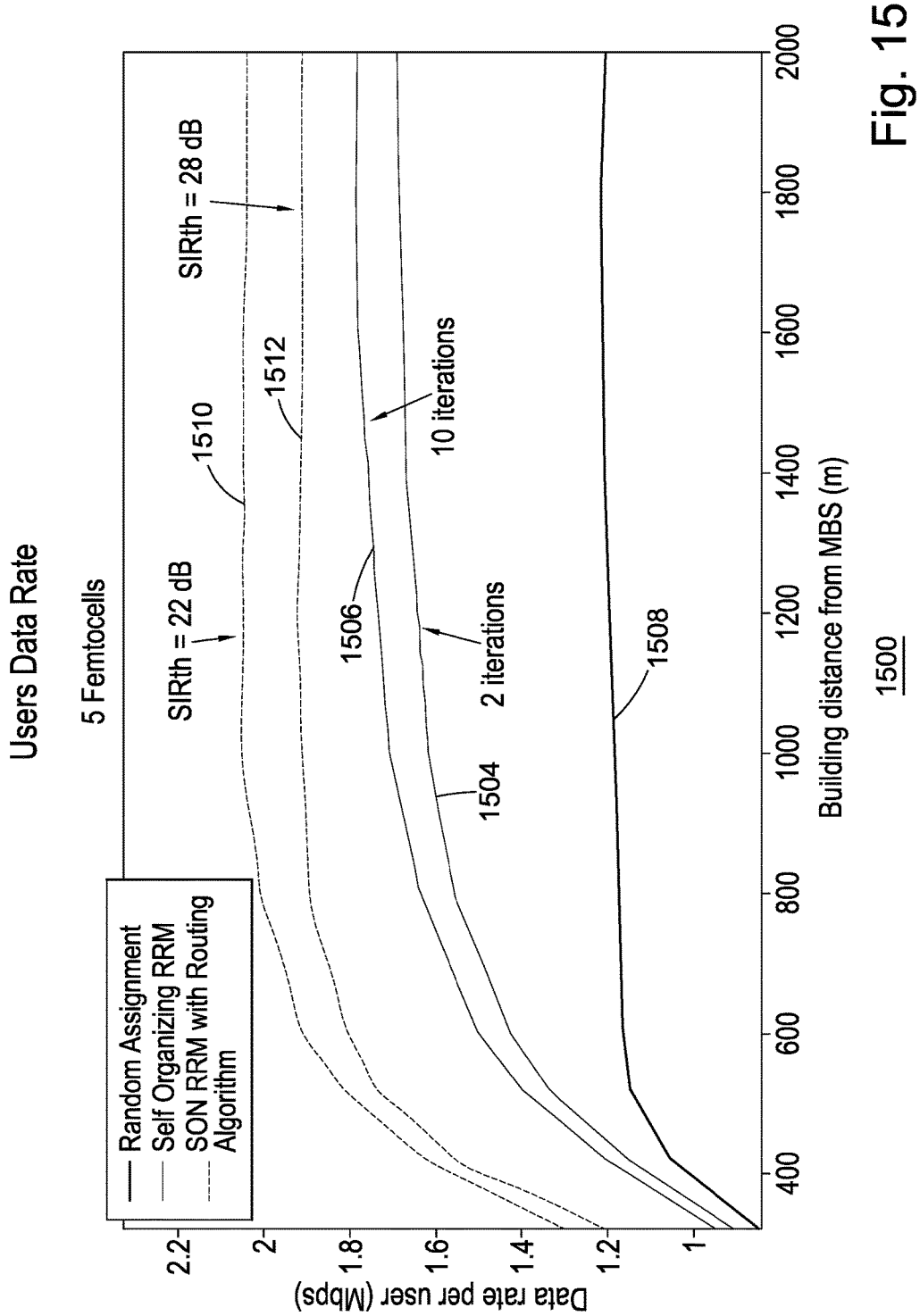
FIG. 15 depicts performance curves showing the variation in data rate per user with number of femtocells within the context of the heterogeneous network.
Figure 17:
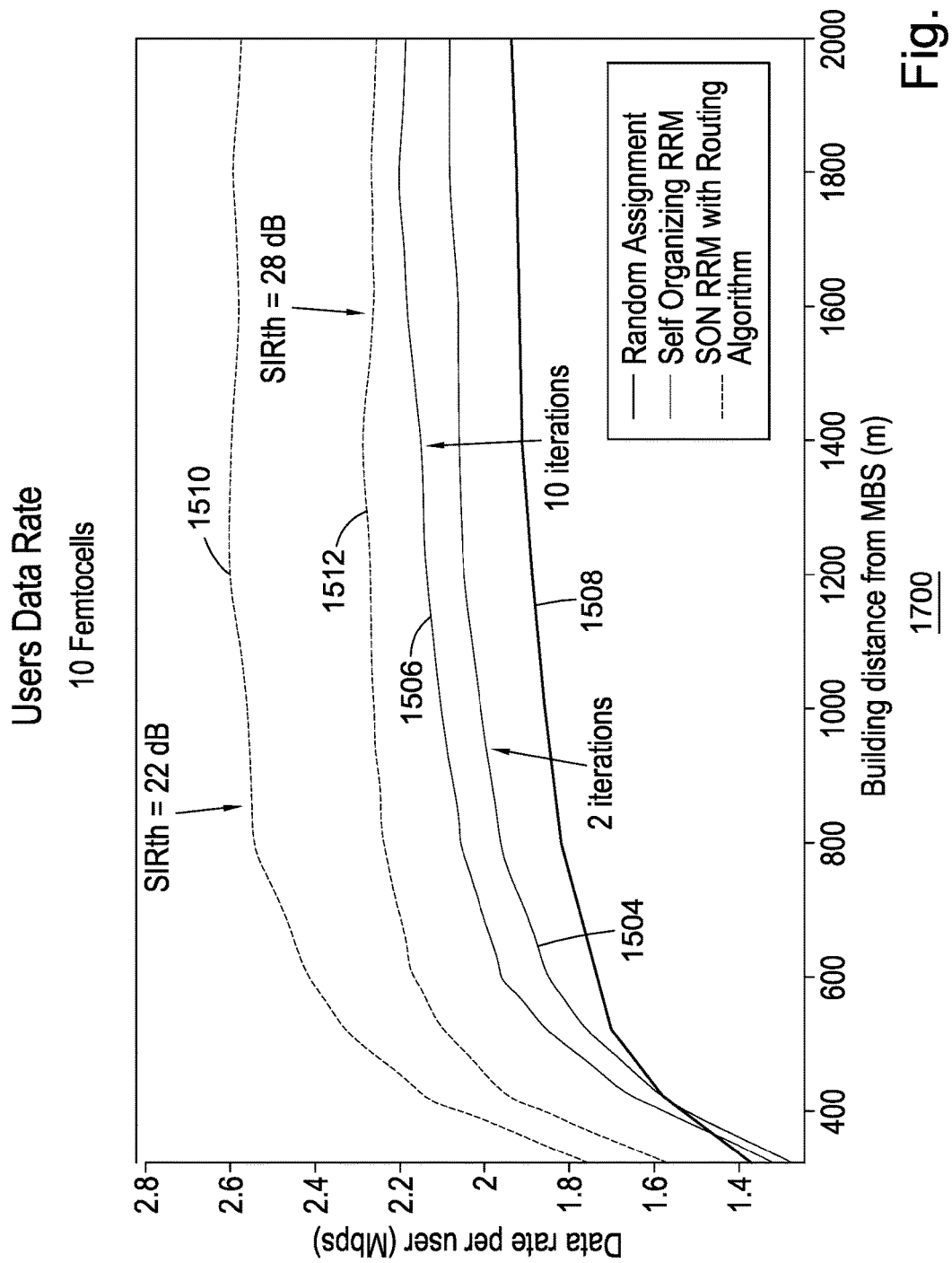
FIG. 17 shows performance curves demonstrating the variation in data rate per user with number of femtocells.

FIG. 15 shows a graph 1500 of the variation of user data rate with distance of the femtocell service area 1422 from the macrocell base station for a 5 femtocell situation. A first pair of performance curves 1504 and 1506 associated with a prior art self-organising radio resource management technique for 2 and 10 iterations respectively is shown as achieving moderate data rates, which are better than randomly assigned subcarriers; the performance curve for which is shown at 1508. A second pair of performance curves 1510 and 1512 is illustrated for embodiments of the present invention for signal to interference thresholds of 22 dB and 28 dB respectively. It can be appreciated that embodiments of the present invention exhibit up to a 70% performance improvement when operating under a macrocell as compared to the prior art. The simulations used 5 and 10 femtocells. FIG. 17 shows the same curves for a 10 femtocell situation.

Figure 16:
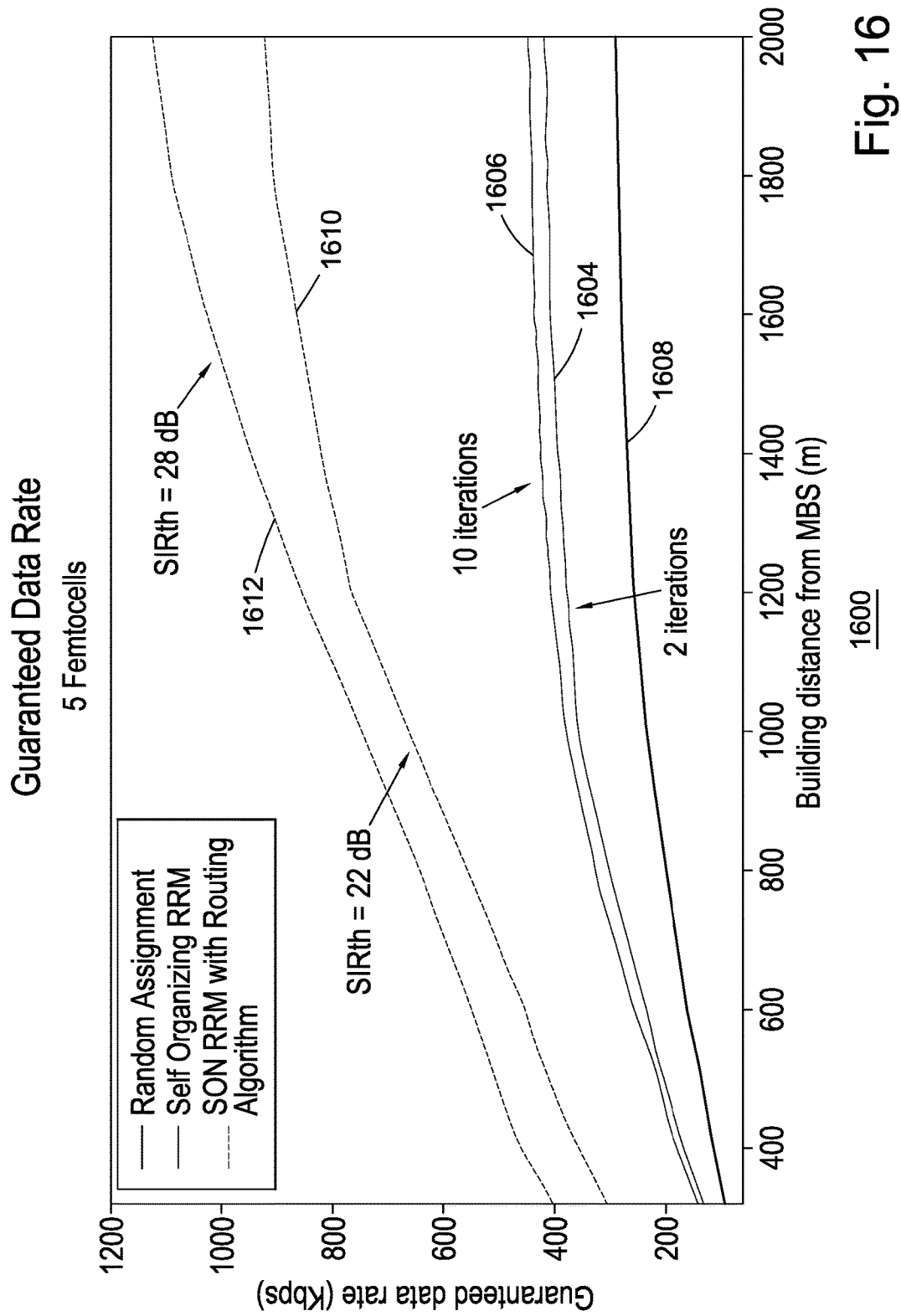
FIG. 16 shows performance curves demonstrating the variation in guaranteed data rate per user with number of femtocells within the context of the heterogeneous network.
Figure 18:
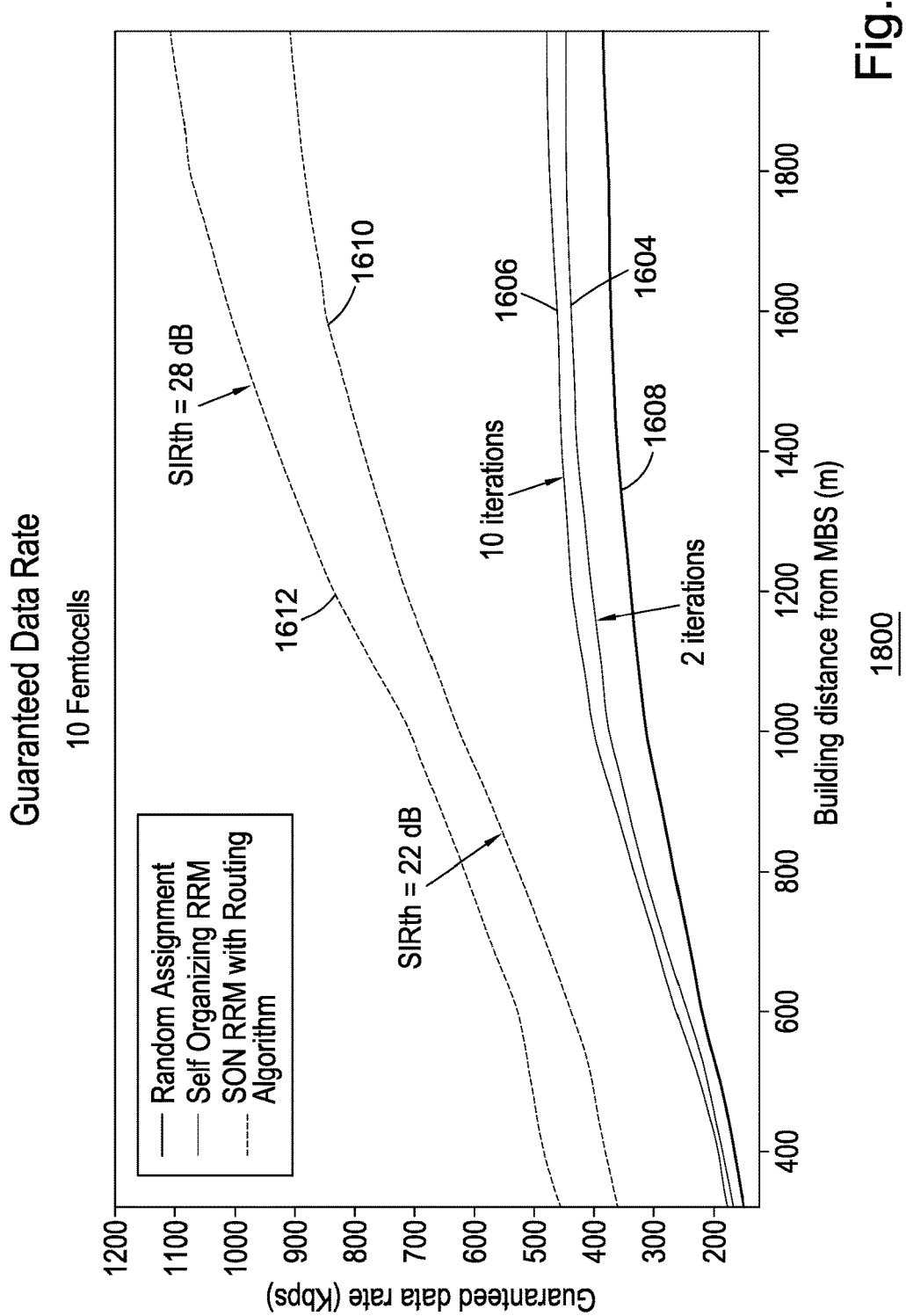
FIG. 18 depicts performance curves showing the variation in guaranteed date rate per user with number of femtocells.

FIG. 16 shows a graph 1600 of the variation of guaranteed user data rate with distance of the femtocell service area 1422 from the macrocell base station. A first pair of performance curves 1604 and 1606 associated with a prior art self-organising radio resource management technique for 2 and 10 iterations respectively is shown as achieving moderate data rates, which are better than randomly assigned subcarriers; the performance curve for which is shown at 1608. A second pair of performance curves 1610 and 1612 is illustrated for embodiments of the present invention for signal to interference thresholds of 22 dB and 28 dB respectively. It can be appreciated that embodiments of the present invention exhibit up to a 70% performance improvement when operating under a macrocell as compared to the prior art. FIG. 18 shows the same curves for a 10 femtocell situation.

It will be appreciated that the one or more of the above embodiments apply the interference management or mitigation technique at the level of the base stations and below, that is, at the level of the macrocell and below, in particular, the base stations and below. The foregoing is undertaken globally by, for example, the femtocell management system 112. However, embodiments are not limited thereto. Embodiments can be realised in which a more local view of at least one of a prevailing interference and resource planning can be taken in addition or as an alternative to the above one or more embodiments.

Figure 19:
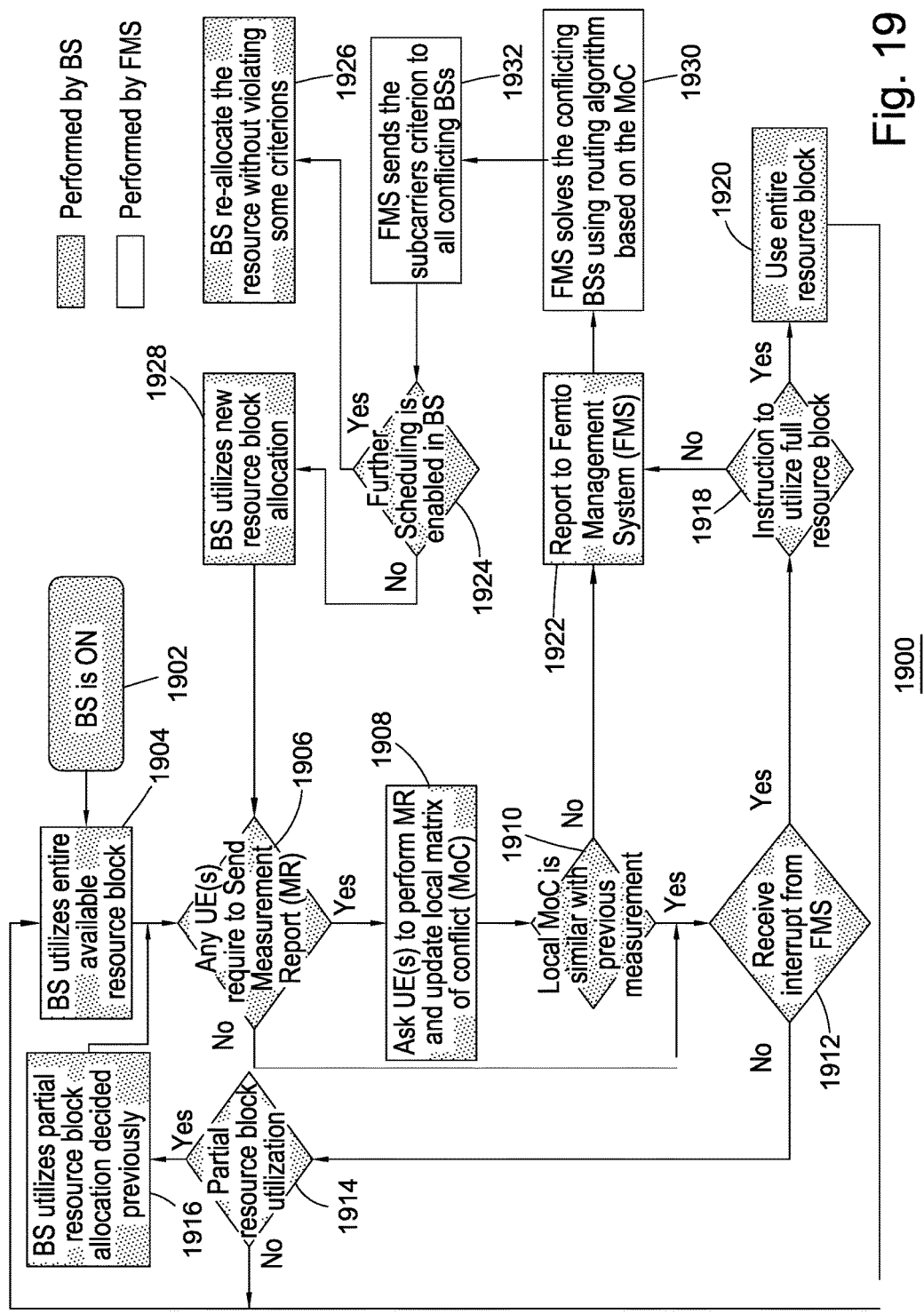
FIG. 19 shows a flow chart of radio resource management.

Therefore, referring to FIG. 19, there is shown a flowchart 1900 of a further resource allocation algorithm. A base station, such as, for example, a femtocell base station, is powered on at step 1902. The base station is arranged to utilise the whole of an available resource block at step 1904. A determination is made, at step 1906, regarding whether or not any of the user equipment associated with that base station are required to send a measurement report. If that determination at step 1906 is positive, the base station is arranged, at step 1908, to request one or more than one user equipment to prepare and submit a measurement report to the base station for use in updating at least one of a local matrix of conflicts that is held and managed by the base station and a global matrix of conflicts that is held and managed by another entity such as, for example, the femtocell management system 112. Following submission of the measurement report and/or updating of the matrix of conflicts, a determination is made, at step 1910, regarding whether or not there is a predetermined correlation between the most recently constructed local matrix of conflicts or measurement report, and one or more than one previously constructed local matrix of conflicts or measurement reports. If that determination is positive, processing moves to step 1912.

Returning to step 1906, if none of the user equipment are required to send a measurement report, control transfers to step 1912.

Referring to step 1912, a determination is made regarding whether or not an interrupt has been received from a base station management system such as, for example, the femtocell management system 112. If the determination and step 1912 is negative, it is determined, at step 1914, whether or not partial resource block utilisation can be realised. If partial resource block utilisation can be realised, the powered on base station utilises that partial resource block in supporting wireless communications at step 1916. The partial resource block will have been determined in advance. The partial resource block corresponds to a subset of the available, or whole, of the radio resource such as, for example, a subset of the available spectrum. If the determination at step 1914 is negative, control passes to step 1904 whereby the base station attempts to utilise the whole of the available radio resource such as, for example, the whole of the resource block.

If the determination at step 1912 is positive, it is determined, at step 1918, whether or not instructions have been received to utilise the full resource block to support wireless communications. If that determination is positive, control passes to step 1920, where the base station is adapted to use, the whole of the resource block. It can be appreciated that step 1920 is functionally equivalent to step 1904 such that control could be passed from step 1918 directly to step 1904.

If it was determined, at step 1910, that there is an insufficient degree of correlation between a currently constructed matrix of conflicts and a previously constructed matrix of conflicts, or if it was determined, at step 1918, that the base station had not received instructions to utilise the full resource block, a report to that effect is sent, at step 1922, to the base station management system such as, for example, the femtocell management system 112.

The base station management system 112, responds, at step 1930, by resolving conflicting resource block allocation between conflicting base stations based on a global matrix of conflicts associated with all base stations under control of the base station management system 112 The base station management system 112, at step 1932, then sends the subcarriers criterion to all conflicting base stations; the subcarriers criterion comprises an allocation of radio resources, which is received by the base station at step 1924. For example, after receiving the allocated radio resources (subcarriers) from the base station management system, the base station might wish to perform rescheduling, which involves re-allocating the subcarriers based on user equipment need. The decision making criterion or information is an indication of all of the forbidden subcarriers for a particular user equipment due to use by neighbouring or other user equipment.

It is determined, at step 1924, whether or not scheduling is enabled within the base station. If scheduling is enabled within the base station, the base station is arranged, at step 1926, to reallocate the resource without violating one or more than one criterion. Thereafter, the base station utilises the newly allocated resource block to support wireless communications at step 1928. If scheduling is not enabled at the base station, the base station utilises the newly allocated resource block at step 1928.

Thereafter, control returns to step 1906.

Embodiments are provided in which a base station, to apply or utilise any scheduling criterion, such as maximum fairness, proportional fairness, proportional rate constraint, can autonomously distribute their radio resource, such as their allocated resource block, between their user equipment independently providing that the allocating base station does not violate a respective local matrix of conflicts.

It can be appreciated that the global matrix of conflicts is a collection of local matrices of conflict from base stations under the control of the base station management system 112 and, in particular, from conflicting base stations under the control of the base station management system 112. Therefore, it will be appreciated that the local matrix of conflicts a given base station, $T_m$, is given by $\zeta_m$ as described above and the global matrix of conflicts is given by $\zeta \in \Re^{Z \times M}$, where Z is the total number of users and M is the total number of base stations under control of the base station management system 112

To address any issues that might arise, such as, for example, bottlenecks in the event of extremely high density scenarios, the allocation of radio resource can be done on the basis of user clustering. Therefore, embodiments provide for the following set of allocation rules:

1. Grouping the small cells

Figure 20:
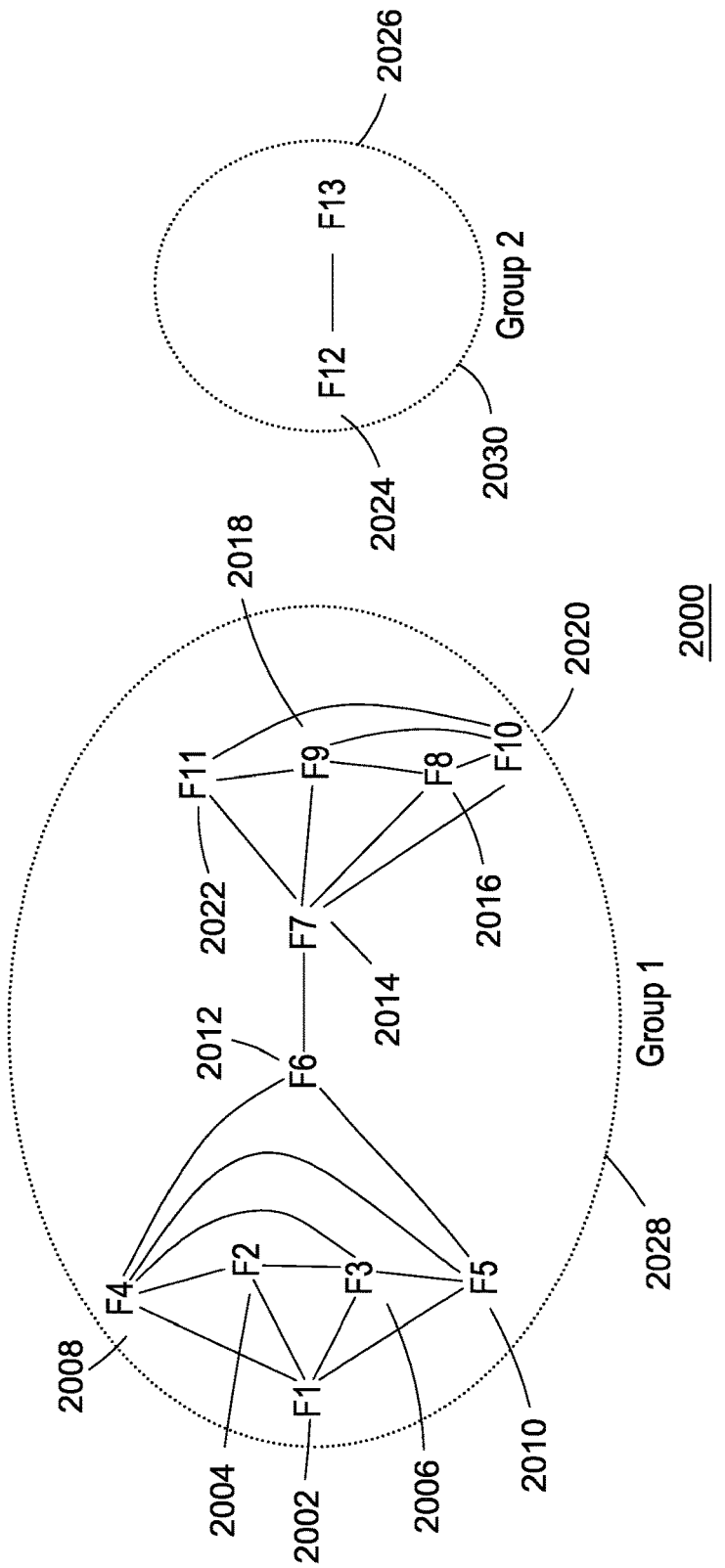
FIG. 20 illustrates two groups of clusters of interfering carriers.

Base stations are grouped based on a connectivity graph 2000 as shown in FIG. 20. Referring to FIG. 20, the connectivity graph 2000, a number of base stations F1 2002 to F13 2026 are shown as being connected. Embodiments are preferably realised in which the base stations are femtocell base station or at least comprise one or more than one femtocell base station. However, embodiments are not limited to the base stations being femtocell base stations. Embodiments can be realised in which any and all embodiments described herein in which the base station is another type of entity with responsibility for at least one of allocating and using radio resource such as, for example, a macrocell base station, a microcell base station, a picocell base station or a user equipment having that responsibility.

The base stations have been grouped into a first group 2028 and a second group 2030. It can be appreciated that the first group 2028 comprises 11 base stations; namely F1 2002 to F11 2022. The virtual connectivity graph 2000 provides an indication of the base stations 2002 to 2026 that are interfering with one another's radio resource allocation or at least have the potential to interfere with one another's radio resource allocation. For example, it can be appreciated that the first base station F1 2002 is indicated as having the potential to interfere with, or be subject to interference from, four other base stations; namely, base stations F2 2004 to F5 2010. The second group 2030 comprises only two base stations 2022 and 2024 that are interfering with or at least have potential to interfere with one another's radio resource allocation.

For simplicity, the focus will be on the first group, even though what follows is equally applicable to the second group 2020.

2. Ranking

In contrast to the above embodiments, ranking is undertaken on the basis of the users within a group according to one or more than one criterion. Based on the example given in FIG. 20, the number of affected users, $S_m$, and an initial number, $N_{fm}$, of subcarriers for each base stations users are given in table 1 below, assuming a total number, N, of subcarriers is 30:

TABLE 1

|  | F1 | F2 | F3 | F4 | F5 | F6 | F7 | F8 | F9 | F10 | F11 |
|---|---|---|---|---|---|---|---|---|---|---|---|
| $S_m$ | 4 | 6 | 5 | 3 | 5 | 4 | 7 | 6 | 4 | 4 | 6 |
| $N_{fm}$ | 7 | 5 | 6 | 10 | 6 | 7 | 4 | 5 | 7 | 7 | 5 | where $S_m$ is given by $$S_m = \Sigma_{z=1}^{Z}\{\zeta(z,m) \sim w_m\} + \Sigma_{z=1}^{Z}\{\zeta(z,m) \sim w_c\} \quad (4)$$

and $N_{fm}$ is given by $N_{fm} = \lfloor N/S_m \rfloor$.

A determination is then made regarding the number of subcarriers per user equipment, $N_{u_z}$, which, as above, is set to equal a respective serving base station's initial subcarrier allocation, $N_{fm}$. Therefore, using the global matrix of allocations shown below in table 2

TABLE 2

| Global Matrix of conflicts (MoC), $\zeta$, examples | | | | | | | | | | | | | |
|---|---|---|---|---|---|---|---|---|---|---|---|---|---|
| Users | F1 | F2 | F3 | F4 | F5 | F6 | F7 | F8 | F9 | F10 | F11 | F12 | F13 |
| A | 2 | 1 | 0 | 0 | 0 | 0 | 0 | 0 | 0 | 0 | 0 | 0 | 0 |
| B | 2 | 1 | 1 | 0 | 0 | 0 | 0 | 0 | 0 | 0 | 0 | 0 | 0 |
| C | 0 | 2 | 0 | 0 | 0 | 0 | 0 | 0 | 0 | 0 | 0 | 0 | 0 |
| D | 0 | 2 | 0 | 0 | 0 | 0 | 0 | 0 | 0 | 0 | 0 | 0 | 0 |

TABLE 2-continued

Global Matrix of conflicts (MoC), ζ, examples

| Users | F1 | F2 | F3 | F4 | F5 | F6 | F7 | F8 | F9 | F10 | F11 | F12 | F13 |
|---|---|---|---|---|---|---|---|---|---|---|---|---|---|
| E | 0 | 1 | 2 | 0 | 0 | 0 | 0 | 0 | 0 | 0 | 0 | 0 | 0 |
| F | 0 | 0 | 2 | 0 | 0 | 0 | 0 | 0 | 0 | 0 | 0 | 0 | 0 |
| G | 0 | 1 | 1 | 2 | 1 | 0 | 0 | 0 | 0 | 0 | 0 | 0 | 0 |
| H | 1 | 0 | 0 | 2 | 0 | 0 | 0 | 0 | 0 | 0 | 0 | 0 | 0 |
| I | 0 | 0 | 0 | 0 | 2 | 0 | 0 | 0 | 0 | 0 | 0 | 0 | 0 |
| J | 1 | 0 | 1 | 0 | 2 | 0 | 0 | 0 | 0 | 0 | 0 | 0 | 0 |
| K | 0 | 0 | 0 | 0 | 2 | 1 | 0 | 0 | 0 | 0 | 0 | 0 | 0 |
| L | 0 | 0 | 0 | 1 | 0 | 2 | 0 | 0 | 0 | 0 | 0 | 0 | 0 |
| N | 0 | 0 | 0 | 0 | 1 | 2 | 1 | 0 | 0 | 0 | 0 | 0 | 0 |
| O | 0 | 0 | 0 | 0 | 0 | 1 | 2 | 1 | 0 | 0 | 0 | 0 | 0 |
| P | 0 | 0 | 0 | 0 | 0 | 0 | 2 | 1 | 0 | 0 | 1 | 0 | 0 |
| Q | 0 | 0 | 0 | 0 | 0 | 0 | 1 | 2 | 1 | 0 | 0 | 0 | 0 |
| R | 0 | 0 | 0 | 0 | 0 | 0 | 0 | 2 | 0 | 1 | 0 | 0 | 0 |
| S | 0 | 0 | 0 | 0 | 0 | 0 | 0 | 2 | 0 | 0 | 0 | 0 | 0 |
| T | 0 | 0 | 0 | 0 | 0 | 0 | 1 | 0 | 2 | 0 | 0 | 0 | 0 |
| U | 0 | 0 | 0 | 0 | 0 | 0 | 0 | 0 | 2 | 0 | 1 | 0 | 0 |
| V | 0 | 0 | 0 | 0 | 0 | 0 | 0 | 0 | 1 | 2 | 0 | 0 | 0 |
| W | 0 | 0 | 0 | 0 | 0 | 0 | 1 | 1 | 0 | 2 | 1 | 0 | 0 |
| X | 0 | 0 | 0 | 0 | 0 | 0 | 0 | 0 | 0 | 0 | 2 | 0 | 0 |
| Y | 0 | 0 | 0 | 0 | 0 | 0 | 1 | 0 | 0 | 0 | 2 | 0 | 0 |
| Z | 0 | 0 | 0 | 0 | 0 | 0 | 0 | 0 | 0 | 1 | 2 | 0 | 0 |
| AA | 0 | 0 | 0 | 0 | 0 | 0 | 0 | 0 | 0 | 0 | 0 | 2 | 0 |
| BB | 0 | 0 | 0 | 0 | 0 | 0 | 0 | 0 | 0 | 0 | 0 | 2 | 1 |
| CC | 0 | 0 | 0 | 0 | 0 | 0 | 0 | 0 | 0 | 0 | 0 | 0 | 2 |

Therefore, the initial number of subcarriers per user equipment based on table 2 is shown in table 3 below:

| | $N_{u_z}$ | Serving base station |
|---|---|---|
| A | 5 | F1 |
| B | 5 | F1 |
| C | 5 | F2 |
| D | 5 | F2 |
| E | 5 | F3 |
| F | 6 | F3 |
| G | 5 | F4 |
| H | 7 | F4 |
| I | 6 | F5 |
| J | 6 | F5 |
| K | 6 | F5 |
| L | 7 | F6 |
| N | 4 | F6 |
| O | 4 | F7 |
| P | 4 | F7 |
| Q | 4 | F8 |
| R | 5 | F8 |
| S | 5 | F8 |
| T | 4 | F9 |
| U | 5 | F9 |
| V | 7 | F10 |
| W | 4 | F10 |
| X | 5 | F11 |
| Y | 4 | F11 |
| Z | 5 | F11 |

Table 3—Initial number of subcarriers per user based on Table 1

Using table 2, the user equipment are ranked or sorted according to a predetermined criterion. In a preferred embodiment, the predetermined criterion is number of initial subcarriers per user, $N_{u_z}$, which gives the following ranking: (N, O, P, Q, T, W, Y)→(A, B, C, D, E, G, R, S, U, X, Z)→(F, I, J, K)→(L, H, V).

3. Establish the Matrices of Allocations:
   a. Allocated carriers matrix, A.
      A temporary allocated carriers matrix is established.
   b. Partial forbidden carriers matrix, Φ.
      A binary matrix that indicates the forbidden radio resources due to a need to preserve or implement an orthogonality requirement between neighbouring base stations' user equipment as indicated by the global matrix of conflicts shown above in table 2 is established.
   c. Entire forbidden carriers matrix, Θ.
      A binary matrix that indicates the forbidden radio resources due to orthogonality requirement between neighbouring base stations' users as indicated by the above matrix of conflicts shown above in table 2 and the same base station users is established.
   d. Group priority carrier matrix, $P_g$.
      A binary matrix governing an initial priority matrix for each group is established.
   e. Full priority carrier matrix, P.
      A binary matrix that indicates the priority subcarriers is established.

4. Cluster users within a group:

Optionally, based on the sorted order, the users with the same initial number of subcarriers $N_{u_z}$, are clustered. The clustering is done based on the virtual connectivity graph shown in FIG. 2 Embodiments are arranged to only cluster user equipment with the same $N_{u_z}$ and that are served by the same base stations and/or served by different base stations that are directly connected.

In the example shown in Table 2, that is, the matrix of conflicts, the result of clustering is shown in table 4 below.

TABLE 4

Results of Clustering

| $N_{u_z}$ | Users | | | | | | | Base Stations Involved | | | | Cluster |
|---|---|---|---|---|---|---|---|---|---|---|---|---|
| 4 | N | O | P | Q | T | S | W Y | F7 | F8 | F9 | F10 | Cluster 1 |
| 5 | A | B | C | D | E | G |   | F1 | F2 | F3 | F4 | Cluster 2 |
|   | R | S | U | X | Z |   |   | F8 | F9 | F11 |    | Cluster 3 |
| 6 | F | I | J | K |   |   |   | F3 | F5 | F6 |    | Cluster 4 |
| 7 | L | H |   |   |   |   |   | F4 | F6 |    |    | Cluster 5 |
|   | V |   |   |   |   |   |   | F10 |   |    |    | Cluster 6 |

5. According to a user equipment's rank, starting with user 1, allocate its users equipment a predetermined number of subcarriers.

Ensuring that the subcarriers allocated to each user equipment are spaced in frequency to achieve some frequency diversity.

(Optionally), a base station may send the priority order of each user equipment's subcarriers.

If the users rank involves macro- and/or microcells, macro- and microcells, such a base station's users will always have the highest priority compared to pico- and femtocell users.

Allocate radio resource to two or more clusters that have the same $N_{u_z}$ in parallel.

6. Update the Matrix of allocations.

Subcarriers allocated to one user equipment become forbidden for all other user equipment within a certain proximity of that user equipment. It will be appreciated that that proximity reflects the scope for interference between users. Therefore, the matrix of conflicts can be used in determining which subcarriers are forbidden for given user.

Only update the priority and forbidden subcarriers for a user when a corresponding cluster is related, based on the virtual connection, to the previously allocated users.

7. Once a user has been allocated radio resource, the next user in the rank is allocated subcarriers, taking into consideration the updated Matrix of Allocations.

The Matrix of Allocations is updated every time a new user is allocated subcarriers.

After all users have been allocated a predefined number of subcarriers, allocate the rest of the subcarriers to the inner users, which are defined as any user equipment that is served by $T_m$ and gives $\Sigma_{c=1}^{M_c}\zeta(a, c)=0$ for $c \neq m$; that is, a user equipment that is not subject to interference.

8. Repeat step 5 until all users in all BSs are allocated.
9.

Figure 21:
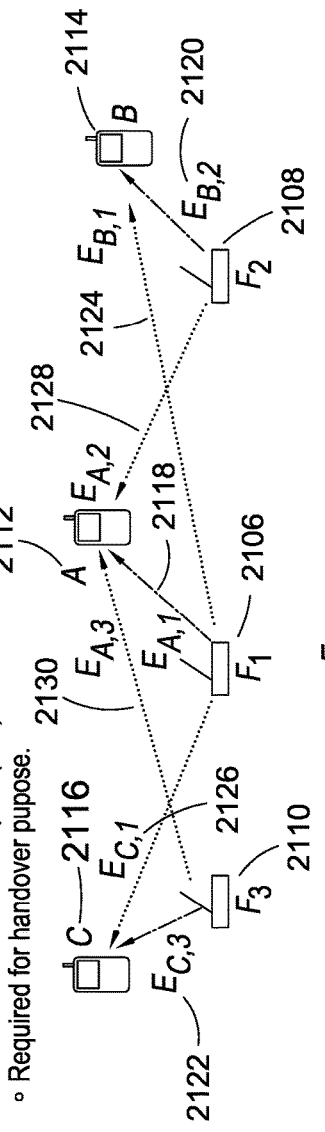
FIG. 21 shows construction of a matrix of conflicts.

Referring to FIG. 21, there is shown a view 2100 of a prevailing interference scenario 2102 and a corresponding matrix of conflict 2104. In the interference scenario 2102, three base stations 2106 to 2110 are shown as serving respective user equipment 2112 to 2116. The base stations can be, for example, femtocell base stations, in particular, LTE femtocell base stations, but could also be other types of base stations such as, for example, at least one of macrocell base stations, microcell base stations, picocell base stations and femtocell base stations taken jointly and severally in any and all combinations.

The base stations 2106 to 2110 are shown as using respective radio resources 2118 to 2122 to communication with their respective user equipment. Therefore, it can be appreciated that a first base station 2106 communicates with its respective user equipment 2112 using a first radio resource, $E_{A,1}$ 2118. A second base station 2108 communications with its user equipment 2114 using a second radio resource $E_{B,2}$. A third base station 2110 communicates with is user equipment 2116 using a third radio resource $E_{C,3}$ 2112. In general, the labelling convention for a signal, intentional signal or an interference signal, associated with a given base station X, and a given user equipment Y, is given by $E_{X,Y}$. In the scenario 2102, intentional signals are represented by a dot-dash arrow whereas interference signals are represented by a dotted arrow. Therefore, it can be appreciated that there is interference between the first base station 2106 and the second 2114 and third 2116 user equipment in the form of respective interference signals $E_{B,1}$ 2124 and $E_{C,1}$ 2126. There is also interference between the second base station 2108 and the first user equipment 2112 in the form of a respective interference signal $E_{A,2}$ 2128. Finally, there is interference between the third base station 2110 and the first user equipment 2122 in the form of respective interference signal $E_{A,3}$ 2130.

Although the some of the above signals have been defined as interference signals whether or not they represent problematical interference signals is determined using a predetermined threshold value, $\gamma_{th}$. Therefore, the first user equipment 2112, for example, is deemed as being subject to problematical interference is the ratio of its intentional signal, $E_{A,1}$ 2118 to an interference signal, $E_{A,2}$ 2128 is less than a predetermined respective threshold, $\gamma_{th}$, that is, $$\frac{E_{A,1}}{E_{A,2}} < \gamma_{th}.$$

Taking into account the complete scenario shown in FIG. 21, a matrix of conflicts 2104 can be constructed that represents the interference, exceeding one or more than one respective threshold, to which a given user equipment is subjected. Therefore, it can be appreciated that the first user equipment 2112 is subject to interference from the second base station 2108 associated with interference signal $E_{A,2}$, but is not subject to sufficient interference, that is, interference exceeding a respective threshold, from a signal associated with the third base station 2110, that is, signal $E_{A,3}$ 2130. Similar matrices of conflict can be constructed for the other user equipment 2114 and 2116 according to whether or not received or detected signals exceed respective thresholds. It will be appreciated that all base stations request their user equipment to measure and report the received signal strengths from neighbouring base stations, that is, from base stations whose transmissions can be detected and in respect of which associated received signal strengths can be determined.

An example of applying the foregoing will be given with respect to FIG. 22 et seq.

Figure 22:
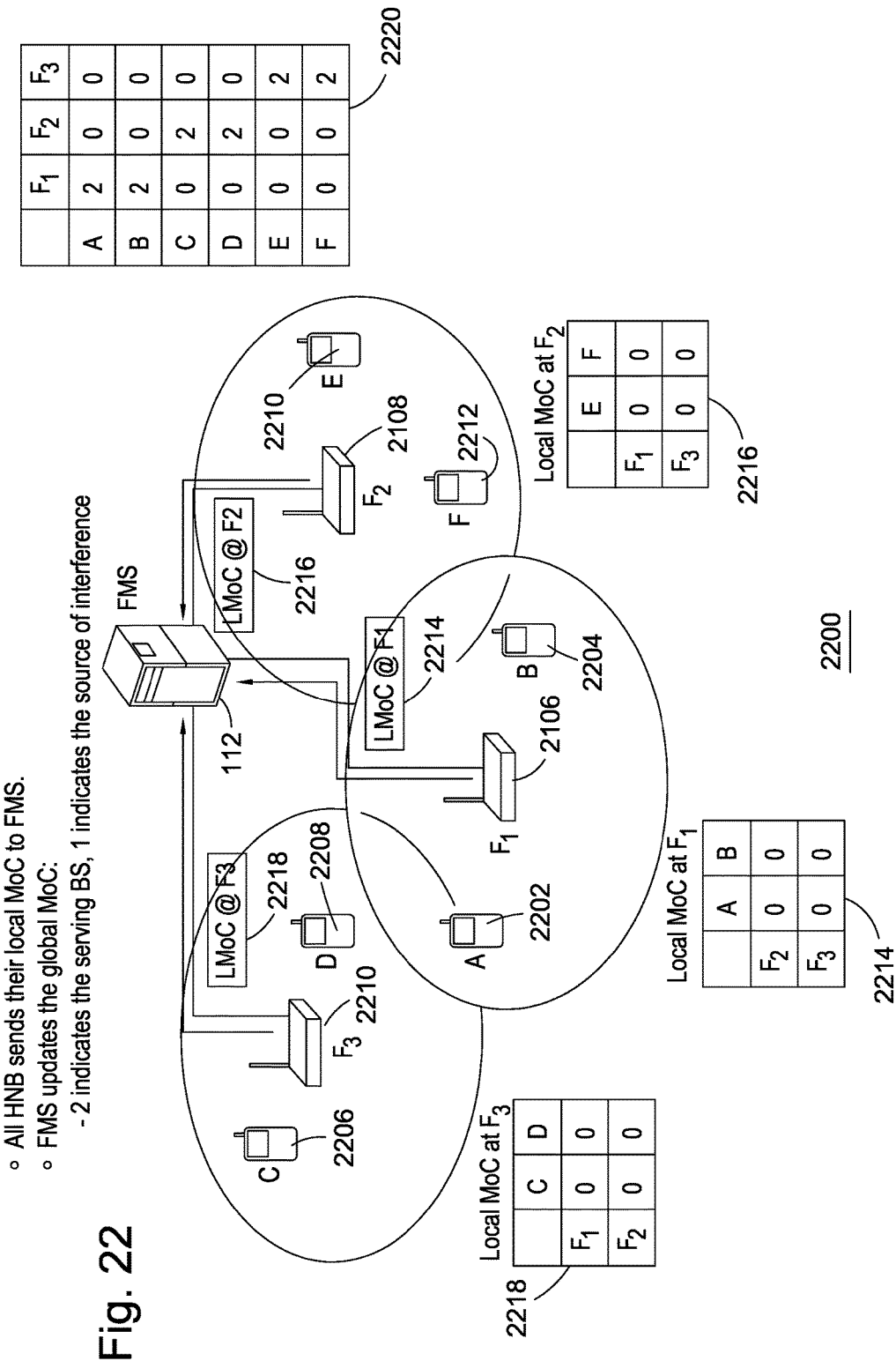
FIG. 22 depicts construction of a global matrix of conflict from local matrices of conflict.

Referring to FIG. 22, there is shown a network 2200 comprising first to third base stations such as, for example, the first 2106 to third 2110 femtocells described above and a number of user equipment 2202 to 2212. The first base station 2106 is illustrated as servicing two user equipment; namely, user equipment A 2202 and user equipment B 2204. The second base station 2108 is serving user equipment E 2210 and user equipment F 2212. The third base station 2110 I shown as serving user equipment C 2206 and user equipment D 2208. Each base station 2106 to 2110 requests its respective user equipment to submit a measurement report that provides an indication of the signal strengths of signals originating from other entities such as, for example at least one of other base stations and other user equipment.

Each base station 2106 to 2110 constructs a local matrix of conflict that provides an indication of interference levels experienced by respective user equipment that exceed respective thresholds. A first local matrix of conflicts 2214' is constructed by the first base station 2106. It can be appreciated that the first matrix of conflicts 2214' indicates that user equipment A 2202 is not experiencing any interference, which exceeds at least one respective threshold, from the second 2108 and third 2110 base stations. The same applies to user equipment B 2204. A second local matrix of conflicts 2216 is constructed at the second base station 2108, which indicates that neither user equipment E 2210 nor user equipment F 2212 are experiencing interference from the first 2106 and third 2110 base stations that exceeds at least one respective interference threshold. Similarly, a third matrix of conflicts 2218 is constructed at the third base station 2110 that shows that user equipment C 2206 and user equipment D 2208 are not experiencing interference that exceeds at least one respective threshold from the first 2106 and second 2108 base stations.

Although a common threshold, $\gamma_{th}$, can be used for embodiments, embodiments are not limited thereto. Embodiments can be realised in which a respective threshold is established for each signal detected by a user equipment, or in which selected sets of user equipment use the same threshold, which is different to a threshold used by other selected sets of user equipment. For example, user equipment associated with one base station might have an associated respective threshold, while user equipment associated with another base station might have a different threshold.

It the present embodiment, it will assumed that a common threshold, $\gamma_{th}$, is used to determine whether or not there is interference.

Having constructed local matrices of conflict 2214, 2216 and 2218, those matrices are forwarded to a base station management system, such as, for example, the femtocell management system 112. The FMS 112 collates the local matrices of conflict to produce a global matrix of conflict 2220. Within the global matrix of conflict, 2220 the following nomenclature is used A "2" indicates that respective user equipment is served by a corresponding base station;

A "1" indicates that respective user equipment is subject to interference from a corresponding base station;

A "0" indicates that respective user equipment is not subject to interference from a corresponding base station.

For example, it can be appreciated that user equipment A 2202 is indicated as being served by the first base station F1 2106. The same applies to user equipment B. User equipment C 2206 and D 2208 are indicated as being served by the third base station 2110 and user equipment are indicated as being served by the second base station 2108. It can be appreciated that there is no interference.

Figure 23:
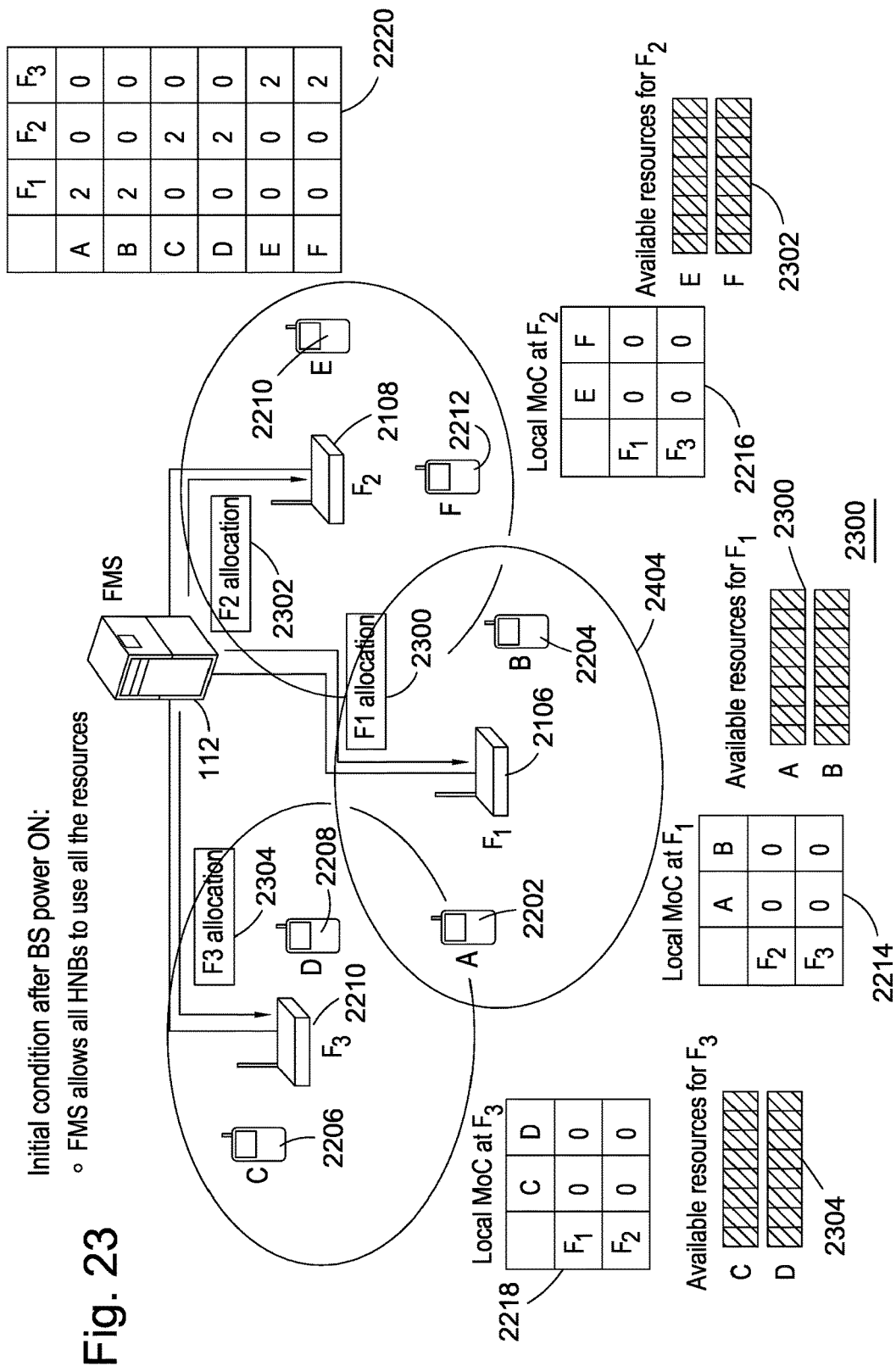
FIG. 23 illustrates radio resource allocation by the base station management system.

Since there is no interference, each user equipment is at liberty to use all of the radio resources such as, for example, a resource block as can be appreciated from FIG. 23, in which the FMS 112, having analysed the global conflict matrix and found that there is no interference, provides a radio resource allocation indication 2300 to 2304 to each base station that their respective user equipment can use all of the radio resources, that is, the whole of a resource block available for use by a base station and its respective user equipment.

A radio resource allocation indication 2300 to 2304 can comprise an indication of the radio resources to be used for communications between a base station and a given user equipment. The allocation is device specific. Alternatively, or additionally, the radio resource allocation indication 2300 to 2304 can be less prescriptive such that, for example, a radio resource such as, for example, a resource block can be indicated as being available for use by a base stations and its respective user equipment with the actual allocation from that radio resource being within the discretion of, that is, under the control of a respective base station.

Figure 24:
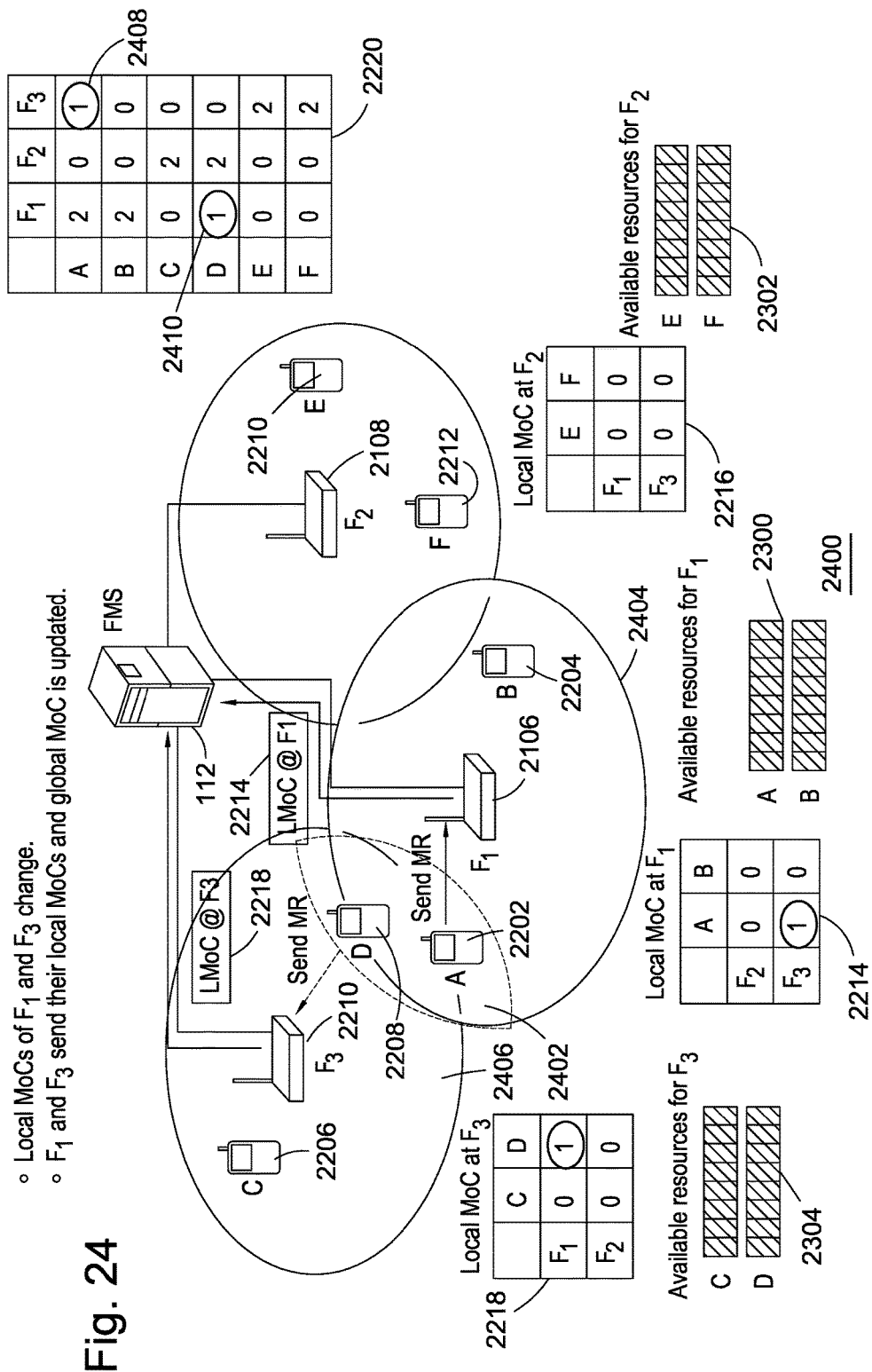
FIGS. 24 to 29 show changing prevailing interference scenarios.

Referring to FIG. 24, there is shown a view 2400 of a change in the interference situation. It can be appreciated that user equipment D 2208 has moved into an area of overlap 2402 between the service areas 2404 and 2406 of base stations F1 2106 and F3 2110. Also, user equipment A 2202 had moved into the same area of overlap 2402. When measurements reports are next sent by the user equipment, user equipment A 2202 will report that it can receive signals from the third base station F3 2110 and user equipment D 2208 will report that it can receive signals from the first base station 2106. Measurement reports to that effect will be sent to respective base stations. The measurement reports from user equipment A 2202 and D 2208 indicate that their interference scenario has changed. It can be appreciated from the first matrix of conflict 2214 that interference exceeding the predetermined threshold is being experienced by the first user equipment A 2202 due to transmissions from the third base station 2110. It can be appreciated from the third matrix of conflict 2218 that interference exceeding the predetermined threshold is being experienced by the first user equipment D 2208 due to transmissions from the first base station 2106. If the change is sufficient to exceed the predetermined threshold, which is assumed to be the case in the present example, then the first base station 2106 sends an updated matrix of conflict 2214 to the base station management system 112 and the third base station 2110 sends an updated matrix of conflict 2218 to the base station management system 112.

The base station management system 112 receives the local matrices of conflict 2214 and 2218 and updates the global matrix of conflicts 2220 to indicate that the first base station A 2202 is experiencing interference from the third base station 2110 and that user equipment D 2208 is experiencing interference from the first base station 2106, as can be seen from respective entries 2408 and 2410.

Figure 25:
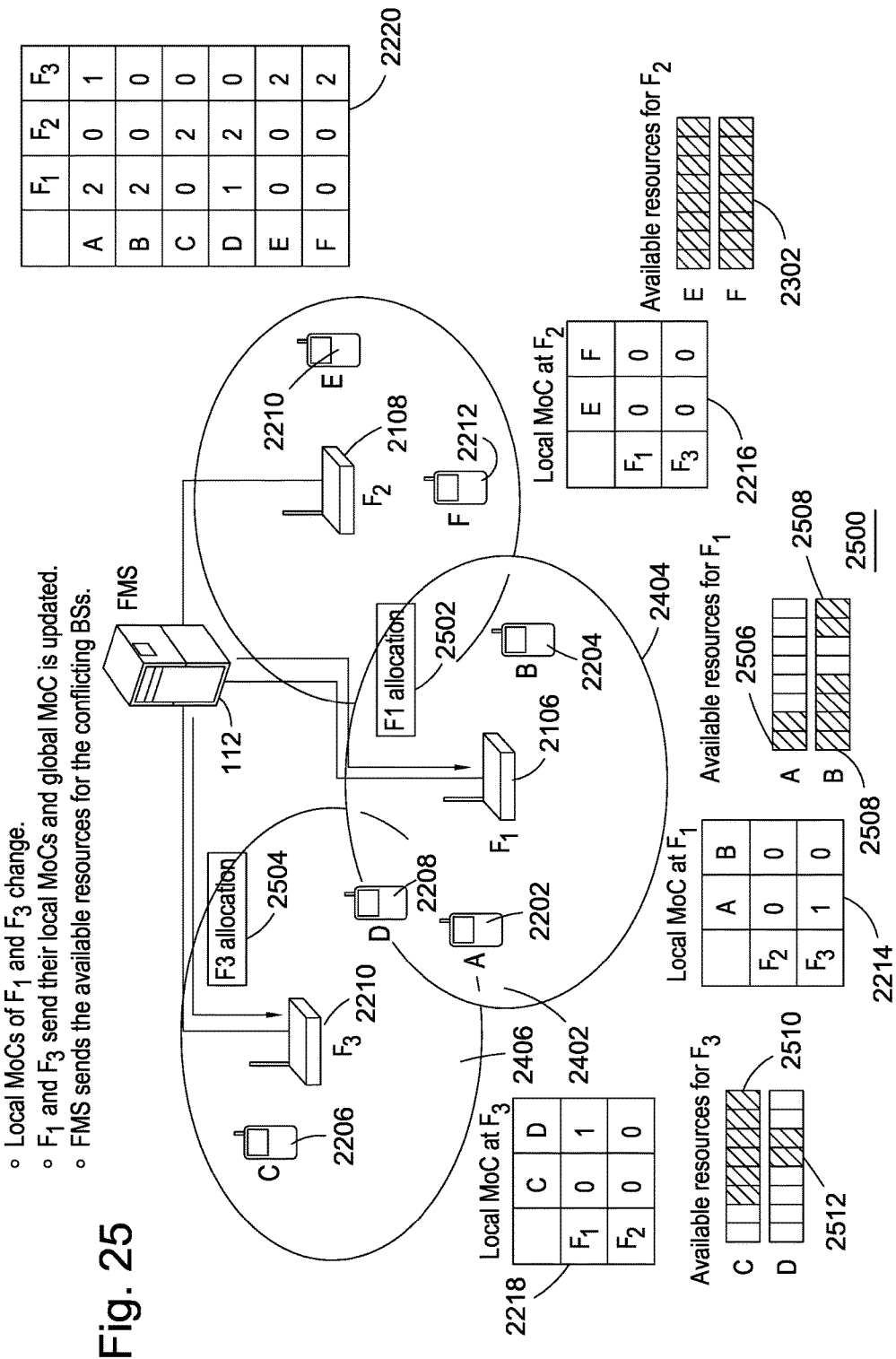

Referring to FIG. 25, there is shown a view 2500 of the effect of the above interference scenario on the radio resource allocation. The base station management system 112 applies the algorithm described above with reference to, for example, FIGS. 2 and 19, to rank the base stations in order of how much interference is being caused by or how much interference is being experienced by a base station's user equipment and allocates radio resources from a worst interference scenario to least interference scenario. In essence, embodiments allocate radio resources in order of extent of interference from worst to least. Therefore, it can be appreciated that the radio resources 2502 and 2504 are allocated by the base station management system 112 to the first 2106 and third 2110 base stations respectively. The respective radio resource allocations 2502 and 2504 are adapted to use radio resource such as, for example, at least one of carriers and time slots, that do not interfere with one another, that is, the interference scenario is resolved by appropriate reallocation of radio resources. It can be appreciated that the radio resource allocated to the first base station 2106 for use by its user equipment A 2202 and user equipment B 2204 allow user equipment A 2202 to use a first allocation 2506 of radio resource. It can be appreciated that a second allocation 2508 of radio resources has been assigned for user by or with the second user equipment 2204. It can also be seen that the radio resources 2504 allocated to the third base station 2110 comprise radio resources that do not overlap with or have anything in common with the radio resources allocated to the first base station 2106. It can be appreciated that the total radio resources is still available to the second base station F2 2108. It is only the use of the whole set of available radio resources that is managed from an interference perspective such that base stations associated with interference use respective subsets of the radio resources, which are preferably mutually exclusive subsets. It can be seen that the radio resources assigned for use by the third base station 2206 comprise radio resources 2510 for use with user equipment C and radio resources 2512 for use with user equipment D 2208. It can be seen that of the subset of radio resources allocated for use by the first base station 2106, the user equipment A 2202 that is subject to the most interference is allocated fewer radio resources 2506 as compared to the user equipment B 2204 that is not subject to any, or that is subject to less, interference. The radio resources are allocated preferably least to most in order of greatest to least interference. It can be appreciated that there is a reciprocal relationship between radio resource allocation and interference. The radio resources are allocated according to need. In the present embodiments, the need related at least to mitigating interference.

Figure 26:
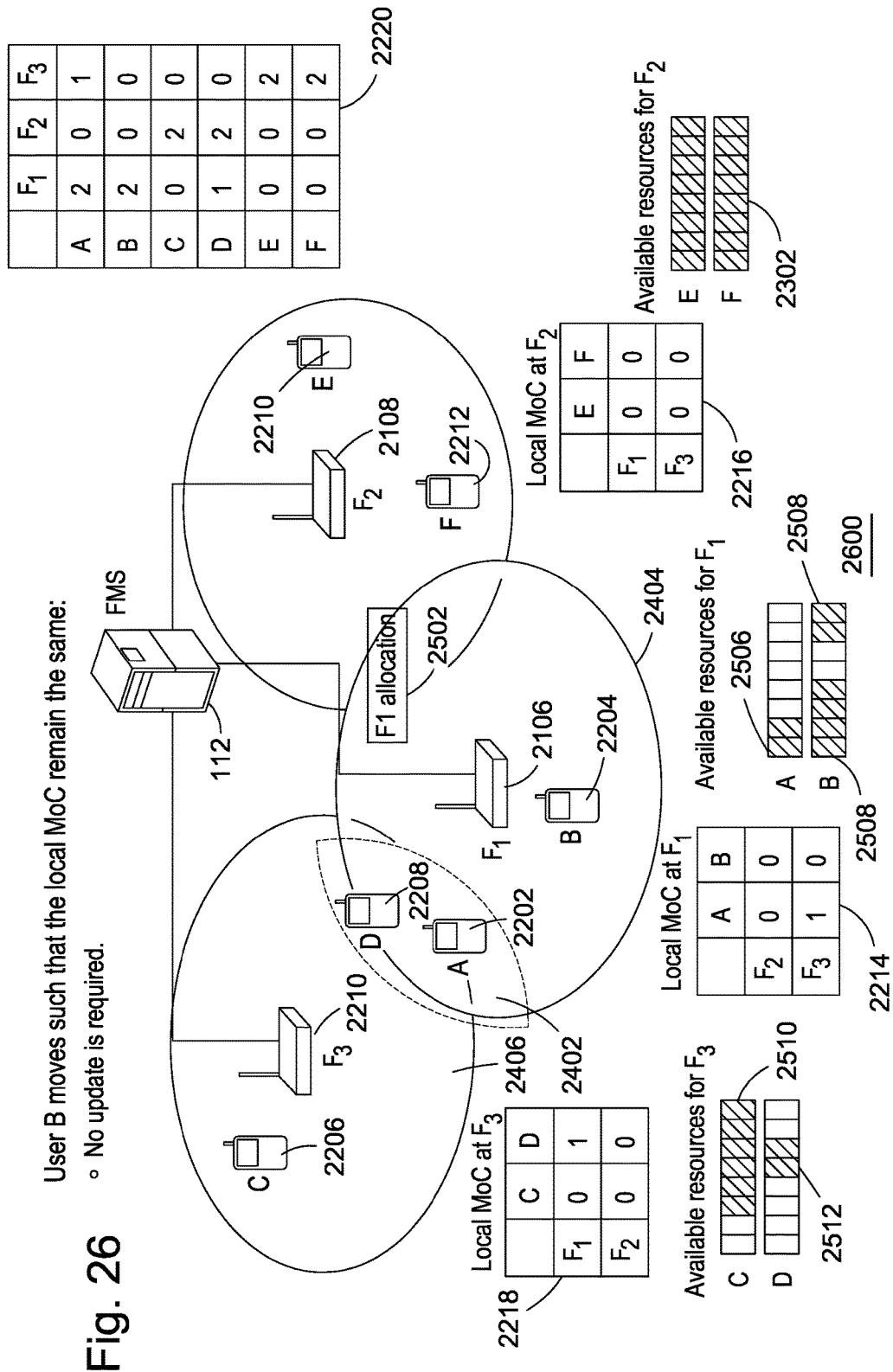

FIG. 26 shows a view 2600 of change in the radio environment. It can be appreciated that user equipment B 2204 has moved within the service area 2404 of the first base station 2106. However, that movement has not given rise to a change in the prevailing interference scenario. Therefore, any measurement report sent by the user equipment B 2204 will be unchanged or at least insufficiently different, that is, below a respective threshold, that there would not be a change in the local matrix of conflicts 2214.

Figure 27:
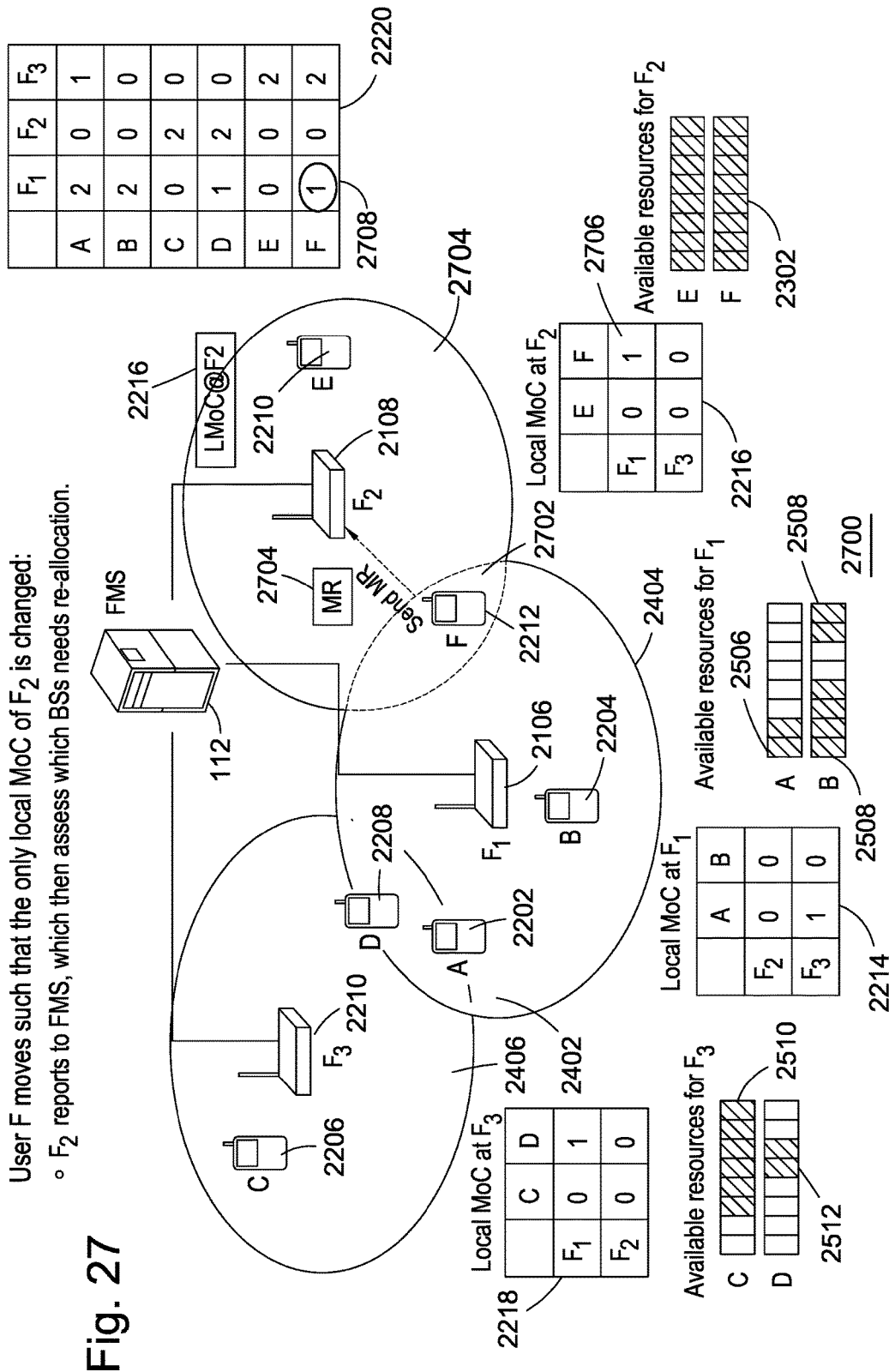

Referring to FIG. 27, there is shown a further view 2700 of a still further changed radio environment. It can be appreciated that user equipment F 2212 has moved into an area of overlap 2702 between the service areas 2404 and 2704 of the first 2106 and second 2108 base stations. In a measurement report 2704 sent from user equipment F 2212 to the second base station 2108, there will be an indication that user equipment can receive at least one signal from the first base station 2106. Therefore, the second base station 2108 will updates its local matrix of conflicts 2216 to indicate that user equipment F 2212 is experience, or at least has the potential to experience, interference associated with, or from, the first base station 2106, as can be appreciated from the "1" 2706 within the local matrix of conflicts. The updated local matrix of conflicts 2706 is sent to the base station management system 112.

The base station management system 112 uses the new information regarding the interference scenario as experienced by user equipment F 2212 to update the global matrix of conflicts 2220, as can be appreciated from the updated entry 2708 concerning user equipment F 2212 and the first base station 2106.

Figure 28:
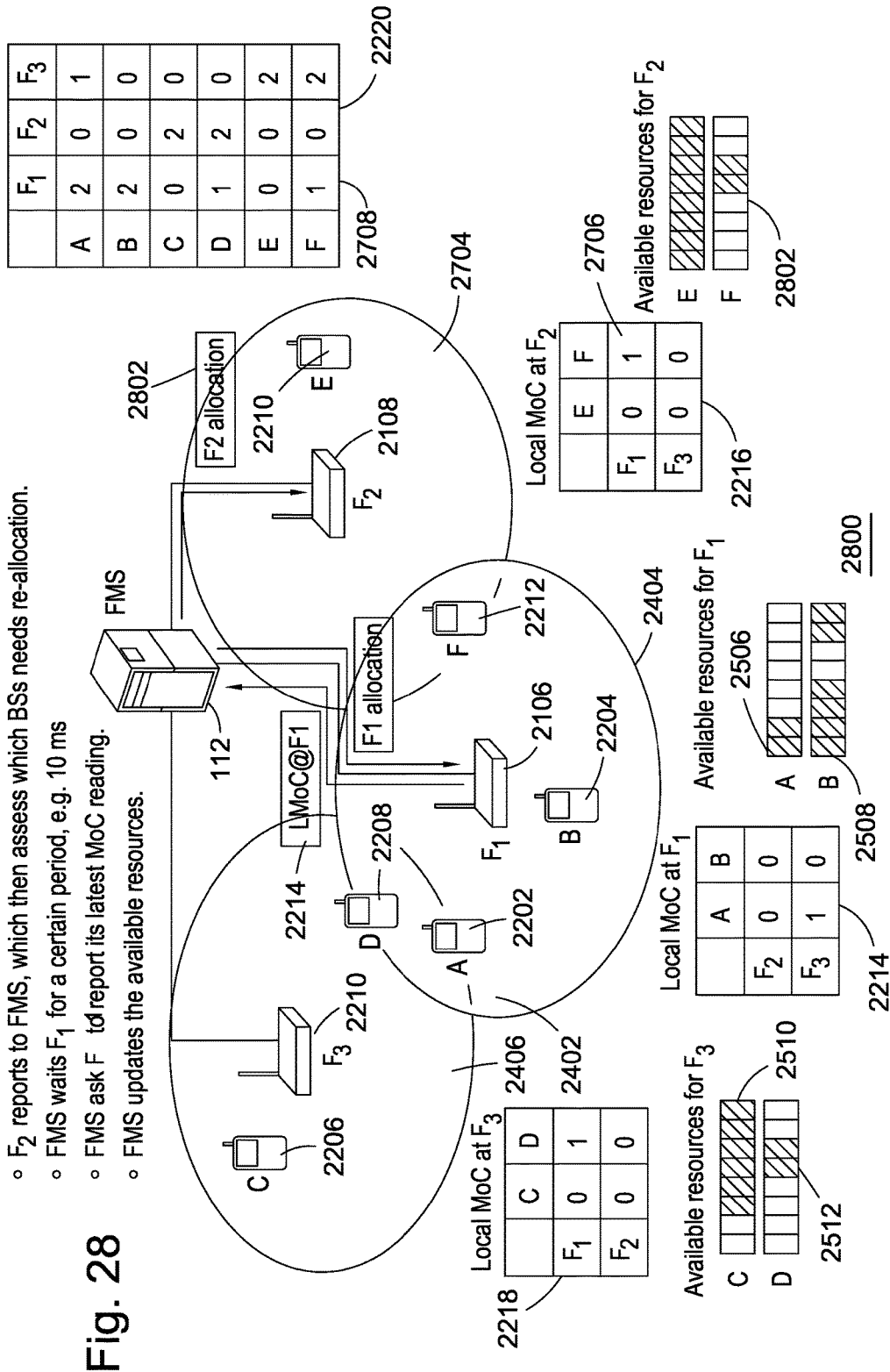

Referring to FIG. 28, there is shown a view 2800 of the actions taken in response to user equipment F 2212 reporting its interference. The base station management system, optionally, waits a predetermined period of time such as, for example, 10 ms, before requesting an update from the first base station 2106 regarding its local matrix of conflicts 2214, which will not have changed in the present case, since the interference experienced by the first base station's 2106 user equipment 2202 and 2204 has not changed. The first base station 2106 reports its local matrix of conflicts 2214 in response to the request from the base station management system 112. In response to receiving at least the local matrix of conflicts 2216 from the second base station 2108, and preferably, also the local matrix of conflicts 2214, the base station management system applies or takes the steps defined by, for example, at least FIG. 2 or FIG. 19, to mitigate the effects of any interference by appropriate radio resource allocation. It can be appreciated that the potential for interference between user equipment F 2212 and the first base station 2106 needs resolving or avoiding. Consequently, the base station management system 112 determined whether or not mutually exclusive subsets of the total radio resource are available such that user equipment F 2212 and the first base station 2106 do not, or at least do have the potential to, interference with one another.

It can be appreciated from FIGS. 23 and 25 that the radio resources 2302 assigned to user equipment F 2212, that is, the user equipment experiencing the most interference in the scenario shown in FIG. 27, overlap with the radio resources 2508 assigned to the first base station 2106, in particular, for use with user equipment B 2204. The base station management system 112 resolves the conflict, or potential for conflict, by assigning to the first 2106 and second 2108 base stations respective radio resources subsets of the total available radio resources. The respective subsets are mutually exclusive such that there is no overlap between the radio resources 2508 assigned to the first base station 2106 for use with user equipment B 2204 and the radio resources 2802 assigned to the second base station 2108 for use with user equipment F 2212.

Figure 29:
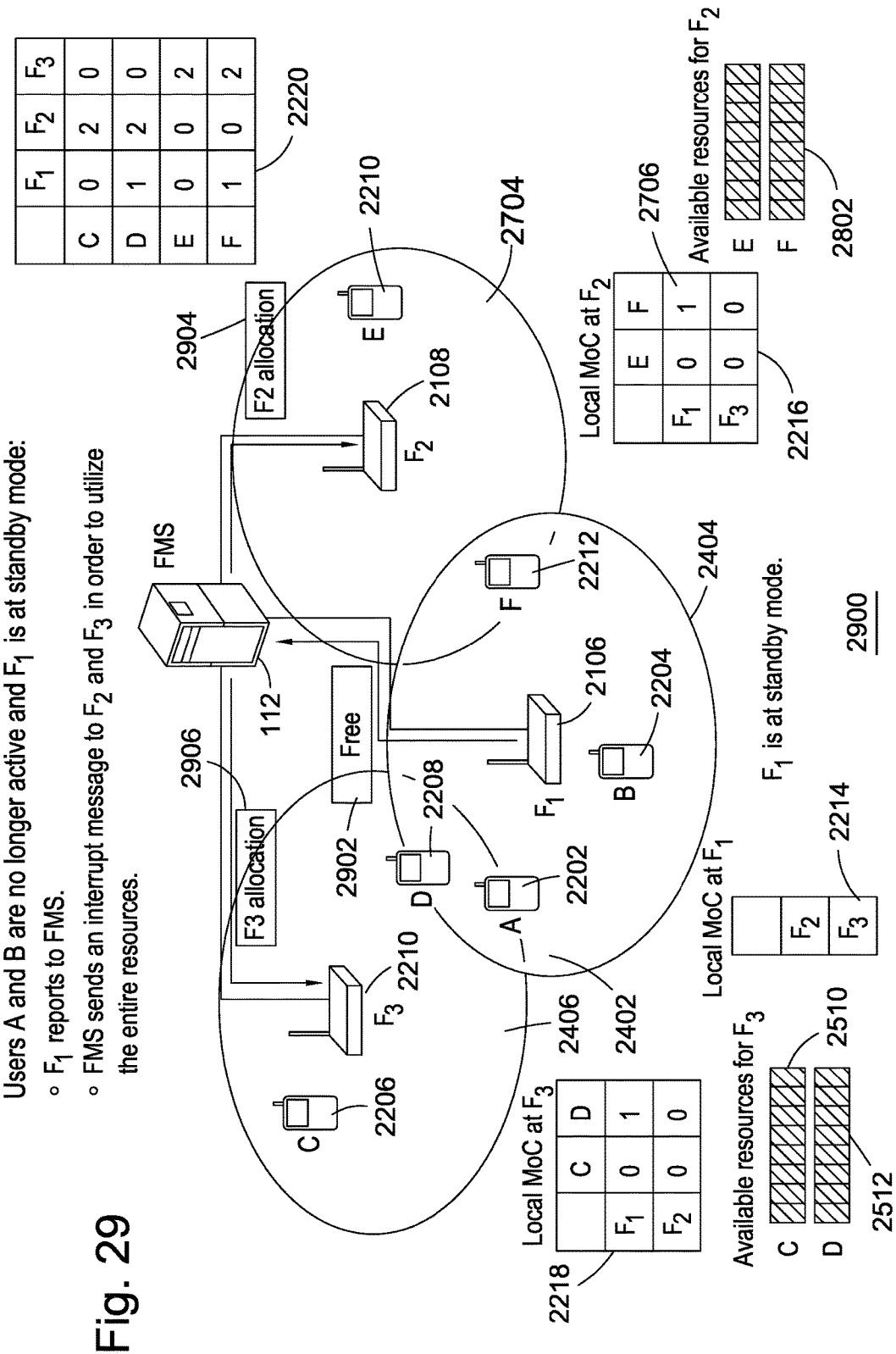

Referring to FIG. 29, there is shown a view 2900 of a prevailing radio environment in which user equipment A 2202 and B 2204 are no longer active. Embodiments are arranged such that when a base station such as, for example, the first base station 2106, has no active user equipment, it relinquishes its radio resource. The first base station 2106 sends an indication 2902 to the base station management system 112 that the radio resources previously allocated to the first base station 2106 are no longer needed. The first base station 2106 preferably updates its local matrix of conflicts 2214, which shows that it has no user equipment that are subject to interference, because it has no active user equipment. Preferably, such a base station 2106 enters a stand-by mode. Optionally, the latest local matrix of conflicts can be sent to the base station management system 112.

In response to receiving an indication 2902 that a base station has at least one of no active user equipment or has entered a stand-by mode, the base management system updates its global matrix of conflicts 2220. The global matrix of conflicts 2220 no longer has entries for user equipment A 2202 and B 2204. The global matrix of conflicts 2220 has entries for active user equipment such as, user equipment C 2206 to F 2210. The base station management system 112 analyses the global matrix of conflicts 2220 to determine whether or not it is possible to alter the radio resource allocations of the second 2108 and third 2110 base stations. It will be appreciated that formerly, the first and second base stations used respective subsets of the total available radio resource to mitigate interference and the first and third base stations used respective subsets of the total available radio resource to mitigate interference. An analysis of the global matrix of conflicts 2220 reveals that the second 2108 and third 2110 base stations can use the total of the available radio resources because there is presently at least one of no actual interference or no potential for interference. Therefore, the base station management system 112 sends an interrupt to at least one of, and preferably both of, the second 2108 and third 2110 base stations that provides an indication of the radio resources to be used. In the present case, it can be appreciated that the base station management system 112 has forwarded an indication 2904 of the radio resources allocated to the second base station 2108 and a similar indication 2906 has been forwarded to the third base station 2110. In the present example, although the indications 2904 and 2906 instruct the respective base stations to use the whole of the available radio resource, embodiments are not limited to such an arrangement, embodiments could additionally or alternatively, have instructed the second 2108 and third 2210 base stations to use respective subsets of the total radio resources. Embodiments can be realised in which those respective subsets have some or no overlapping or common radio resources.

Figure 30:
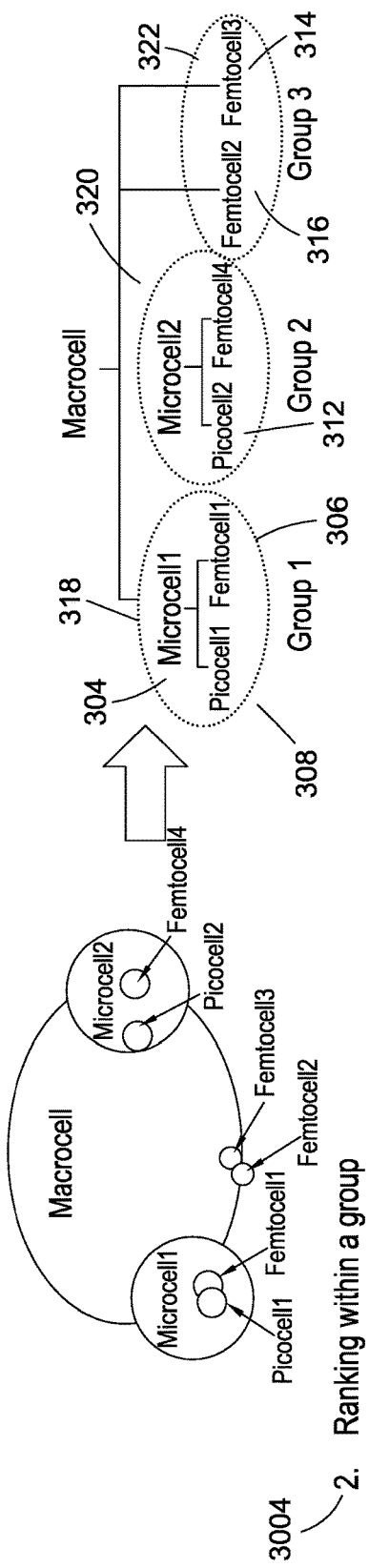
FIG. 30 illustrates rules for radio resource allocation.

Referring FIG. 30, there is shown a view 3000 of rules for radio resource allocation applied by the base station management system 112.

Under rule 1, 3002, the base stations are grouped into respective small base station groups 318 to 322, as described above with reference to FIGS. 3 and 4.

Next, a ranking within each group is undertake, as per rule 2, 3004 in which an initial calculation of the number of subcarriers, that is, amount of radio resource, per user equipment is performed, followed by ordering the users from highest priority to lowest priority such that user equipment having the least radio resource allocation is treated with the highest priority.

Following rule 3, 3006, an initial radio resource allocation is undertaken, which as an example involves allocating an initial radio resource to the user equipment, preferably, one at a time, according to the determined rank, and updating common information for all cells following that allocation to mitigate any potential for interference following a most recent allocation to a given user equipment.

Rule 4, 3008, is applied to allocation any unused radio resources to inner user equipment, that is, to user equipment that are not experiencing interference or that do not have the potential to experience any interference. It will be appreciated that allocation of unused to inner user equipment is a relatively straight-forward task that can increase the rate of convergence to an overall solution.

Figure 31:
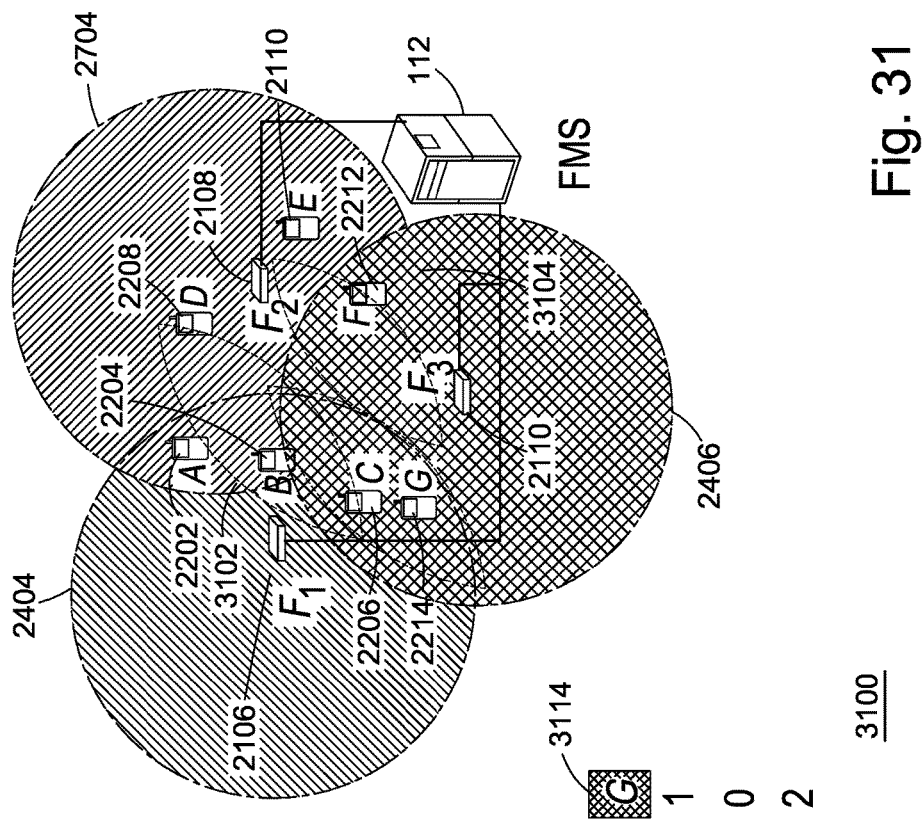
FIG. 31 shows an example network.

Preferably, rule 5, 3010, is applied to repeat step 3 to allocate to any other user equipment further unused resource that could not be easily allocated to the inner user equipment. Referring to FIG. 31 to X, a worked example will be given. FIG. 31 shows a view 3100 of a prevailing network comprising the first 2106 to third 2108 base stations, respective user equipment 2202 to 2214', respective service areas 2404, 2406 and 2704 and the base station management system 112. Assume that there are 12 units of radio resource. The first base station 2106 has three user equipment; namely, users A to C, the second base station 2108 has three user equipment; namely, user equipment D to F, and the third base station 2110 has a single user equipment 2214'.

It can be appreciated that several user equipment are in areas 3102 to 3106 of overlap of the services areas 2404, 2406 and 2704. Assume that the user equipment within those areas of overlap experience interference that exceeds respective thresholds; such respective thresholds can be the same for all user equipment, or different for one or more than one user equipment. Consequently, following sending respective measurement reports and associated local matrices of conflict, the base station management system 112 constructs a global matrix of conflicts 3108.

It can be appreciated from the global matrix of conflicts 3108 that:
user equipment A and B are experiencing interference from the second base station 2108;
user equipment C is experiencing interference from the third base station 2110;
user equipment F is experiencing interference from the third base station 2110; and
user equipment G is experiencing interference from the first base station 2106.

The grouping results in three groups; namely, a first group 3110 comprising user equipment A to C, a second group 3112 comprising user equipment D to F and a third group 3114 comprising user equipment G.

Figure 32:
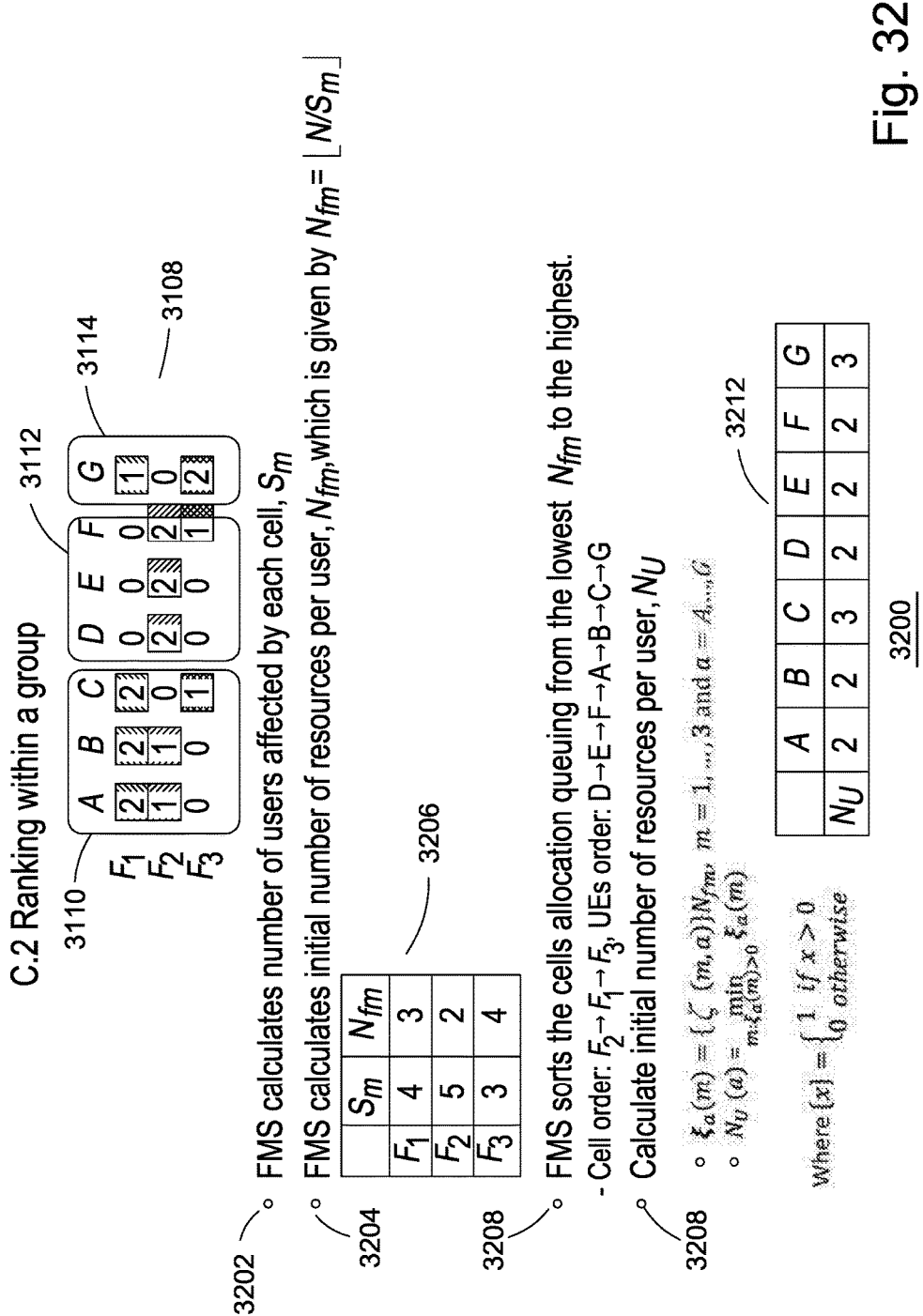
FIG. 32 depicts ranking and quantum of radio resource allocation.

Referring to FIG. 32, there is shown a view 3200 of the step of ranking within the groups starting with the group experiencing the most interference and working towards the group with the least interference. It can be appreciated that the global matrix of conflicts 3108 shows that the first group 3110 has the greatest interference situation; namely, three user equipment A, B and C are experiencing interference from the second 2108 and third 2110 base stations; the second group 3112 is experiencing interference only from the third base station 2110 and the final group is experiencing interference from the first base station 2106. The base station management system 112 determines the number of user equipment, $S_m$, within each cell (service area) that are affected or influenced at step 3202. Next the base station management system 112 calculates an initial radio resource allocation, $N_{fm}=\lfloor N/S_m \rfloor$, per user equipment at step 3204. It can be appreciated from the table 3206 that the first base station 2106 comprises four user equipment A to C and G that are under its influence, the second base station 2108 has five user equipment that are under its influence, and the third base station 2110 has three user equipment that are under its influence. Given those user equipment numbers, $S_m$, the values of $N_{fm}=\lfloor N/S_m \rfloor$, are 3, 2 and 4 respectively.

The base station management system 112, at step 3208, sorts the cells, that is, base stations, in order of $N_{fm}$ from the lowest, indicating the greatest radio resource interference, to the lowest, indicating the least radio resource interference. It can be appreciated that the base stations 2106 to 2110 are ordered as second base station, first base station and third base station. Optionally, the user equipment are also ordered according to group and according to most interference within a group. Therefore, the user equipment ordering is D, E, F, A, B, C, G.

The base station management system 112 calculates an initial (adjustment) of number, $N_U$, of radio resource allocation per user equipment at step 3210 using the global matrix of conflict 3108. The base station management system 112, firstly, determines for each user equipment, a set $\xi_a(m)=\{\zeta(m,a)\}N_{fm}$, where m=1, ..., 3 and a=A, ..., G, that is, m represents the number of base stations and a represents the user equipment. The number of radio resources per user equipment, $N_U$, is given by $$N_U(a) = \min_{m:\xi_a(m)>0} \xi_a(m),$$

where $$\{\zeta(m, a)\} = \begin{cases} 1 & \text{if } x > 0 \\ 0 & \text{otherwise} \end{cases}.$$

Applying the foregoing results in the second table 3212 in which user equipment A, B, D, E, F all have 2 units of radio resource such as, for example, resource blocks and user equipment C and G each have 3 units of radio resource such as, for example, resource blocks.

Figure 33:
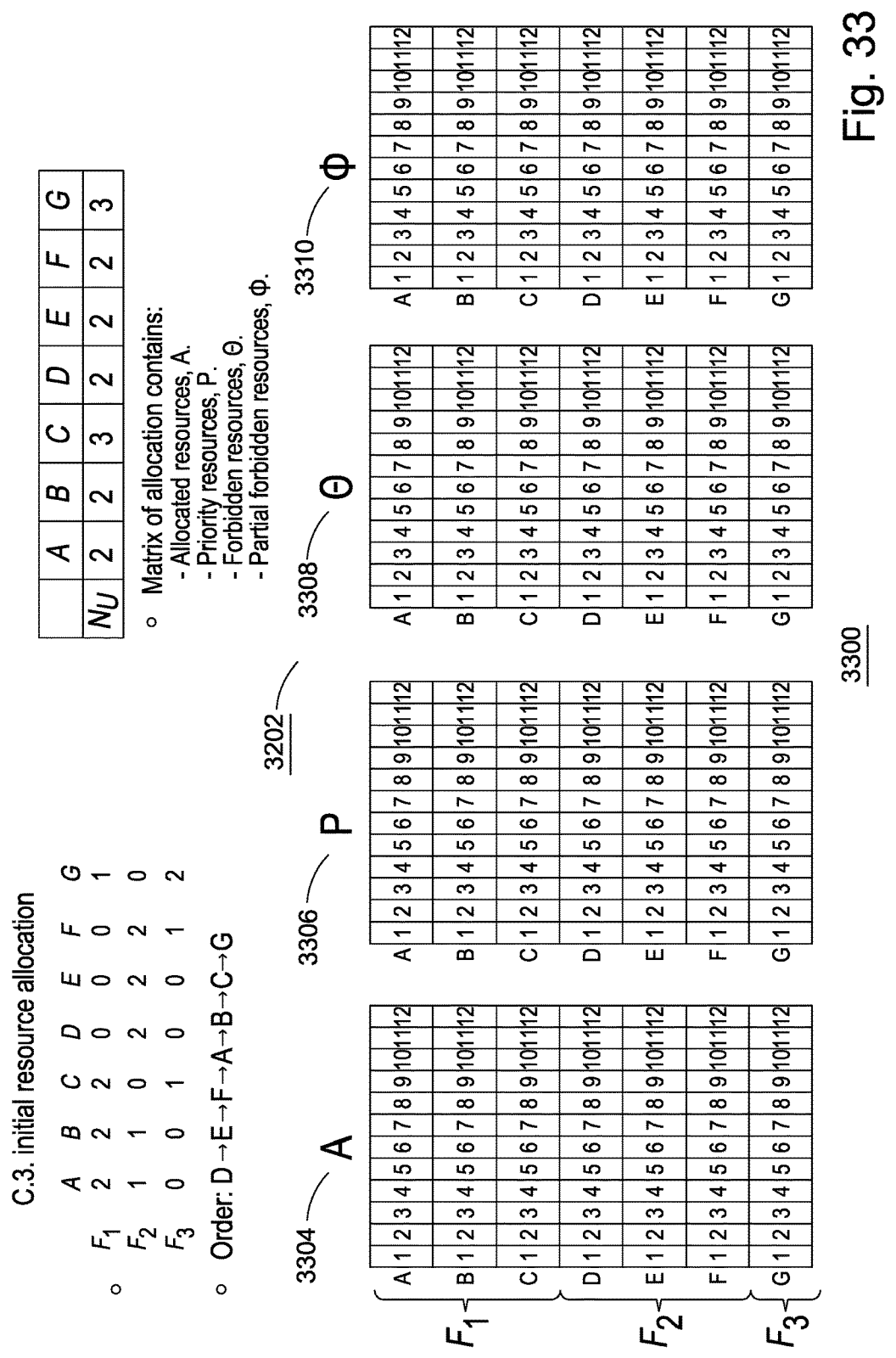

Referring to FIG. 33, there is shown a view 3200 of initial radio resource allocation. A matrix of allocation 3302 is constructed that comprises at least a matrix of allocated resource, A. 3304. The matrix of allocated resource 3304 comprises an entry for each detected user equipment; namely, user equipment A to G, and an entry for each possible radio resource; in the present example, N=12, that is, 12 possible resource blocks, for example, can possibly be allocated to the user equipment A to G. Recall that the resource allocation order determined above was D, E, F, A, B, C, G. Other optional matrices are also shown. A priority resources matrix, P, 3306, which indicates which resources of a corresponding user equipment are allocated on a priority basis as alternatives to a current radio resource allocation is interference arises. A forbidden resources, Θ, 3308 is shown, which contains an indication of which radio resources a corresponding user equipment is not allowed to use. A partial forbidden resources matrix, Φ, 3310 is shown, which contains an indication of radio resource that are currently or temporarily forbidden, but which may become useable if the interference scenario associated with a base stations and its users changes. Such a change can happen when, for example, another user equipment, which is served by the same base station as a given user equipment, uses radio resource that is indicated as being partially forbidden in the partially forbidden matrix, or portion thereof, corresponding to the given user equipment.

Figure 34:
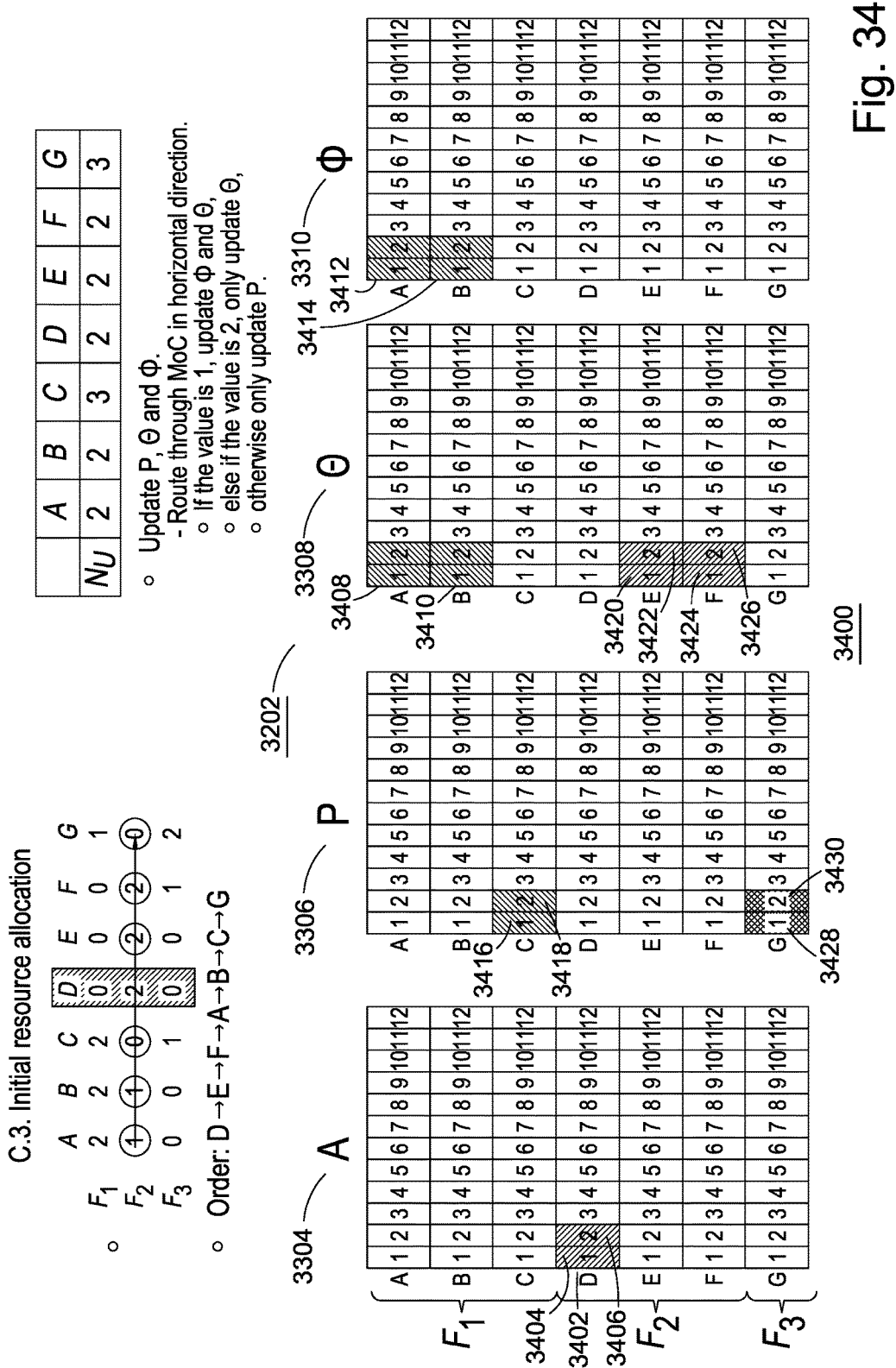
Figure 37:
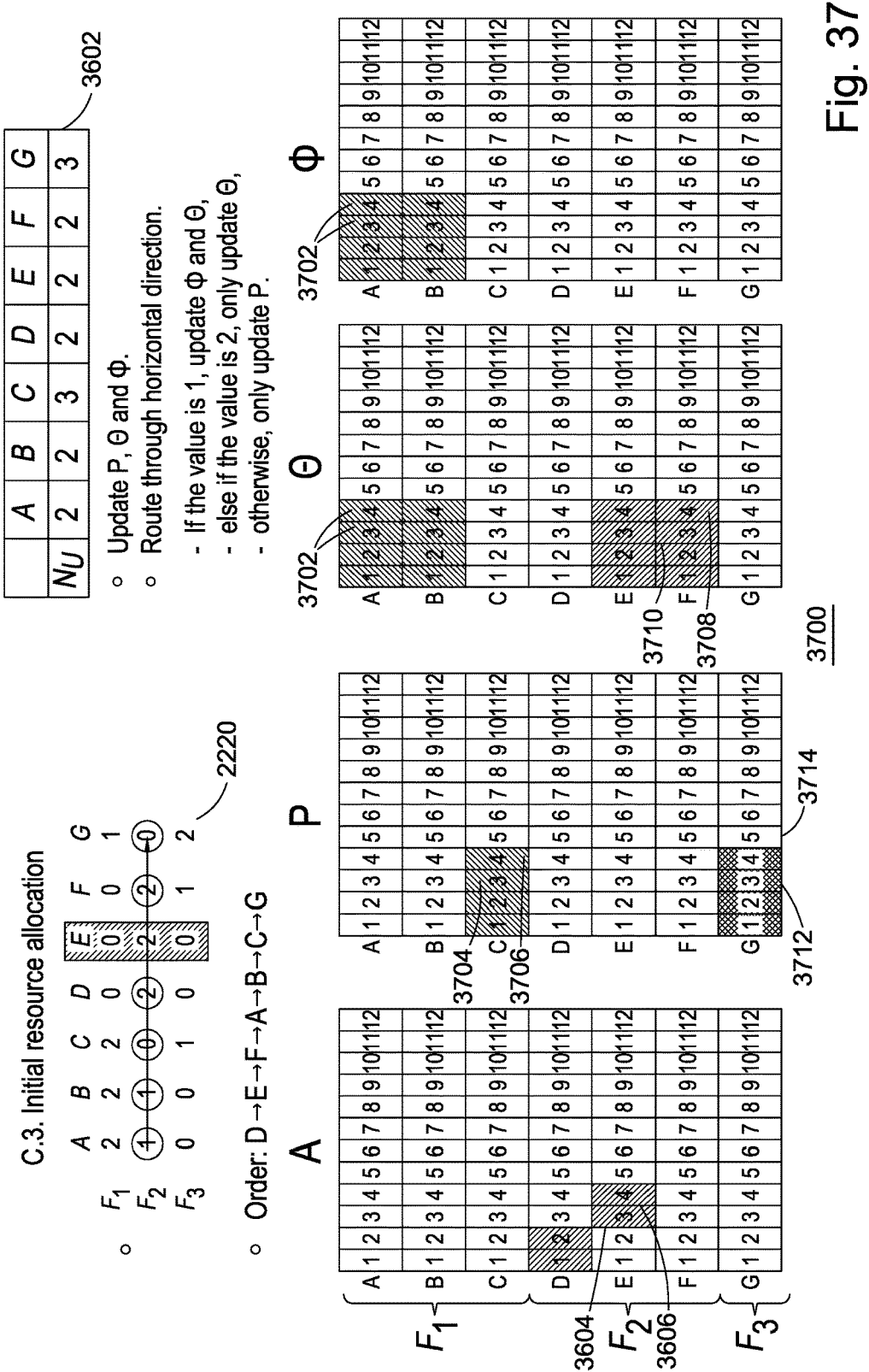
Figure 38:
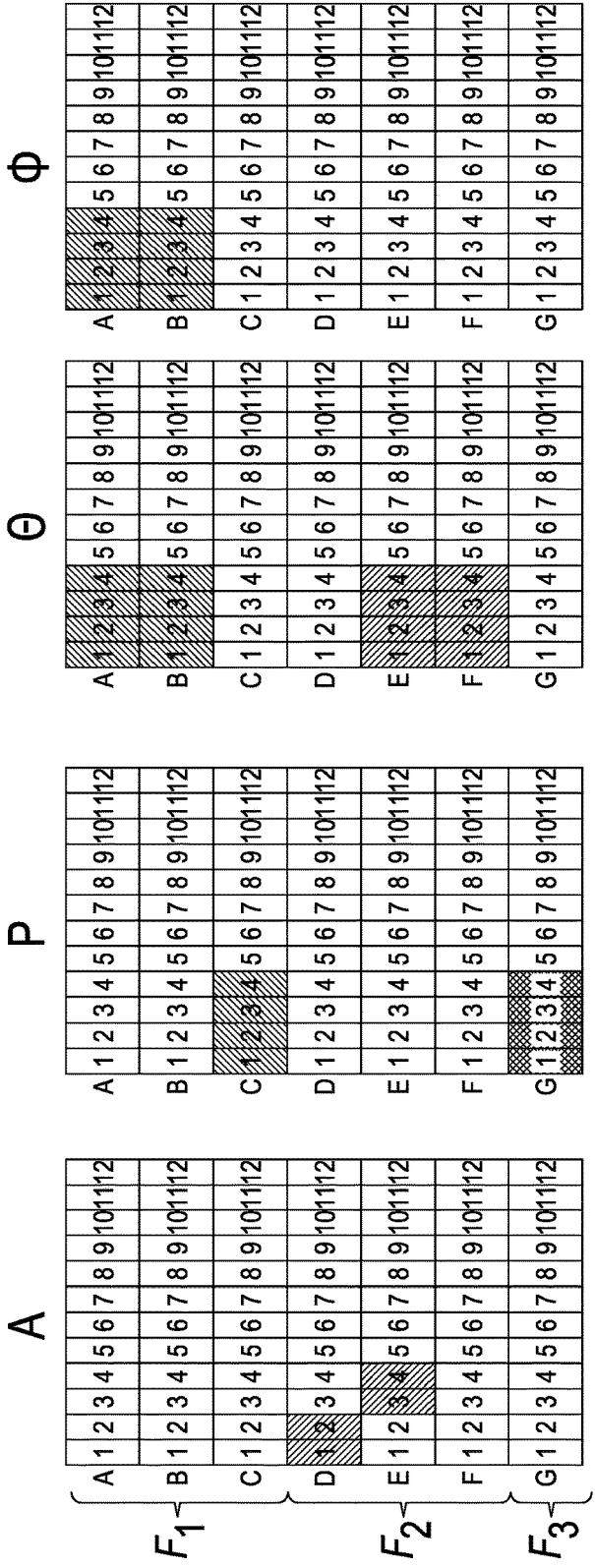

Referring to FIG. 34, there is shown a view 3400 of initial resource allocation. Given the user equipment radio resource allocation order and the number of radio resources per user equipment, it can be appreciated that user equipment D is allocated respective resources 3402. In the example, the radio resource comprises first and second resource blocks 3404 and 3406. Embodiments are not limited to such allocations. Embodiments can be realised in which some other unit of radio resource is allocated. It will be appreciated that those radio resources are no longer available for use by any user equipment that experiences interference from the base station that serves user equipment D. Therefore, the base station management system 112 uses the global matrix of conflicts to update at least one of P, Θ and Φ and preferably all three matrices. The base station management system 112 identifies the base station associated with the user equipment whose radio resource has just been allocated, and applies the following rule:

If the global matrix of conflicts contains a "1" value, corresponding with interference, then the associated user equipment have the entries in at least one of Θ and Φ, preferably both, that indicate that the radio resources assigned to user equipment D are not available for use with the user equipment having a "1" in the global matrix of conflicts Else If the global matrix of conflicts contains the value "2", indicating that the corresponding user equipment is being served by the base station, then the entries in the forbidden matrix, Θ, are updated to indicate that those radio resources are not available for use by respective user equipment, Else Update the priority matrix, P, to indicate that radio resources could be used on a priority or preferential basis by a corresponding user equipment if there is a need to reallocate radio resources due to a change in the prevailing radio environment.

Applying the above, it can be appreciated that the global matrix of conflicts contains "1" in respective of user equipment A and B. Therefore, at least one of Θ and Φ, preferably both, matrices are updated with respective entries 3408 to 3414 to indicate that the radio resources 3402 assigned to user equipment D cannot be assigned for use in serving user equipment A and B by their respective base station 2106.

Next, traversing the global matrix of conflicts, a "0" is encountered in respect of user equipment C, indicating that there is no interference between the second base station 2108 and user equipment C. Therefore, the priority matrix, P, is updated to with respective entries 3416 and 3418 to indicate that the radio resources 3404 and 3406 can be assigned to user equipment C preferentially is the radio environment changes.

Continuing, it can be appreciated that a pair of "2"s are encountered in respect of user equipment E and F. Therefore, corresponding entries 3420 to 3426 are made in the forbidden resources matrix, Θ, since the respective resources have already been assigned for use by the second base station 2108 in serving user equipment D. Hence, the second base station F2 is forbidden from using the first and second radio resources with user equipment E and F.

Next, a "0" is encountered in respect of user equipment G, which means that there is no interference between the second base station and user equipment G such that the respective radio resources 3404 and 3406 could be used on a priority basis for user equipment G. Therefore, corresponding entries 3428 and 3430 are made in the priority matrix, P.

Figure 35:
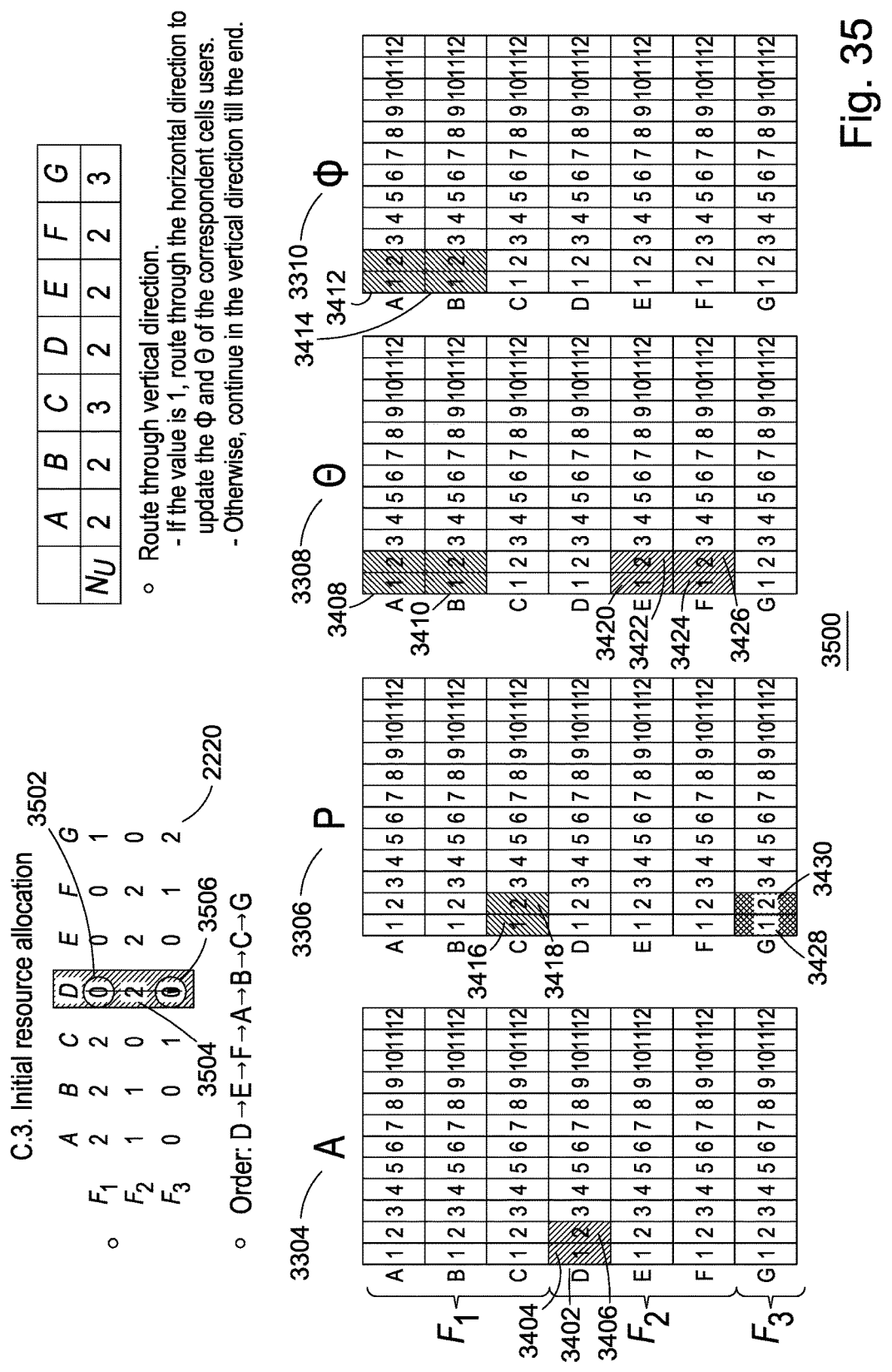

Referring to FIG. 35, there is shown a view 3500 of traversing the global matrix of conflicts 2220 in the vertical direction in respect of a given user equipment to determine those radio resources that the respective user equipment is forbidden from using. If a "1" is encountered, then at least one of Θ and Φ, preferably both, matrices are updated with respective entries to indicate that the radio resources assigned for use by a base station corresponding to the "1", that is, base station that is a source of interference, are unavailable to a current user equipment. The foregoing is applied for all vertical entries in the global matrix of conflicts 2220 corresponding to a current user equipment being assigned radio resources. If the current entry in the global matrix of conflicts is not a "1" the vertical traversal continues until all vertical entries corresponding to current user equipment have been processed.

Applying the foregoing, it can be appreciated that the global matrix of conflicts 2220 contains a "0" 3502 corresponding to the first base station 2106, which indicates that there is no interference between user equipment D and the first base station 2106 such that there should be no restrictions regarding the use by user equipment D, or its corresponding base station 2108, on the radio resources assigned to the first base station 2106. The next entry is a "2" 3504, as expected since the second base 2108 serves user equipment D. The next entry 3506 in the global matrix of conflicts 2220 is also a "0", which indicates that none radio resources of the third base station 2110 cause interference with user equipment D such that there is no need to impose restrictions on the use of the third base station's radio resources by at least one of user equipment D and its corresponding base station 2108.

Figure 36:
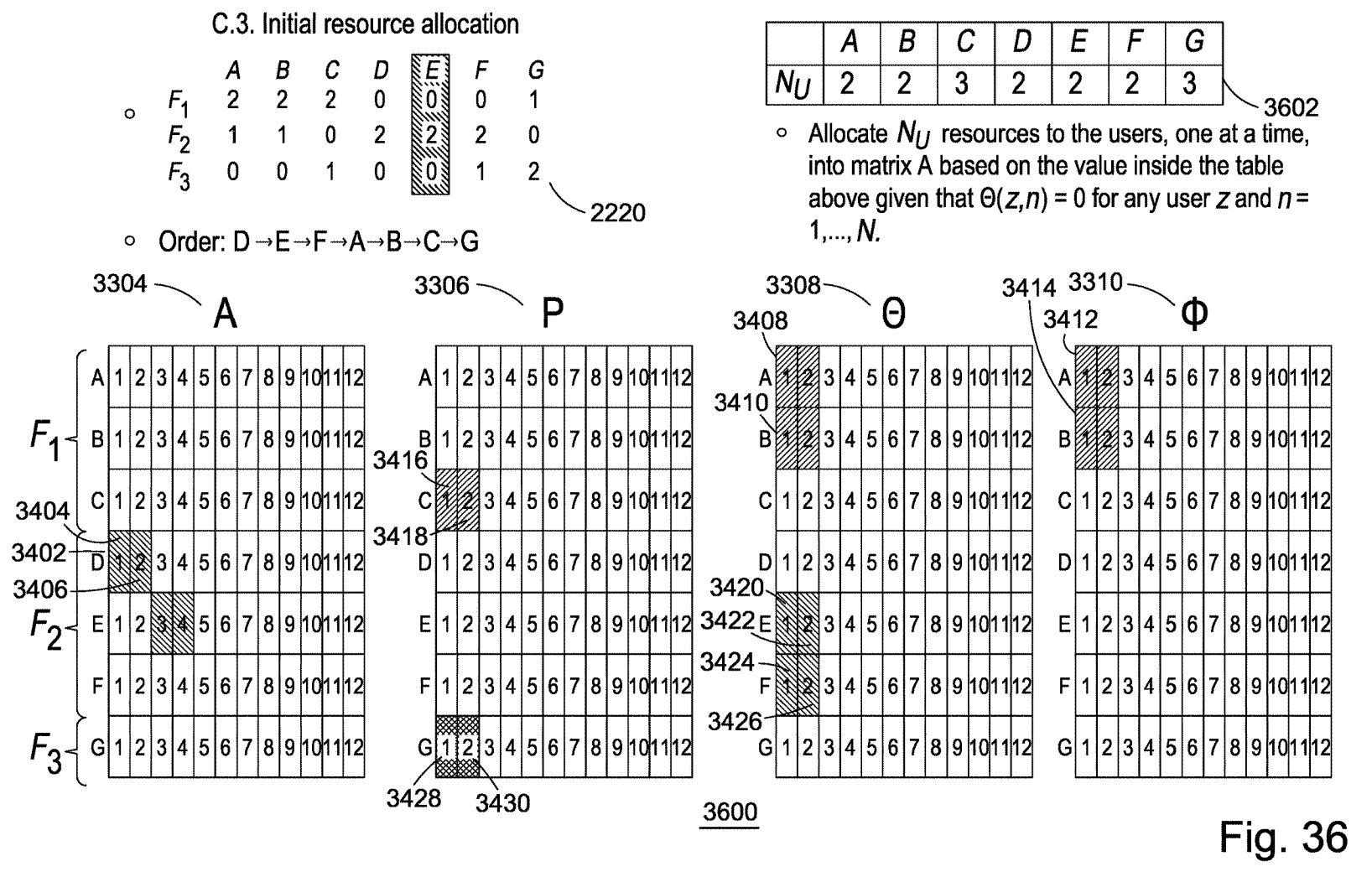

Referring to FIG. 36, there is shown a view 3600 of initial resource allocation for the next user equipment, that is, user equipment E. It can be appreciated from the allocation table 3602 the number, $N_U$, of radio resources to be allocated to user equipment E is 2. Therefore, the matrix of allocations, A, is amended to allocation two resource blocks to user equipment E as can be appreciated from entries 3604 and 3606.

Next the other matrices are updated, that is, at least one or more of the priority matrix, P, the forbidden matrix, Θ, and the partial forbidden matrix, Φ, are updated by working through the global matrix of allocations 2220 horizontally for the base station corresponding to the current user equipment, that is, in the present example, the second base station 2108. As indicated above, traversing horizontally, the following rule is applied:

If the global matrix of conflicts contains a "1" value in the row of a current base station corresponding to a current user equipment, then there exists interference between that base station and an associated other user equipment, such that the associated other user equipment will have entries in at least one of Θ and Φ, preferably both, that indicate that the radio resources assigned to a current user equipment are not available for use with the associated other user equipment having a "1" in the global matrix of conflicts;

Else

If the global matrix of conflicts contains the value "2", indicating that the corresponding user equipment is being served by the base station, then the entries in the forbidden matrix, Θ, are updated to indicate that those radio resources are not available for use by any other user equipment, Else Update the priority matrix, P, to indicate that radio resources could be used on a priority or preferential basis by a corresponding user equipment if there is a need to reallocate radio resources due to a change in the prevailing radio environment.

Applying the foregoing gives the following: The global matrix of conflicts 2220 contains "1" values for both user equipment A and B, which means that the second base station 2108 interferes with user equipment A and B. Therefore, the radio resources 3604 and 3606 are indicated, by corresponding entries 3702 regarding resources 3 and 4 in the forbidden matrix, Θ, and the partially forbidden matrix, Θ, for user equipment A and B.

Next, the horizontal entry for the second base station 2108 and user equipment C is processed. It can be appreciated that the entry is a "0". Therefore, the priority matrix, P, is updated to indicate that the radio resources currently assigned to user equipment E, can be used on a priority or preferential basis for user equipment C, as can be appreciated from the entries 3704 and 3706.

The next entry in the global matrix of conflicts 2220 corresponds to user equipment D, which has already been processed and, therefore, it is ignored.

The next entry in the global matrix of conflicts 2220 is a "2" corresponding to user equipment. F, which is serviced by the same base station as the current user equipment, that is, user equipment E. Therefore, the forbidden matrix, Θ, is updated with entries 3708 and 3710 indicating that the associated radio resources are forbidden for use by user equipment F. The next entry in the global matrix of conflicts 2220 corresponding to user equipment E and is a "0", indicating that there is no interference between the second base station and the user equipment G. Therefore, the priority matrix, P, is updated with corresponding entries 3712 and 3714 indicating the resources assigned to user equipment E; namely, resource blocks 3 and 4, are available on a priority or preferential basis for use with user equipment G.

The vertical entries in the global matrix of conflicts 2220 are processed and the following rule is applied:

If the global matrix of conflicts contains a "1" value, then update at least one of, and preferably both of, the forbidden matrix, Θ, and the partially forbidden matrix, Φ with respective entries indicating that the radio resources assigned to the current user equipment, that is, user equipment E, are not available for use by base station corresponding to the "0", that is, the first base station 2106 in the present example. If the global matrix of conflicts contains 2220 a value other than "1", then the vertical traversal continues by processing the next entry.

Applying the above, means that updating of the forbidden matrix or the partially forbidden matrix does not take place because all entries are either a "0", indicating that there is no interference, or a "2" indicating that the corresponding base station is the serving base station.

Figure 39:
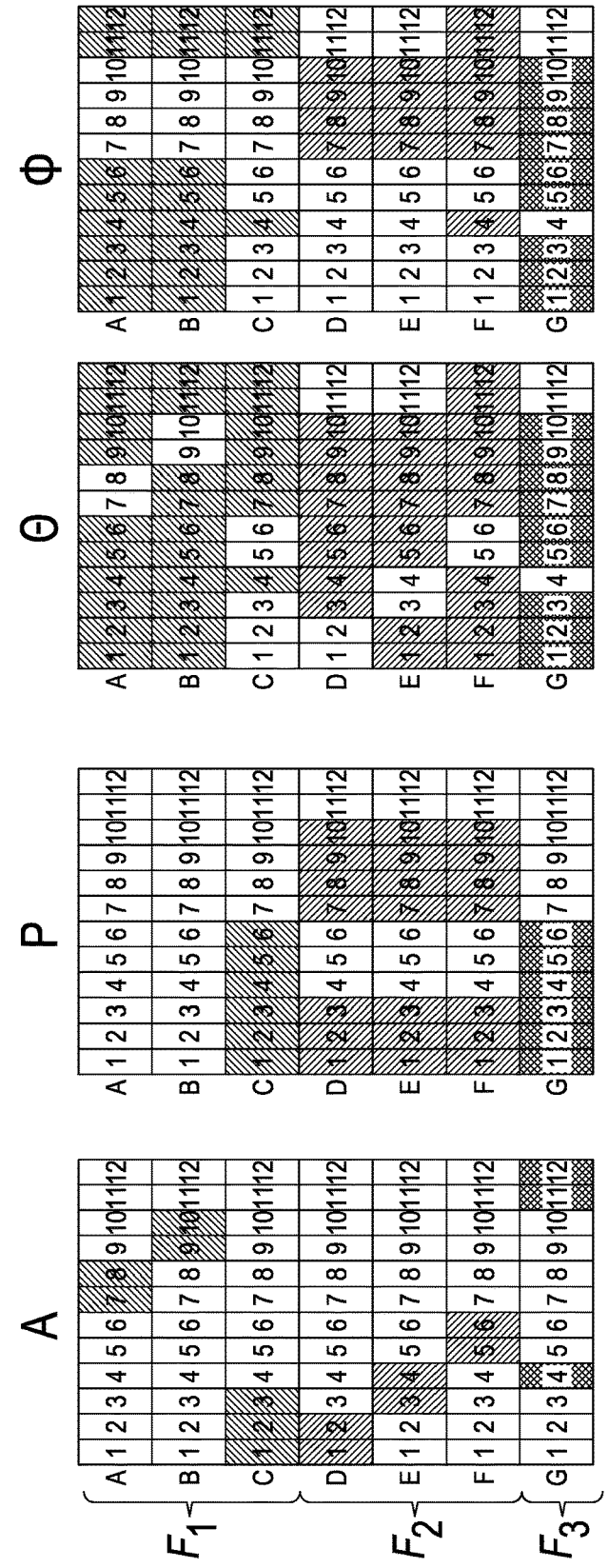

Referring to FIG. 39, there is shown a view 3900 of the completed resource allocation process for all users in the specified order.

Regarding the allocation matrix, A, it can be appreciated that user equipment A has been allocated $7^{th}$ and $8^{th}$ radio resources;

user equipment B has been allocated $9^{th}$ and $10^{th}$ radio resources;

user equipment C has been allocated $1^{st}$ to $3^{rd}$ radio resources;

user equipment D has been allocated $1^{st}$ and $2^{nd}$ radio resources;

user equipment E has been allocated $3^{rd}$ and $4^{th}$ radio resources;

user equipment F has been allocated $5^{th}$ and $6^{th}$ radio resources;

user equipment G has been allocated $4^{th}$, $11^{th}$ and $12^{th}$ radio resources.

Regarding the priority matrix, P, it can be appreciated that the following priority or preferential allocations have been determined:

user equipment C has been allocated $1^{st}$ to $6^{th}$ potential radio resources;

user equipment D has been allocated $1^{st}$ to $3^{rd}$ and $7^{th}$ to $10^{th}$ potential radio resources;

user equipment E has been allocated $1^{st}$ to $3^{rd}$ and $7^{th}$ to $10^{th}$ potential radio resources;

user equipment F has been allocated $1^{st}$ to $3^{rd}$ and $7^{th}$ to $10^{th}$ potential radio resources; and user equipment G has been allocated $1^{st}$ to $6^{th}$ potential radio resources.

Referring to the forbidden matrix, $\Theta$, it can be appreciated that:

user equipment A cannot use $1^{st}$ to $6^{th}$ and $9^{th}$ to $12^{th}$ radio resources;

user equipment B cannot use $1^{st}$ to $8^{th}$ and $11^{th}$ and $12^{th}$ radio resources;

user equipment C cannot use the $4^{th}$ and $7^{th}$ to $12^{th}$ radio resources;

user equipment D cannot use $3^{rd}$ to $10^{th}$ radio resources;

user equipment E cannot use $1^{st}$ and $2^{nd}$ and $5^{th}$ to $10^{th}$ radio resources;

user equipment F cannot use $1^{st}$ to $4^{th}$ and $7^{th}$ to 12th radio resources;

user equipment G cannot use $1^{st}$ to $3^{rd}$ and $5^{th}$ to $10^{th}$ radio resources;

Referring to the partially forbidden matrix, $\Phi$, it can be appreciated that temporarily:

user equipment A cannot use $1^{st}$ to $6^{th}$ and $11^{th}$ and $12^{th}$ radio resources;

user equipment B cannot use $1^{st}$ to $6^{th}$ and $11^{th}$ and $12^{th}$ radio resources;

user equipment C cannot use $4^{th}$, $11^{th}$ and $12^{th}$ radio resources;

user equipment D cannot use $7^{th}$ to $10^{th}$ radio resources;

user equipment E cannot use $7^{th}$ to $10^{th}$ radio resources;

user equipment F cannot use $4^{th}$ and $7^{th}$ to $12^{th}$ radio resources;

user equipment G cannot use $1^{st}$ to $3^{rd}$ and $5^{th}$ to $10^{th}$ radio resources.

Figure 40:
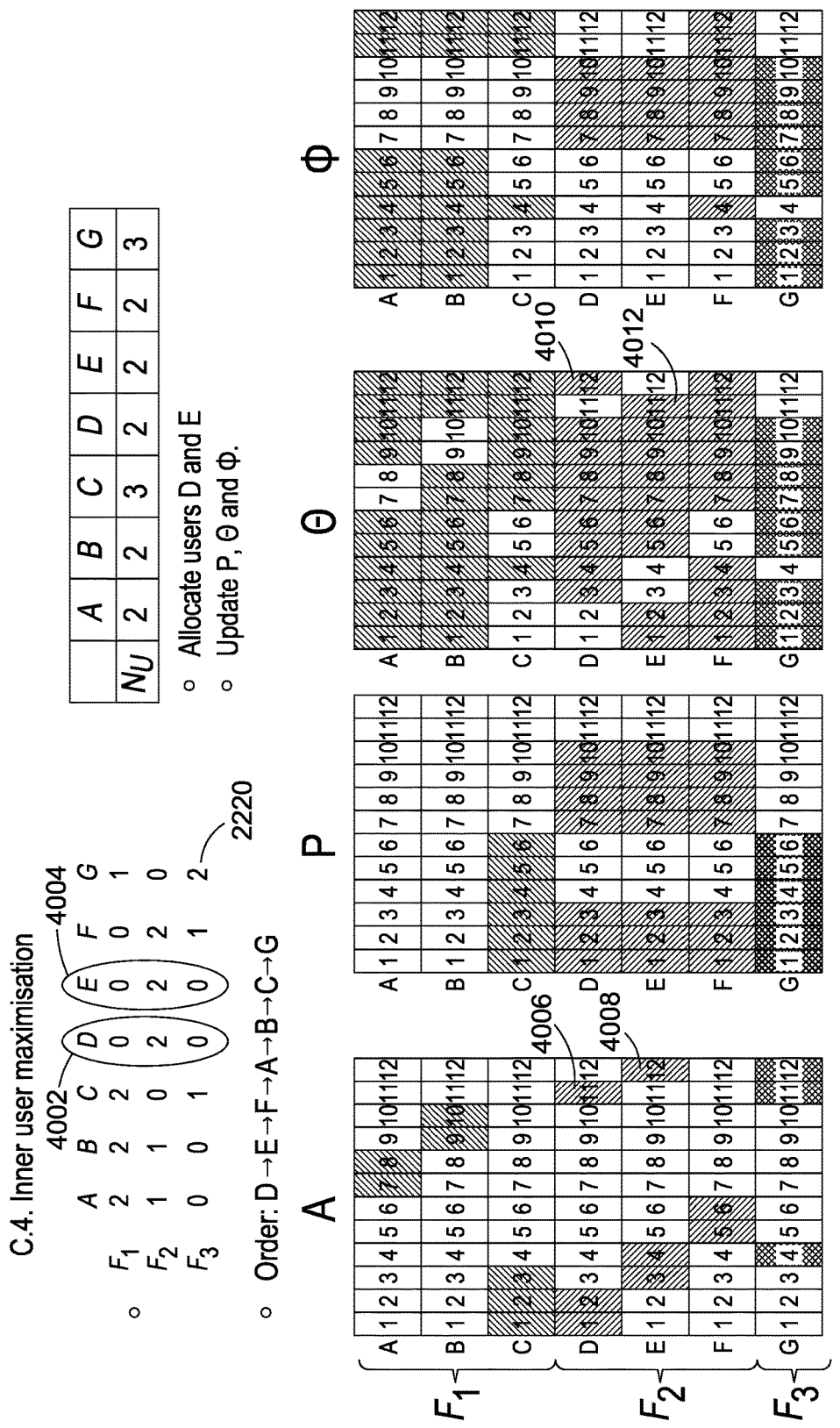

Referring to FIG. 40, there is shown an example 4000 of inner user allocation. An inner user is defined as a user that does not experience interference. It can be appreciated from the global matrix of allocations 2220 that there are two inner users indicated by entries 4002 and 4004. The remaining underused radio resources are allocated equally to the inner users. The two inner users are user equipment D and E. It can be appreciated from at least one of, and preferably both of, the forbidden matrix, $\Theta$, and the partially forbidden matrix, $\Phi$, that user equipment D and E are not forbidden from using radio resources 11 and 12. Therefore, those remaining, not forbidden, radio resources are shared equally between user equipment D and E as can be appreciated from respective entries 4006 and 4008 in the matrix of allocations, A. Consequential updates following allocation of the underused radio resources to the forbidden matrix, $\Theta$, are required as can be appreciated from respective entries 4010 and 4012, which render the use of the allocated underused radio resources to the inner users mutually exclusive.

Step C3 is repeated until all radio resources have been allocated. It can be appreciated that repeating the foregoing results in radio resources $5^{th}$ and $6^{th}$ being allocated to user equipment C. The resources for user equipment can be are determined by performing $P.\overline{(A.\Theta)}$.

Once the allocated matrix, A, has been finalised, the radio resource allocations are communicated to the base stations. Using the allocated radio resources as specified in the allocations matrix, A, is simple and the receiving base stations can use the allocations directly.

Figure 42:
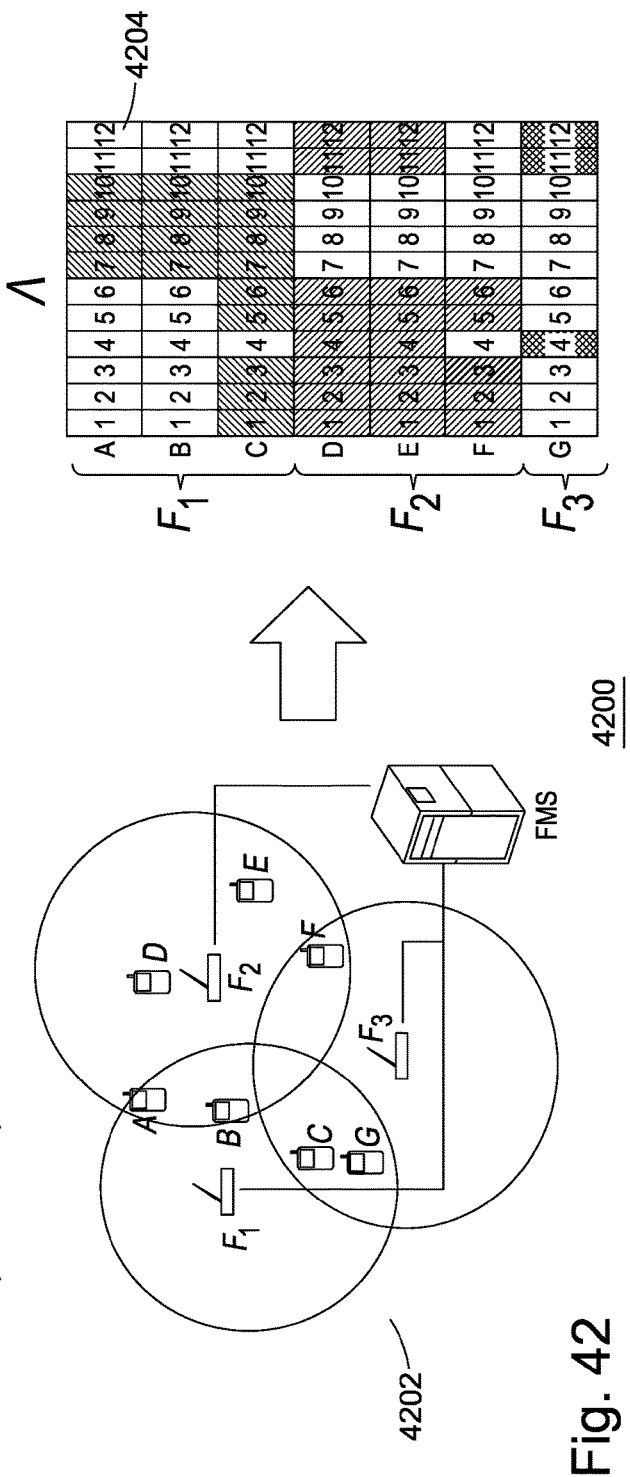

Alternatively, the radio resources can be communicated to the base stations as sets of available resources, rather than assigned resources specified at a user equipment level of granularity, that give the base stations some discretion in managing the allocations, that is, the available allocations are specified at a base station level of granularity. Communicating the available resources gives the base stations some discretion in assigning the radio resources as part of a scheduling strategy, that is, radio resource allocation and management at the base station level. The available resources, $\Lambda$, is given by the NOT of the partially forbidden resources, that is, $\Lambda=\overline{\Phi}$, as can be appreciated from FIG. 42, which shows a view 4200 of a network 4202 and an associated available resources allocation matrix 4204.

Figure 43:
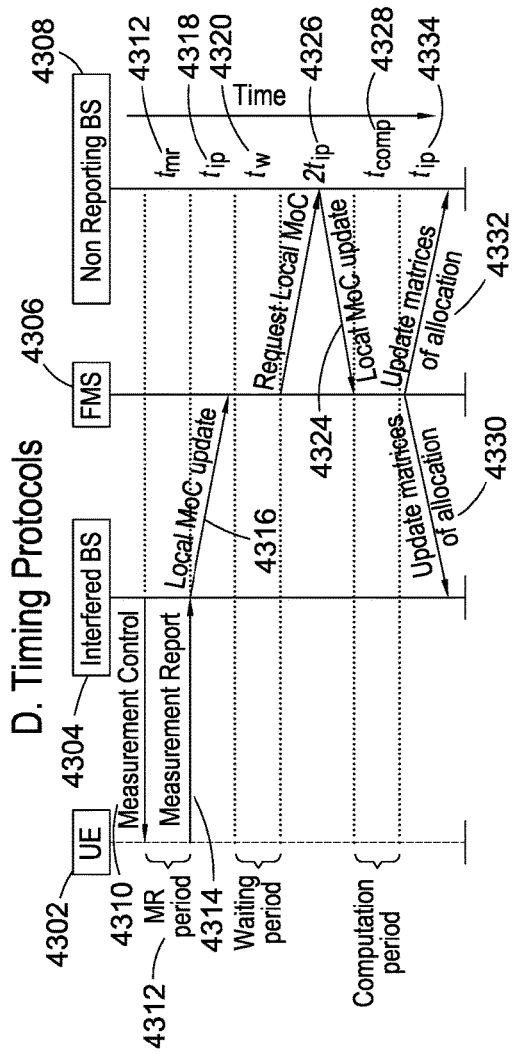
FIG. 43 shows a timing diagram.

Referring to FIG. 43, there is shown a timing diagram 4300 relating to communications between various entities of embodiments. It can be appreciated that the timing diagram involves a user equipment 4302, a first base station 4304, a base station management system 4306 and a second base station 4308. Assume that the first base station 4304 is experiencing interference or that its user equipment is experiencing interference, at step 4310 the first base station requests a measurement report from the user equipment. In response to the request, the user equipment 4302 monitors, over a corresponding measurement report period $t_{mr}$ 4312, radio resources of the network and determines whether or not there is any interference. The measurement report is sent from the user equipment 4302 to the requesting base station 4304 at step 4314. A local matrix of conflicts is produced by the requesting base station 4304 and sent, at step 4316, to the base station management system 4306 (or 112) over a time period $t_{ip}$ 4318. Optionally, there is a waiting period, $t_w$ 432o, before the base station management system 4306 requests, at step 4322, a local matrix of conflicts of any associated base station such as, for example, the second base station 4308. The second base station 4308 responds to the request by sending, at step 4324, its local matrix of conflicts to the base station management system 4306. It can be appreciated that the request and response take place over a particular time period, $2t_{ip}$ 4326. Having secured relevant information, the base station management system 4306 performs radio resource allocation over a respective time period 4328. Thereafter, the base station management system 4306 issues, at steps 4330 and 4332, matrices of allocation to at least one of first 4304 and second 4308 according to the resolved radio resource allocations, which takes place over a respective time period 4334. FIG. 43 also shows the worst and best case latencies for resolving an interference scenario.

In embodiments described herein, the user equipment and the base stations are embodiments of communication entities. The user equipment typically take the form of communication devices such as, for example, mobile communication devices arranged to communicate using at least one of data and voice, or both. Such mobile communication devices comprise, for example, mobile telephones and mobile computing devices such as, for example, laptops, tablets. Such user equipment contains hardware and software arranged to implement respective aspects of embodiments. Any such software would be executed on such hardware as one or more than one processor. The foregoing also applies to at least one the base stations and base station management system. Embodiments of such base stations or base station management system would typically be implemented using software that is executable on one or more than processor.

In the embodiments herein, the radio resource allocations issued by the base station management system 112 can take a number of forms such as at least one of:

a complete allocation of radio resources for all user equipment serviced by a base station;

an allocation of radio resources only for user equipment that is subject to interference within a service area of a base station;

an allocation that represents the difference between a determined radio resource allocation arranged by the base station management system 112 to address interference and a present allocation of radio resources to a base station for use with a user equipment subject to that interference;

an allocation of radio resources that is specific to a user equipment with no discretion on the part of the base station in allocating those radio resources to its user equipment;

an allocation of radio resources that is specific to a user equipment with discretion on the part of the base station in allocating those radio resources to such a specific user equipment;

an allocation of radio resources that is general that comprises discretion on the part of the base station in allocating those resources to its user equipment;

taken jointly and severally in any and all combinations and permutations.

In the embodiments herein, a local matrix of conflicts can be reported to the base station management system 112 in any suitable form, that is, the whole matrix can be sent or only an indication of the differences between a previously sent matrix of conflicts and a presently prevailing local matrix of conflicts.

In embodiments, the measurement reports sent by the user equipment herein can be sent at least one of:

in response to the user equipment detecting a change in the radio environment, particularly, if a given user equipment can receive signals from a base station other than its serving base station, especially if interference actually arises or at least the potential for interference arises;

in response to a request from another network entity such as, for example, the base station management system 112;

in response a predetermined scheduled of reporting that is periodic or aperiodic;

taken jointly or severally in any and all permutations.

The embodiments described herein find particular application within an LTE context, that is, within a Long Term Evolution context.

In one or more than one of the above embodiments, in particular, but not limited to, the embodiments described with reference to at least one of FIGS. 2 and 19, any such associated user equipment comprises at least one of user equipment being serviced by that base station, that is, user equipment that is using radio resource of that base station, user equipment within a service area of that base station but currently not consuming radio resource of that base station such as, for example, a user equipment that is within the service area of the base station but that is consuming resources of another base station or a user equipment that is currently associated with another base station but about to be handed-off to the base station in suit.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

Although embodiments of the present invention have been described with reference to the femtocell gateway or femtocell management system undertaking the processing for resource allocation and reallocation, embodiments of the invention are not limited to such an arrangement. Embodiments can be realised in which some other entity undertakes that processing such as, for example, any of the entities illustrated in FIG. 1, that is, the radio network controller 104, the operator management system 110, the femtocell management system 112 or some other entity such as, for example, an eNode B.

Embodiments of the present invention apply not only to small-cell base stations and/or small-cell user equipment, but also apply to other sized cells and corresponding user equipment. Furthermore, embodiments of the present invention can be applied in respect of interference management on downlink radio resources, uplink radio resources, both uplink and downlink radio resources and in peer to peer links, that is, ad hoc networks in which a user equipment assumes the role of at least one of a base station and base station management system, preferably both a base station and base station management system.

The invention claimed is:

1. An apparatus for allocating radio resources in a network comprising a number of base stations arranged to communicate, using the radio resources, with a plurality of users, the radio resources comprising a plurality of carriers, and the apparatus comprising:

circuitry to determine sets of at least potentially interfering radio resources from measurement reports associated with a plurality of users of the carriers, the measurement reports providing an indication of interference or otherwise regarding the radio resources carriers; said circuitry to determine sets of at least potentially interfering radio resources comprising circuitry to construct a first data structure, for each base station of the number of base stations, the first data structure for each base station of the number of base stations comprising indicia indicating whether or not interference exists between users of each base station of the number of base stations and neighbouring base stations of eachbase station;

circuitry to form a matrix of conflicts from the first data structures; the matrix of conflicts comprising said indicia indicating whether or not interference exists between the plurality of users using the base stations of the number of base stations;

circuitry to perform a ranking of the number of base stations according to a first criterion, the ranking being associated with the determined sets of at least potentially interfering radio resources; said circuitry to perform the ranking of the number of base stations comprising:

circuitry to group the number of base stations on the basis of interference with one another's users; and circuitry to rank the base stations within each group according to user density, wherein the user density of a base station is the number of users detected within a service area of the base station; and circuitry to establish a set of allocated radio resources allocated to the users of each base station of the number of base stations; the set of allocated radio resources being selected from a set of available radio resources of the radio resources to at least reduce interference; said circuitry to establish the set of allocated radio resources comprising:

circuitry to allocate radio resources, from the set of available radio resources, on a per group basis to users of the number of base stations according to the ranks of the base stations within each group without interference arising from use by the users of the allocated resources, and circuitry to update the set of available radio resources according to allocated radio resources.

2. The apparatus of claim 1, in which said circuitry to update the set of available radio resources according to allocated radio resources comprises circuitry to establish a second data structure associated with the set of allocated radio resources, the second data structure comprising data associated with radio resources that cannot be used by one or more than one base station of the number of base stations in light of the set of allocated radio resources.

3. The apparatus of claim 1, further-comprising circuitry to establish a second data structure associated with the set of allocated radio resources, the second data structure comprising data associated with radio resources that temporarily cannot be used by one or more than one other base station of the number of base stations without interference arising from such use.

4. The apparatus of claim 1, further comprising circuitry to allocate to a first class of users, unallocated radio resources to of one or more than one base station of the number of base stations, the one or more base station not having a set of at least potentially interfering radio resources.

5. The apparatus of claim 1, further comprising circuitry to receive a measurement report from one or more than one base station of the number of base stations, the measurement report comprising data associated with interference.

6. The apparatus of claim 1, further comprising circuitry to allocate radio resources to one or more than one of the number of base stations according to the ranking by allocating specific radio resources for use by a specific base station of the number of base stations.

7. The apparatus of claim 1, further comprising circuitry to allocate radio resources to one or more than one of the number of base stations according to the ranking by allocating specific radio resources for use by one or more than one base station of the number of base stations.

8. The apparatus of claim 7, wherein the specific radio resources comprises a plurality of radio resources to be allocated to a plurality of the base stations.

9. The apparatus of claim 1, further comprising circuitry to determine sets of at least potentially interfering radio resources by determining sets of interfering radio resources.

10. The apparatus of claim 1, wherein one or more than one base station of the number of base stations is a base station for serving one or more than one user equipment.

11. The apparatus of claim 1, further comprising circuitry configured to communicate the allocation of radio resources to a respective one or more than one base station of the number of base stations in response to said allocating radio resources to one or more than one base station of the number of base stations according to the ranking.

* * * * *